(12) United States Patent
Sarwat et al.

(10) Patent No.: US 11,476,673 B1
(45) Date of Patent: Oct. 18, 2022

(54) SYSTEMS AND METHODS FOR DISTRIBUTION OPTIMAL POWER FLOW

(71) Applicants: Arif I. Sarwat, Miami, FL (US); Temitayo O. Olowu, Miami, FL (US)

(72) Inventors: Arif I. Sarwat, Miami, FL (US); Temitayo O. Olowu, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/661,785

(22) Filed: May 3, 2022

(51) Int. Cl.
*H02J 3/24* (2006.01)
*H02J 3/38* (2006.01)
*G05B 19/042* (2006.01)

(52) U.S. Cl.
CPC .............. *H02J 3/24* (2013.01); *G05B 19/042* (2013.01); *H02J 3/381* (2013.01); *G05B 2219/2639* (2013.01); *H02J 2300/24* (2020.01)

(58) Field of Classification Search
CPC .......... H02J 3/24; H02J 3/381; H02J 2300/24; G05B 19/042; G05B 2219/2639
See application file for complete search history.

(56) References Cited

U.S. PATENT DOCUMENTS

| | | | |
|---|---|---|---|
| 2015/0311718 A1* | 10/2015 | Divan | H02J 3/18 323/208 |
| 2016/0094034 A1* | 3/2016 | Divan | H02M 7/42 323/208 |
| 2017/0040799 A1* | 2/2017 | Divan | G05F 1/66 |
| 2017/0060161 A1* | 3/2017 | Tyler | H02J 3/383 |
| 2017/0117716 A1* | 4/2017 | Wolter | H02J 3/386 |
| 2017/0133849 A1* | 5/2017 | Feng | G05F 1/70 |
| 2020/0203951 A1* | 6/2020 | Alam | G05B 19/042 |

* cited by examiner

*Primary Examiner* — Ziaul Karim
(74) *Attorney, Agent, or Firm* — Saliwanchik, Lloyd & Eisenschenk

(57) ABSTRACT

Systems, methods, and frameworks for distribution grid optimal power flow (D-OPF) are provided, to find the optimal droop and mode settings of smart inverters (SIs). The droop and mode settings of SIs can be found as per the Institute of Electrical and Electronics Engineers (IEEE)-1547 in coordination with the operations of legacy voltage control devices for optimal Volt-VAR control performance. The D-OPF framework can utilize two timescale coordination of control of legacy grid voltage control devices, modes and droop settings of SIs, and active/reactive power dispatch of SIs.

20 Claims, 45 Drawing Sheets

SYSTEMS AND METHODS FOR DISTRIBUTION OPTIMAL POWER FLOW

GOVERNMENT SUPPORT

This invention was made with government support under 1553494 awarded by the National Science Foundation (NSF). The government has certain rights in the invention.

BACKGROUND

The increasing use of grid-tied photovoltaic (PV) systems causes challenges, including those caused by their intermittent nature, which often impacts the feeder voltage. The use of energy storages, switched capacitor banks, dump loads for active power curtailment, smart inverters, and flexible alternating current transmission (FACT) devices (e.g., static synchronous compensators (STATCOMs), static volts amps reactive (VAR) compensators (SVCs)) for reactive power compensation have been used to mitigate these challenges.

For utility-scale PV systems connected to distribution feeders, an increase in the penetration levels of PV systems leads to incessant operation of legacy devices such as substation load tap-changing (LTC) transformers, substation feeder or bus voltage regulators, line voltage regulators, and fixed and switched capacitors. This consequently affects the life span of these devices. Traditionally, LTCs with voltage regulators (VRs) and later capacitors have been used by utility companies for voltage regulation. The LTCs basically switch the tapping of the transformers either up or down to affect the voltage of the feeders within the American National Standards Institute (ANSI) C84.1 standard range. The capacitors are used for reactive power injection, which consequently leads to voltage control.

Prior to the amendment made to the Institute of Electrical and Electronics Engineers (IEEE) 1547a standard in 2014, distributed energy resources (DERs) smart inverters were not permitted to participate in the distribution feeder voltage regulation. With the improvement of smart inverter technologies, the 2014 amendment allows the use of DERs such as PV systems to participate in the voltage regulation with other legacy devices such as on load tap changing (OLTC) and capacitors.

BRIEF SUMMARY

Embodiments of the subject invention provide novel and advantageous systems, methods, and frameworks for distribution grid optimal power flow (D-OPF) to effectively (and/or optimally) find the droop and mode settings of smart inverters (SIs). The droop and mode settings of SIs can be found as per the Institute of Electrical and Electronics Engineers (IEEE)-1547 in coordination with the operations of legacy voltage control devices for optimal Volt-VAR control (VVC; where VAR is Volt Amps Reactive) performance. The D-OPF framework can utilize two timescale coordination of control of legacy grid voltage control devices, modes and droop settings of SIs, and active/reactive power dispatch of SIs. On a first (slower) timescale, a mixed-integer non-linear programming (MINLP) version of D-OPF can provide optimal settings of on-load tap changers (OLTCs), capacitor banks, and modes and droop settings of SIs (e.g., as per the IEEE-1547). On a second (faster) timescale, using the optimal settings obtained from the first D-OPF problem (on the first timescale), the optimal active/reactive power dispatch problem can be solved using a non-linear programming (NLP) model that ensures the set points lie on the droop of the SIs, thereby ensuring implementation feasibility at the local controller level. The D-OPF version where SIs are prioritized can enhance the voltage control using optimal mode and droop settings, while minimizing the number of operations of legacy grid control devices and minimizing the active power curtailment.

In an embodiment, a system for optimizing droop and mode settings of SIs in a power grid comprising the SIs and a plurality of legacy grid voltage control devices can comprise: a processor; and a (non-transitory) machine-readable medium in operable communication with the processor and the power grid, and having instructions stored thereon that, when executed by the processor, perform the following steps: i) providing first input variables to a first D-OPF problem, an objective of the first D-OPF problem being voltage deviation minimization, and the first input variables comprising initial droop and mode settings of the SIs; ii) solving the first D-OPF problem on a first timescale to determine a first set of optimal settings; iii) providing the first set of optimal settings as second input variables to a second D-OPF problem, an objective of the second D-OPF problem being voltage deviation minimization; iv) providing third input variables to the second D-OPF problem, the third input variable comprising active power settings of the SIs and reactive power settings of the SIs; and v) solving the second D-OPF problem on a second timescale to determine a second set of optimal settings. The first set of optimal settings can comprise optimal droop and mode settings of the SIs. The second set of optimal settings can comprise optimal active and reactive power dispatch of the power grid. The first set of optimal settings can further comprise OLTC/voltage regulator (VR) settings and/or capacitor settings. The first timescale can be slower than the second timescale. The mode settings of the SIs can comprise Volt/Watt, Volt/VAR P-priority, Volt/VAR Q-priority, control power factor (CPF) leading, and CPF lagging. The optimal droop and mode settings of the SIs can be optimal settings as per IEEE-1547. The solving of the first D-OPF problem can comprise using an MINLP model. The solving of the second D-OPF problem can comprise using an NLP model. It may be the case that the determining of the optimal droop and mode settings of the SIs are not assigned a priority any higher than the determining of other optimal settings. Alternatively, the determining of the optimal droop and mode settings of the SIs can be assigned highest priority in the solving of the first D-OPF problem. The first input variables can further comprise initial capacitor settings and OLTC/VR settings, and the solving of the first D-OPF problem can comprise: solving the first D-OPF problem a first time using the initial droop and mode settings of the SIs as control variables and an objective of minimizing voltage deviation of a first objective function; solving the first D-OPF problem a second time using the capacitor settings as control variables and an objective of minimizing voltage deviation of a second objective function; and solving the first D-OPF problem a third time using the OLTC/VR settings as control variables and an objective of minimizing voltage deviation of a third objective function.

In another embodiment, a method for optimizing droop and mode settings of SIs in a power grid comprising the SIs and a plurality of legacy grid voltage control devices can comprise: i) providing (e.g., by a processor in operable communication with the power grid) first input variables to a first D-OPF problem, an objective of the first D-OPF problem being voltage deviation minimization, and the first input variables comprising initial droop and mode settings of the SIs; ii) solving (e.g., by the processor) the first D-OPF problem on a first timescale to determine a first set of optimal settings; iii) providing (e.g., by the processor) the first set of optimal settings as second input variables to a second D-OPF problem, an objective of the second D-OPF problem being voltage deviation minimization; iv) providing (e.g., by the processor) third input variables to the second D-OPF problem, the third input variable comprising active power settings of the SIs and reactive power settings of the SIs; and v) solving (e.g., by the processor) the second D-OPF problem on a second timescale to determine a second set of optimal settings. The first set of optimal settings can comprise optimal droop and mode settings of the SIs. The second set of optimal settings can comprise optimal active and reactive power dispatch of the power grid. The first set of optimal settings can further comprise OLTC/VR settings and/or capacitor settings. The first timescale can be slower than the second timescale. The mode settings of the SIs can comprise Volt/Watt, Volt/VAR P-priority, Volt/VAR Q-priority, CPF leading, and CPF lagging. The optimal droop and mode settings of the SIs can be optimal settings as per IEEE-1547. The solving of the first D-OPF problem can comprise using an MINLP model. The solving of the second D-OPF problem can comprise using an NLP model. It may be the case that the determining of the optimal droop and mode settings of the SIs are not assigned a priority any higher than the determining of other optimal settings. Alternatively, the determining of the optimal droop and mode settings of the SIs can be assigned highest priority in the solving of the first D-OPF problem. The first input variables can further comprise initial capacitor settings and OLTC/VR settings, and the solving of the first D-OPF problem can comprise: solving (e.g., by the processor) the first D-OPF problem a first time using the initial droop and mode settings of the SIs as control variables and an objective of minimizing voltage deviation of a first objective function; solving (e.g., by the processor) the first D-OPF problem a second time using the capacitor settings as control variables and an objective of minimizing voltage deviation of a second objective function; and solving (e.g., by the processor) the first D-OPF problem a third time using the OLTC/VR settings as control variables and an objective of minimizing voltage deviation of a third objective function.

BRIEF DESCRIPTION OF DRAWINGS

FIG. 1OF shows a plot of active power (in kW) versus time (in min), showing total active power curtailment for D-OPF-1 and D-OPF-2 on a clear day. The curve with the higher power value at 500 min is for D-OPF-1; and the curve with the lower power value at 500 min is for D-OPF-2.

FIG. 14 shows a table of tap changes and capacitor status for D-OPF-1 and D-OPF-2.

FIG. 15 shows a table of the number of SI mode updates for hours 8-16, using D-OPF-1 and using D-OPF-2, on both a cloudy day and a clear day.

DETAILED DESCRIPTION

Figure 1:
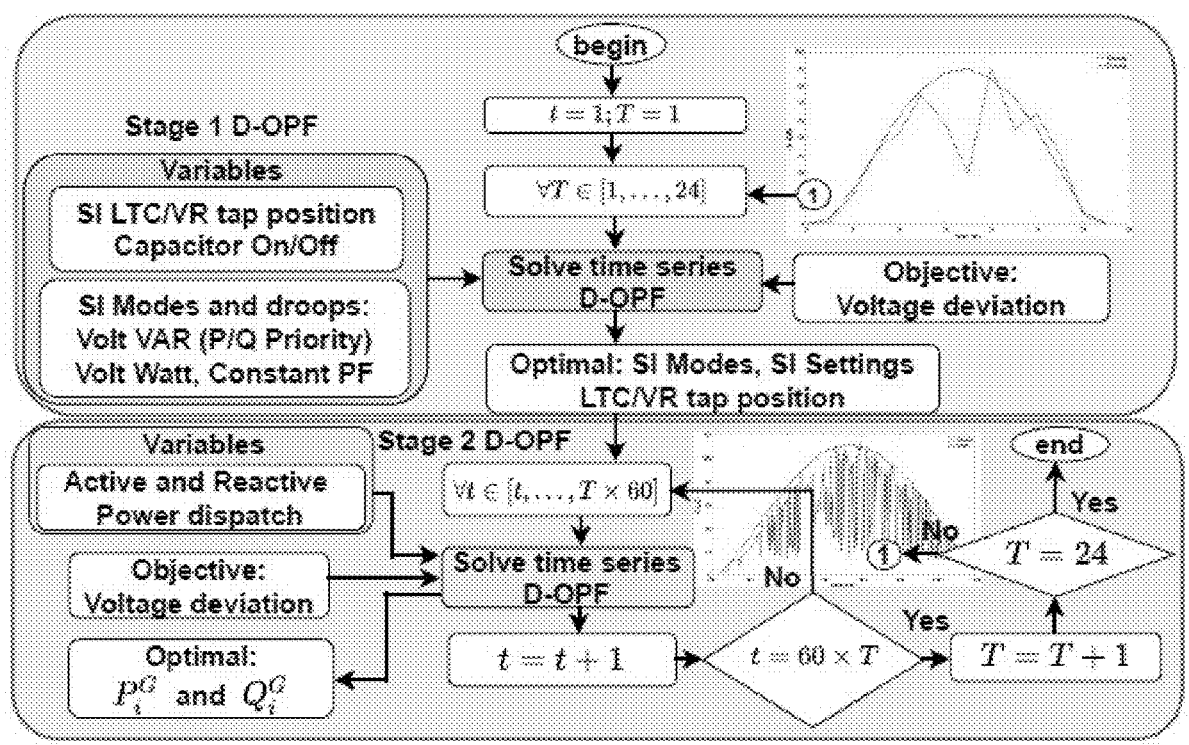
FIG. 1 shows a schematic view of a distribution grid optimal power flow (D-OPF), without smart inverter (SI) priority, according to an embodiment of the subject invention.

Embodiments of the subject invention provide novel and advantageous systems, methods, and frameworks for distribution grid optimal power flow (D-OPF) to effectively (and/or optimally) find the droop and mode settings of smart inverters (SIs). The droop and mode settings of SIs can be found as per the Institute of Electrical and Electronics Engineers (IEEE)-1547 in coordination with the operations of legacy voltage control devices for optimal Volt-VAR control (VVC; where VAR is Volt Amps Reactive) performance. The D-OPF framework can utilize two timescale coordination of control of legacy grid voltage control devices, modes and droop settings of SIs, and active/reactive power dispatch of SIs. On a first (slower) timescale, a mixed-integer non-linear programming (MINLP) version of D-OPF can provide optimal settings of on-load tap changers (OLTCs), capacitor banks, and modes and droop settings of SIs (e.g., as per the IEEE-1547). On a second (faster) timescale, using the optimal settings obtained from the first D-OPF problem (on the first timescale), the optimal active/reactive power dispatch problem can be solved using a non-linear programming (NLP) model that ensures the set points lie on the droop of the SIs, thereby ensuring implementation feasibility at the local controller level. The D-OPF version where SIs are prioritized can enhance the voltage control using optimal mode and droop settings, while minimizing the number of operations of legacy grid control devices and minimizing the active power curtailment.

In an embodiment, a two-stage D-OPF model can coordinate the two timescale control of SIs and legacy grid control devices. At the slower timescale, D-OPF can determine the optimal status of capacitors (CAPS), OLTC taps, and optimal SI modes and droops. At the faster timescale, the D-OPF can determine the optimal active/reactive power of SIs that lie on the optimal droops. In contrast to the related art methods, embodiments of the subject invention can for the first time combine the SI mode and droop selection decision variables with the model of legacy control devices in a D-OPF framework. The systems and methods of embodiments of the subject invention can also ensure that the inverter dispatch solutions obtained from D-OPF models lie exactly on the local droops of the SIs as per IEEE-1547 guidelines, which is a significant improvement over related art methods, in which SI dispatch may not lie on the local droop settings leading to non-compliance with the IEEE-1547 (and therefore limiting the practical implementation of such related art methods).

Volt-VAR optimization (VVO) control can be done at two levels in a distribution network. The first level is a centralized VVO (or network-based VVO), and this level of VVO is done at a centralized location that is integrated in the distribution management system (DMS). The main challenge of this system is the ability to process large data and provide VVO solutions in real or quasi-real time. The decentralized level allows VVO to be done on devices located on feeders. Embodiments of the subject invention utilize or be based on VVO at a decentralized level. The optimal control of these three devices is very important for smooth and economic operation of the whole system. Because these three devices have the capacity of adjusting the voltage profile of the feeders differently, there is a need for optimal coordination within these three devices.

Figure 2:
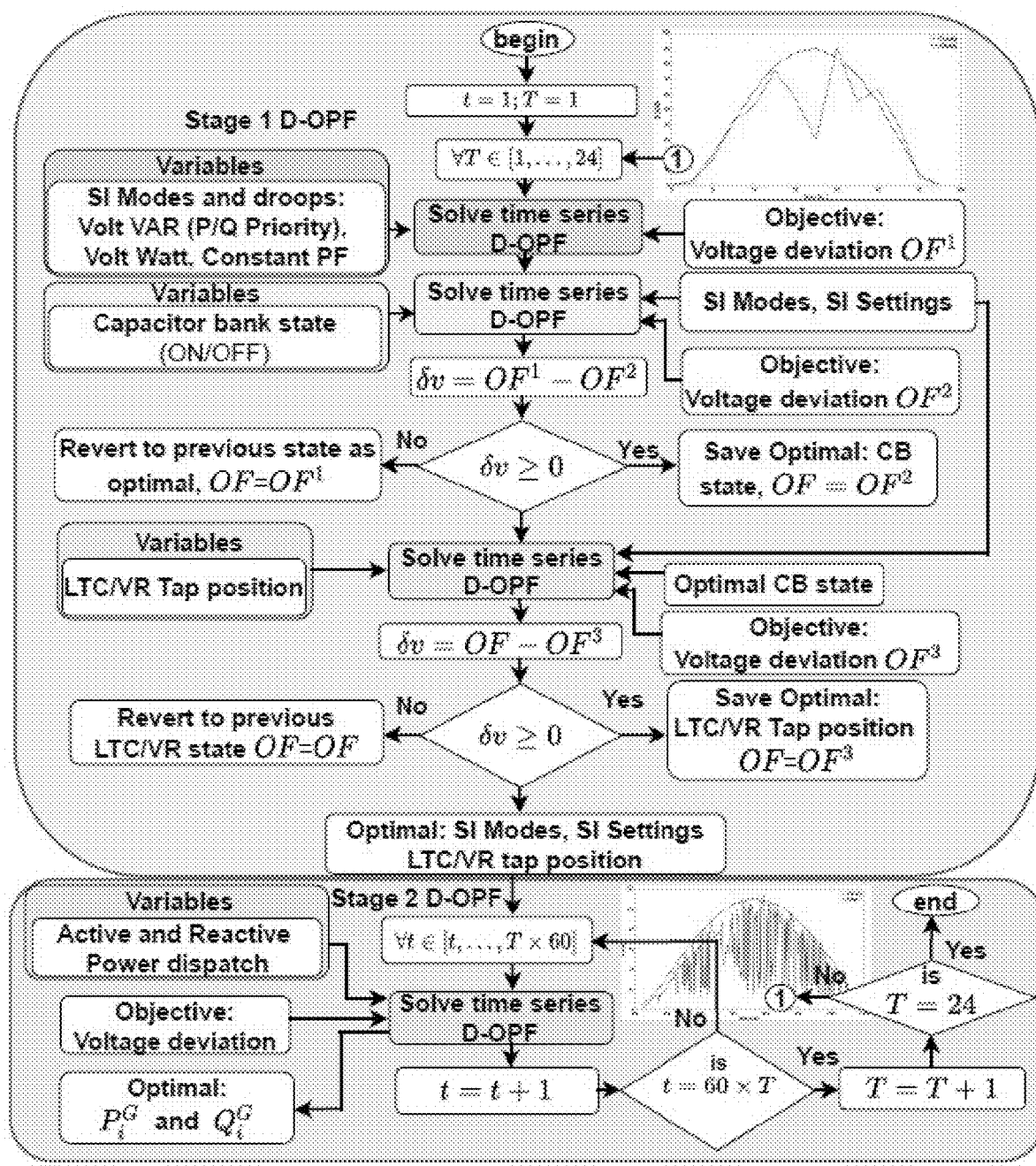
FIG. 2 shows a schematic view of a D-OPF, with SI prioritized, according to an embodiment of the subject invention.

Embodiments of the subject invention provide a two-stage D-OPF formulation for voltage optimization that uses five smart inverter (SI) modes, namely volt/watt, volt/VAR (P-priority), Volt/VAR (Q-priority), and constant power factor (CPF) (leading and lagging) in coordination with control of on-load tap changers (OLTCs) and capacitors (CAPS). Two different coordination methods of the two-stage D-OPF models can be used, depending on whether the algorithm leverages more SI control than legacy grid devices, and these can be referred to as D-OPF-1 and D-OPF-2, respectively. FIG. 1 shows a schematic view of D-OPF-1 (without SI priority), and FIG. 2 shows a schematic view of D-OPF-2 (with SI prioritized).

In D-OPF-1, the control variables of the first stage D-OPF are the five modes of the SIs, the breakpoints of the SI droop based on the modes, the power factor (PF) values (for SI CPF mode), and the OLTC/voltage regulator (VR) settings and the CAPS status. Here, the SIs are not emphasized more than legacy grid devices for the control efforts. The algorithm starts by solving a one-hour resolution D-OPF using the defined first-stage control variables with the objective function being to flatten the voltage profile. The results of the first-stage ($SIM_i^{opt}$, $SIS_i^{opt}$, $tc^{opt}$, and $tp_i^{opt}$) are passed to the second stage D-OPF. The second stage D-OPF is solved using the values of $SIM_i^{opt}$, $SIS_i^{opt}$, $tc^{opt}$, and $tp_i^{opt}$ with the active power and reactive power setpoint of SIs as the optimization control variables at a one-minute resolution. Using the hourly optimal values for the first-stage D-OPF, the second stage is solved 60 times, after which the first-stage D-OPF is solved again for the next hour.

In order to reduce the quantity of D-OPF-1 control variables solved at one go (to improve computational efficiency, minimize operations of legacy grid devices, and emphasize SI control over the legacy grid devices) in the first stage D-OPF, the D-OPF-2 control variables are solved sequentially. In this approach (as shown in FIG. 2), the optimal modes and settings of the SI are of the highest priority. Within the stage-1 of D-OPF-1, a first D-OPF is solved to determine $SIM_i^{opt}$ and $SIS_i^{opt}$. This is done to allow the SI to actively carry out the voltage regulation to its maximum capacity. Afterwards, the values of $SIM_i^{opt}$ and $SIS_i^{opt}$ are passed to the second D-OPF problem in stage 1, while the CAPS status to is set as the optimization control variable. Then, the values of $SIM_i^{opt}$, $SIS_i^{opt}$, and $tc_i^{opt}$ are passed to the third D-OPF problem in stage 1 while the tap position $tp_i$, is set as the control variable. The value of the newest voltage deviation objective is computed and compared to the voltage deviation objective obtained from the updated second D-OPF. If the latter is lesser, the new optimal value of $tp_i^{opt}$ is saved, and otherwise, the tap position $tp_i^{opt}$ is reverted to its previous tap position. The updated objective function is set as the lower value. The updated values of $SIM_i^{opt}$, $SIS_i^{opt}$, $tc_i^{opt}$, and $tp_i^{out}$ are passed to the stage-2 of D-OPF-2. As described in the D-OPF-1 algorithm, a high resolution D-OPF (one-minute) is solved to optimally dispatch the active and reactive power of the PVs.

Embodiments of the subject invention provide D-OPF frameworks, systems, and methods to optimally dispatch the mode (Volt/Watt, Volt/VAR P-priority, Volt/VAR Q-priority, CPF leading, and CPF lagging) and droop settings of SIs as per the IEEE-1547. Because the SIs are capable of operating at a fast timescale, the problem can be decoupled into two timescale problems to coordinate the dispatch of a legacy grid controller, the droops and mode selections of the SIs, and the active/reactive power setpoints of the SIs. Two versions of the D-OPF framework are presented and can be used depending on whether more control efforts are put towards SIs compared to the legacy grid devices. The first version of the D-OPF (D-OPF-1) allows the SI mode, SI settings, OLTC tap position, and capacitor bank status to be optimally determined on an hourly basis while the optimal active and reactive power is dispatched on one-minute basis. The second version of the D-OPF (D-OPF-2) attributes the highest priority of voltage control to the SI. Both D-OPF versions presented herein can effectively and optimally set the droop and mode of SIs in coordination with legacy grid control devices for optimal VVC performance (see also Examples 1-4).

Embodiments of the subject invention provide a focused technical solution to the focused technical problem of how to determine optimal droop and mode settings of SIs and/or optimal VVC performance in a power grid. This leads to improved performance of the power grid by optimizing the VVC performance and/or the SI settings (e.g., the droop and mode settings of SIs). Embodiments of the subject invention also improve the computer system on which the algorithms are running because the optimal settings can be determined in an efficient manner, thereby conserving computing resources.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

MATERIALS AND METHODS

Figure 3:
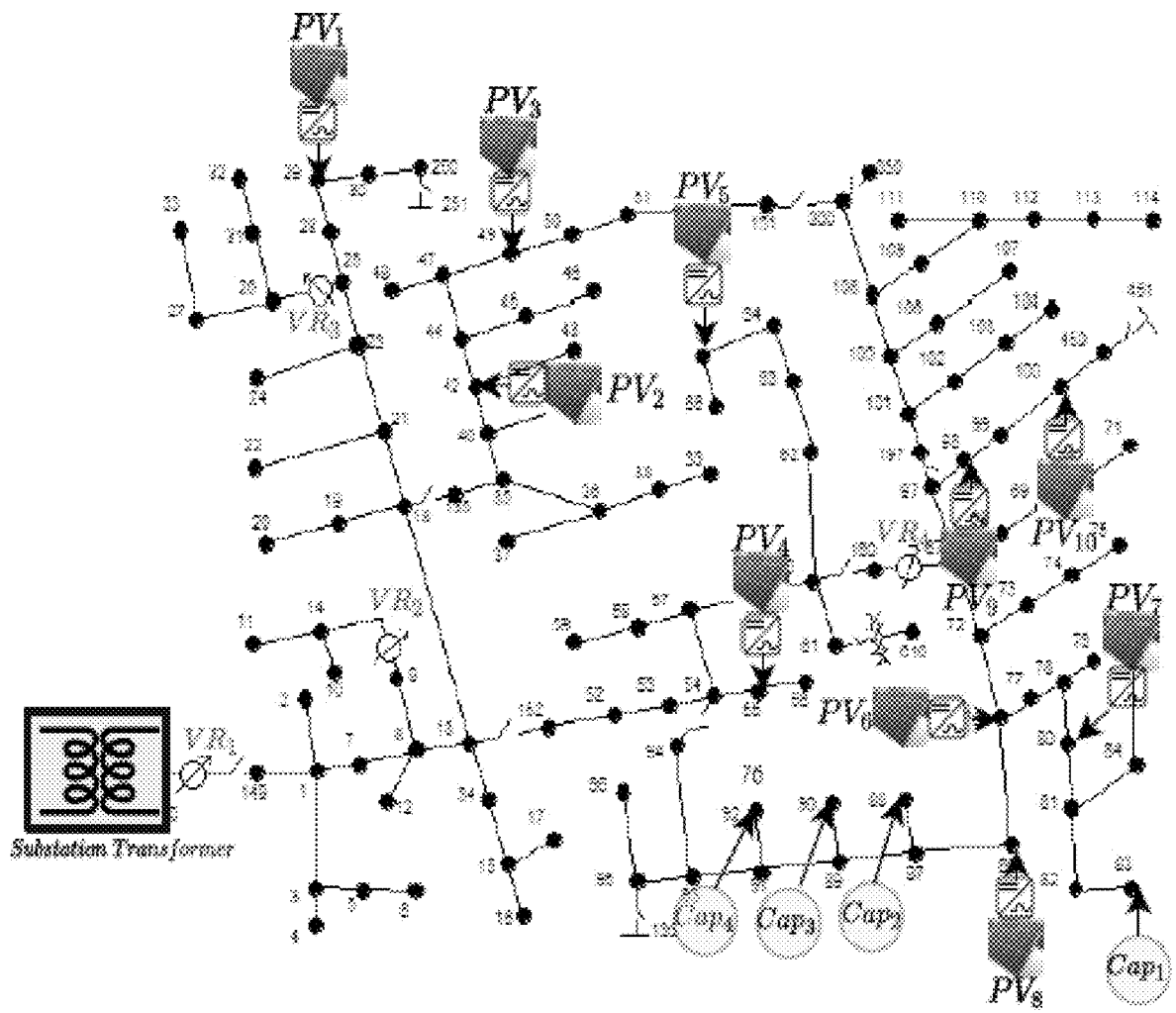
FIG. 3 shows a schematic view of an Institute of Electrical and Electronics Engineers (IEEE) 123 test node system with ten photovoltaic (PV) devices integrated.

In order to validate the effectiveness of the D-OPF models of embodiments of the subject invention, the IEEE 123-node system with modifications, as shown in FIG. 3, was used. The IEEE 123-node test feeder has a nominal voltage of 4.16 kilovolts (kV) with four voltage regulators ($VR_1$, $VR_2$, $VR_3$, and $VR_4$) and four capacitors ($Cap_1$, $Cap_2$, $Cap_3$, and $Cap_4$). The capacitors include one 600 kilo VAR (kVAR) three-phase and three 50 kVAR single-phase. Ten units of PV systems rated at 100 kilowatts (kW) were integrated into the feeder. The SIs of the PVs were sized at 125% of the maximum direct current (DC) capacity of the PVs. For the Volt/VAR (P-priority), the maximum $Q^{pv}_i = [\sqrt{1.25^2 - 1^2}]/1.25] = 0.6$, while for the Volt/VAR (Q-priority), the maximum $Q^{pv}_i \leq S^{SI}_i$. It is worthy of note that in the Volt/VAR (Q-priority) mode, the SI is allowed to curtail the active power as much as required by the setting $Q^{pv}_i \leq S^{SI}_i$. Each SI is allowed to take five modes (set as variables in stage-1), which include: Volt/Watt, Volt/VAR P-priority, Volt/VAR Q-priority, CPF leading, and CPF lagging. The simulation was done for both cloudy day PV generation and clear day PV generation. An hourly PV generation profile was used to dispatch the optimal OLTC, CAPS status, and SI modes and settings while the one-minute resolution PV generation profile was used for the dispatch of the active power and the reactive power of the SIs. The first stage mixed-integer non-linear programming D-OPF formulation was solved using the OPTI optimization toolbox in MATLAB (see also "Opti toolbox probs/mixed integer nonlinear program (minlp)," inverseproblem.co.nz/OPTI/index.php/Probs/MINLP, which is hereby incorporated by reference herein in its entirety), while the second stage non-linear programming (NLP) problem was modeled and solved using "fmincon" in MATLAB with a sequential quadratic programming (SQP) algorithm. The simulation was run on a computing machine with an Intel® Core i5-7400 @ 3.0 gigahertz (GHz) processor and 24 gigabytes (GB) of random access memory (RAM).

Example 1-Optimal Tap Positions and CAPS Status

Figure 4A:
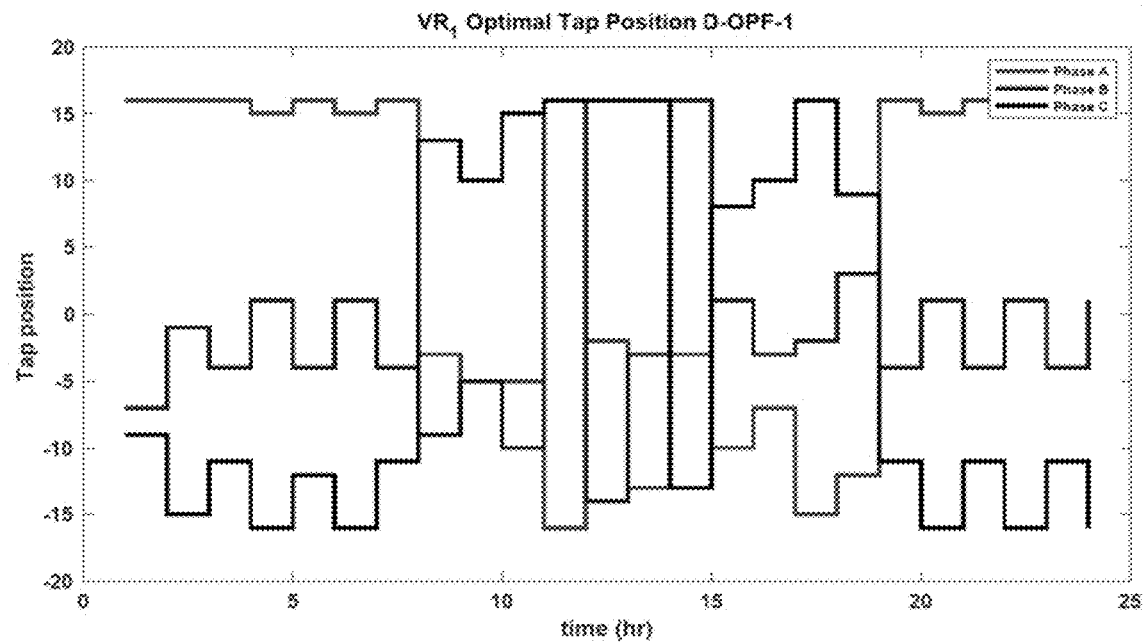
FIG. 4A shows a plot of optimal tap position on a cloudy day versus time (in hours (hr)) for a first D-OPF ("D-OPF-1") and for a first voltage regulator (VR; "$VR_1$"). The curve with the highest tap position at 5 hr is for phase A; the curve with the second-highest tap position at 5 hr is for phase B; and the curve with the lowest tap position at 5 hr is for phase C.
Figure 4B:
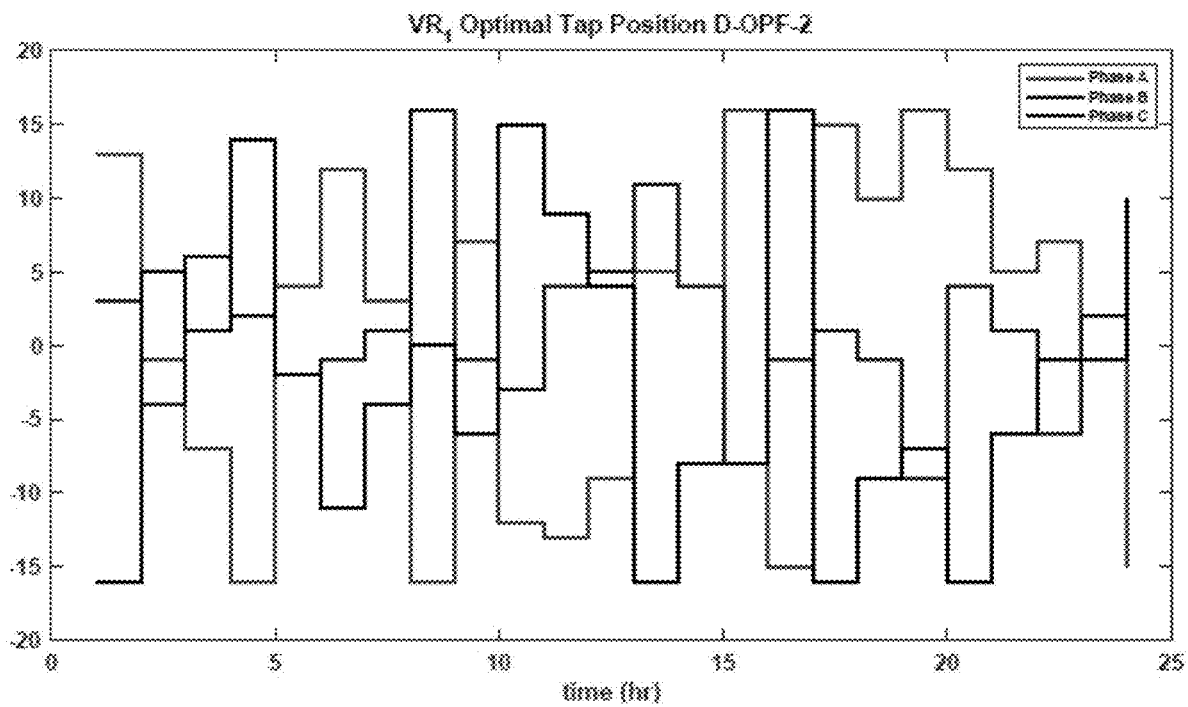
FIG. 4B shows a plot of optimal tap position on a cloudy day versus time (in hr) for a second D-OPF ("D-OPF-2") and for $VR_1$. The curve with the highest tap position at 1 hr is for phase A; the curve with the second-highest tap position at 1 hr is for phase B; and the curve with the lowest tap position at 1hr is for phase C.
Figure 4C:
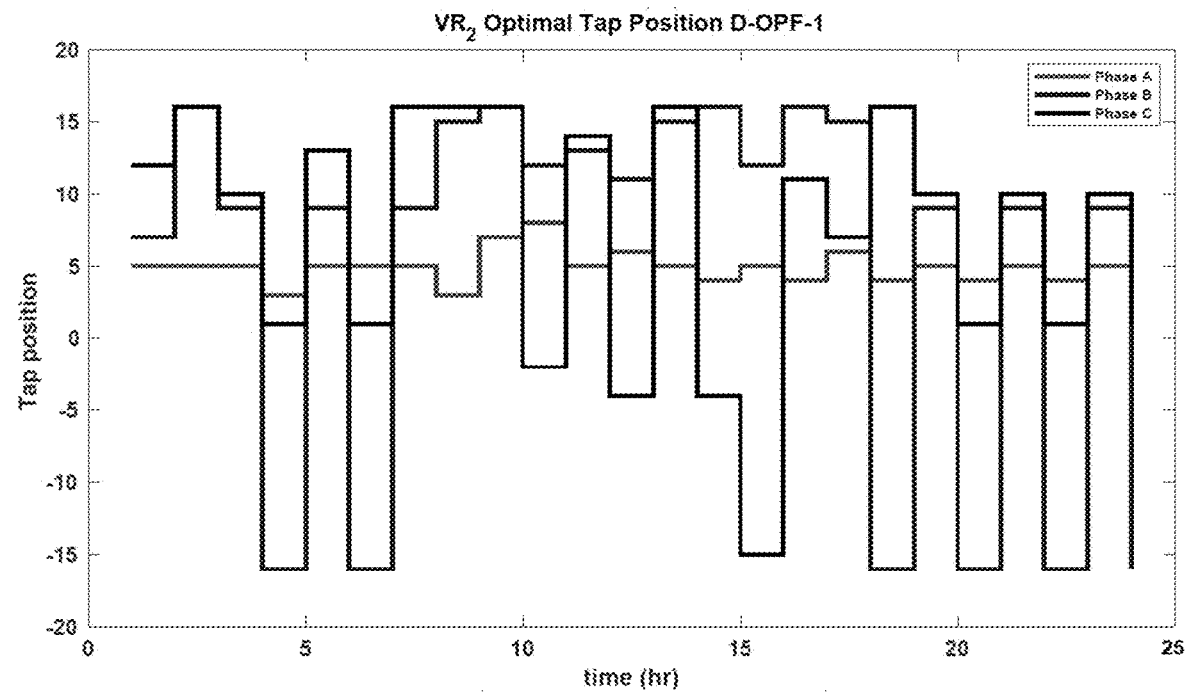
FIG. 4C shows a plot of optimal tap position on a cloudy day versus time (in hr) for D-OPF-1 and for a second VR ("$VR_2$"). The curve with the highest tap position at 1 hr is for phase C; the curve with the second-highest tap position at 1 hr is for phase B; and the curve with the lowest tap position at 1 hr is for phase A.
Figure 4D:
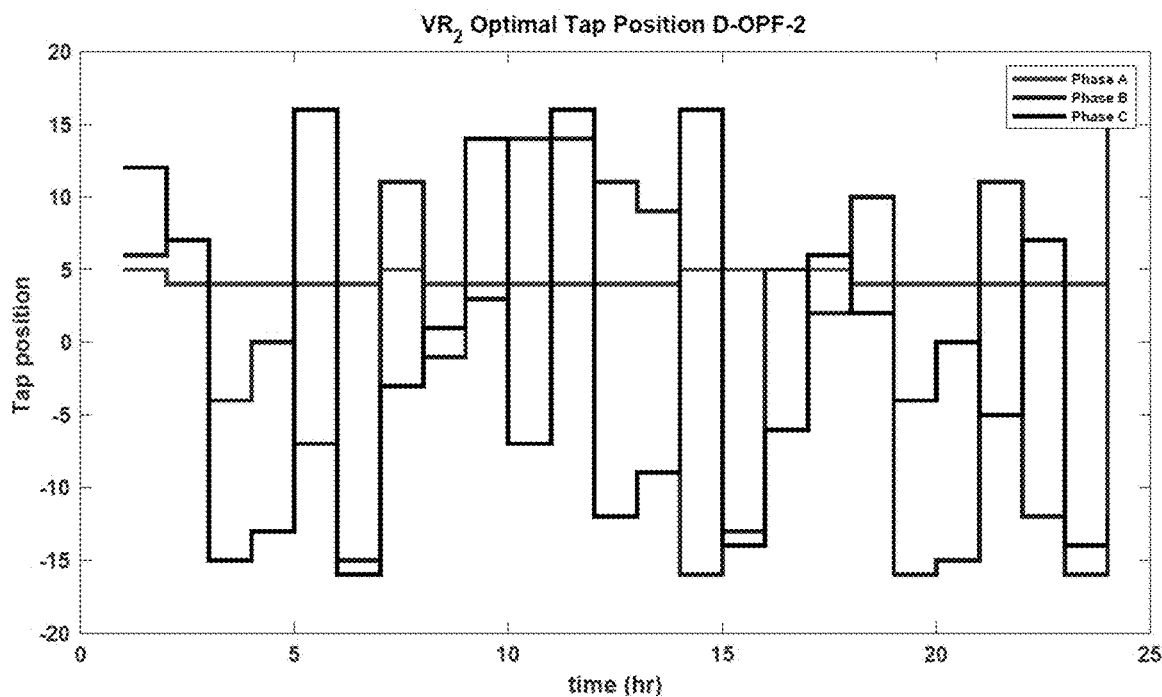
FIG. 4D shows a plot of optimal tap position on a cloudy day versus time (in hr) for a first D-OPF-2 and for $VR_2$. The curve with the highest tap position at 1 hr is for phase C; the curve with the second-highest tap position at 1 hr is for phase B; and the curve with the lowest tap position at 1 hr is for phase A.
Figure 4E:
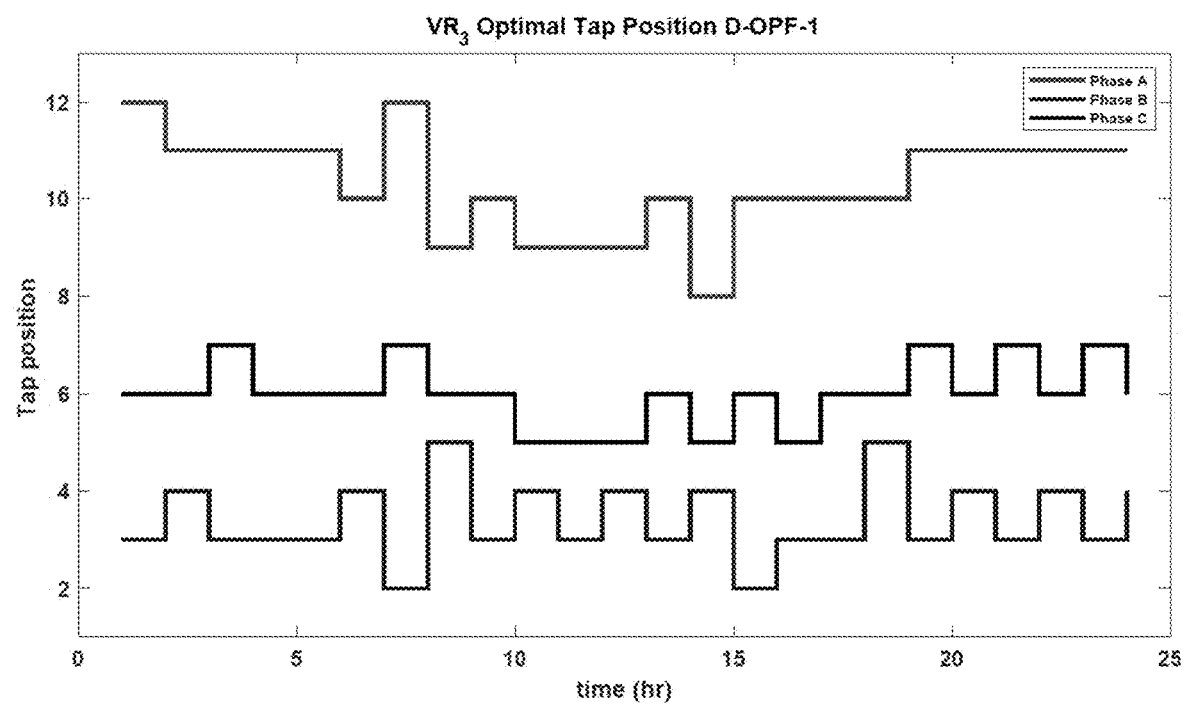
FIG. 4E shows a plot of optimal tap position on a cloudy day versus time (in hr) for D-OPF-1 and for a third VR ("$VR_3$"). The curve with the highest tap position at 5 hr is for phase A; the curve with the second-highest tap position at 5 hr is for phase C; and the curve with the lowest tap position at 5 hr is for phase B.
Figure 4F:
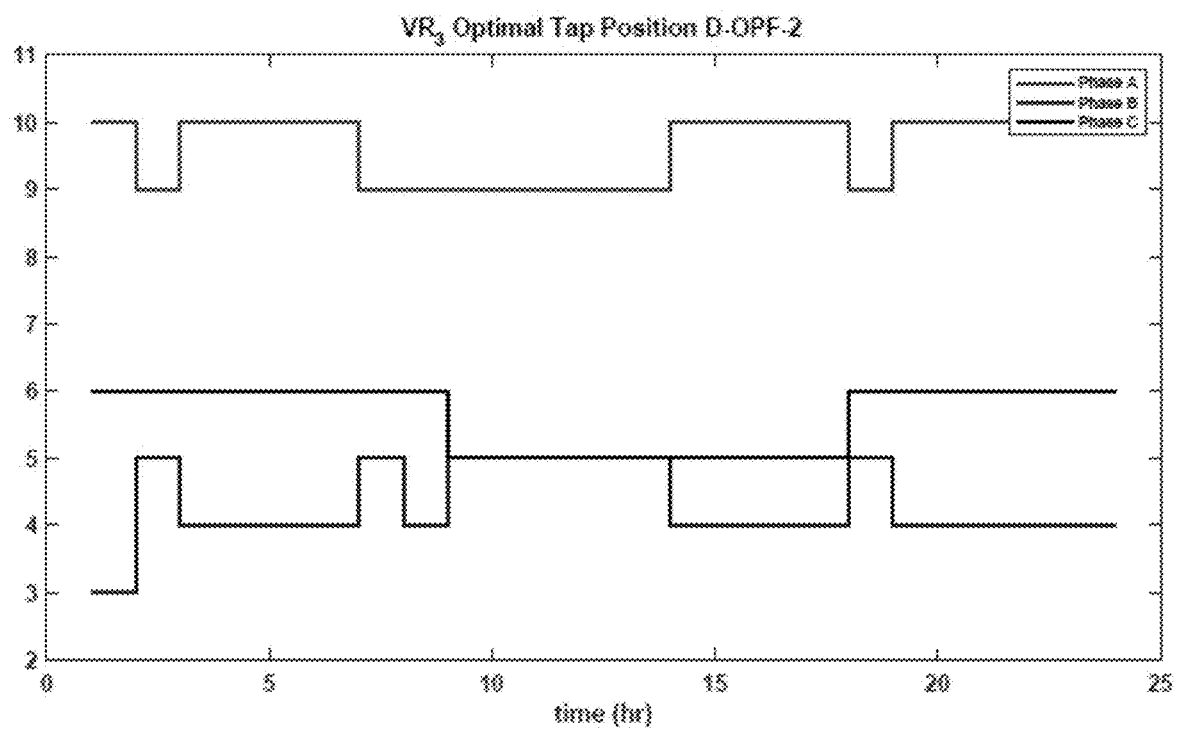
FIG. 4F shows a plot of optimal tap position on a cloudy day versus time (in hr) for D-OPF-2 and for $VR_3$. The curve with the highest tap position at 5 hr is for phase A; the curve with the second-highest tap position at 5 hr is for phase C; and the curve with the lowest tap position at 5 hr is for phase B.
Figure 4G:
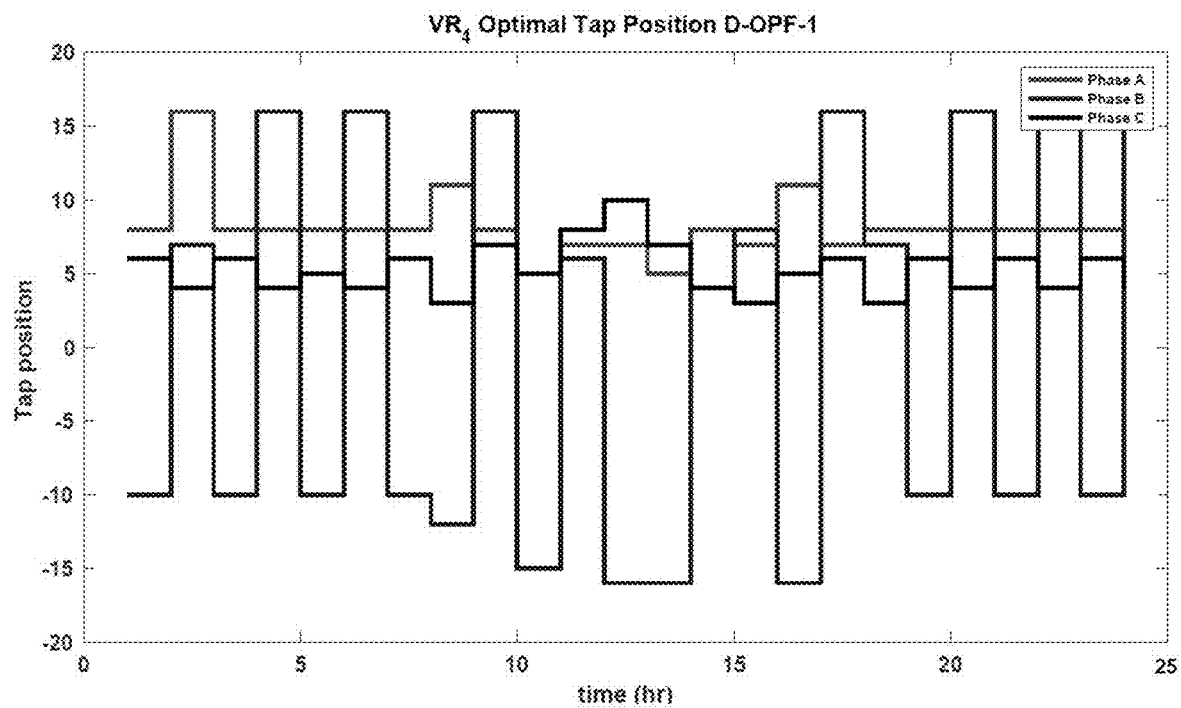
FIG. 4G shows a plot of optimal tap position on a cloudy day versus time (in hr) for D-OPF-1 and for a fourth VR ("$VR_4$"). The curve with the highest tap position at 1 hr is for phase A; the curve with the second-highest tap position at 1 hr is for phase C; and the curve with the lowest tap position at 1 hr is for phase B.
Figure 4H:
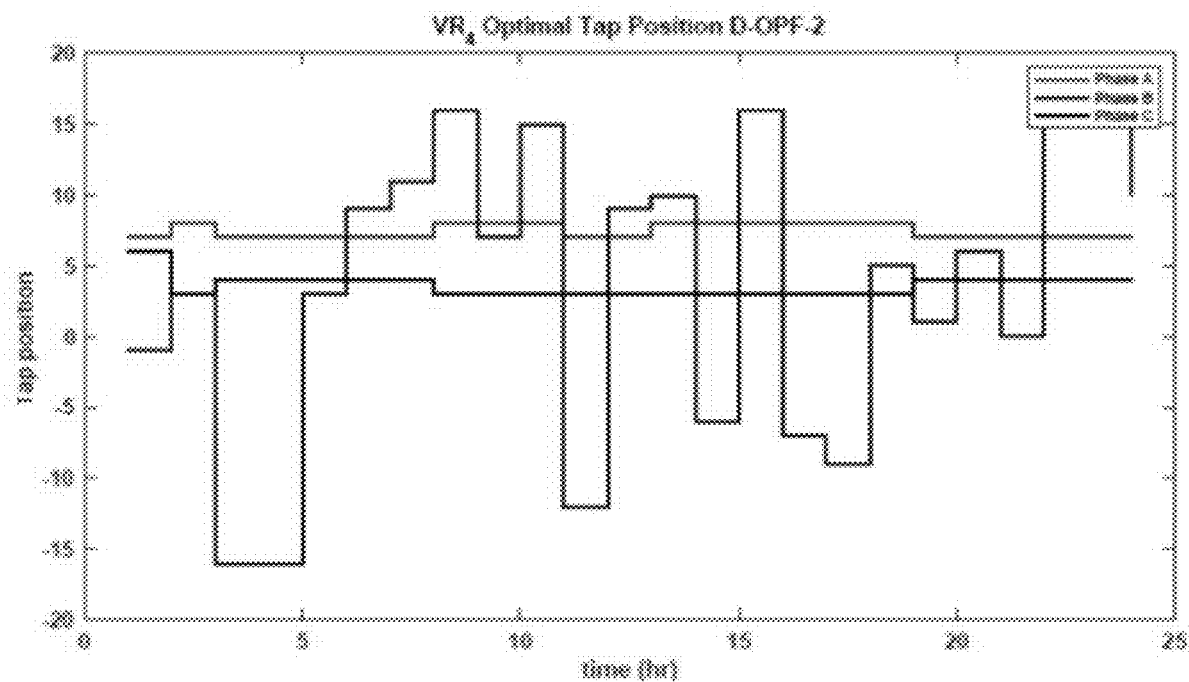
FIG. 4H shows a plot of optimal tap position on a cloudy day versus time (in hr) for D-OPF-2 and for $VR_4$. The curve with the highest tap position at 5 hr is for phase A; the curve with the second-highest tap position at 5 hr is for phase C; and the curve with the lowest tap position at 5 hr is for phase B.
Figure 5A:
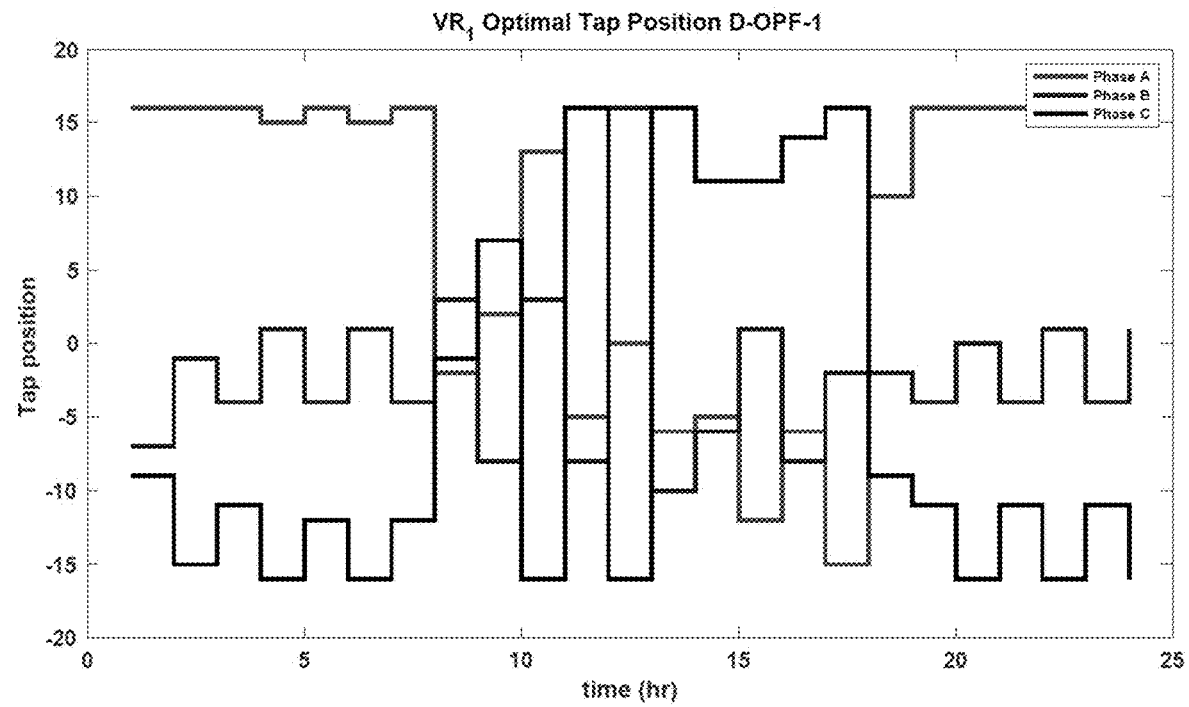
FIG. 5A shows a plot of optimal tap position on a clear day versus time (in hr) for a first D-OPF ("D-OPF-1") and for a first voltage regulator (VR; "$VR_1$"). The curve with the highest tap position at 5 hr is for phase A; the curve with the second-highest tap position at 5 hr is for phase B; and the curve with the lowest tap position at 5 hr is for phase C.
Figure 5B:
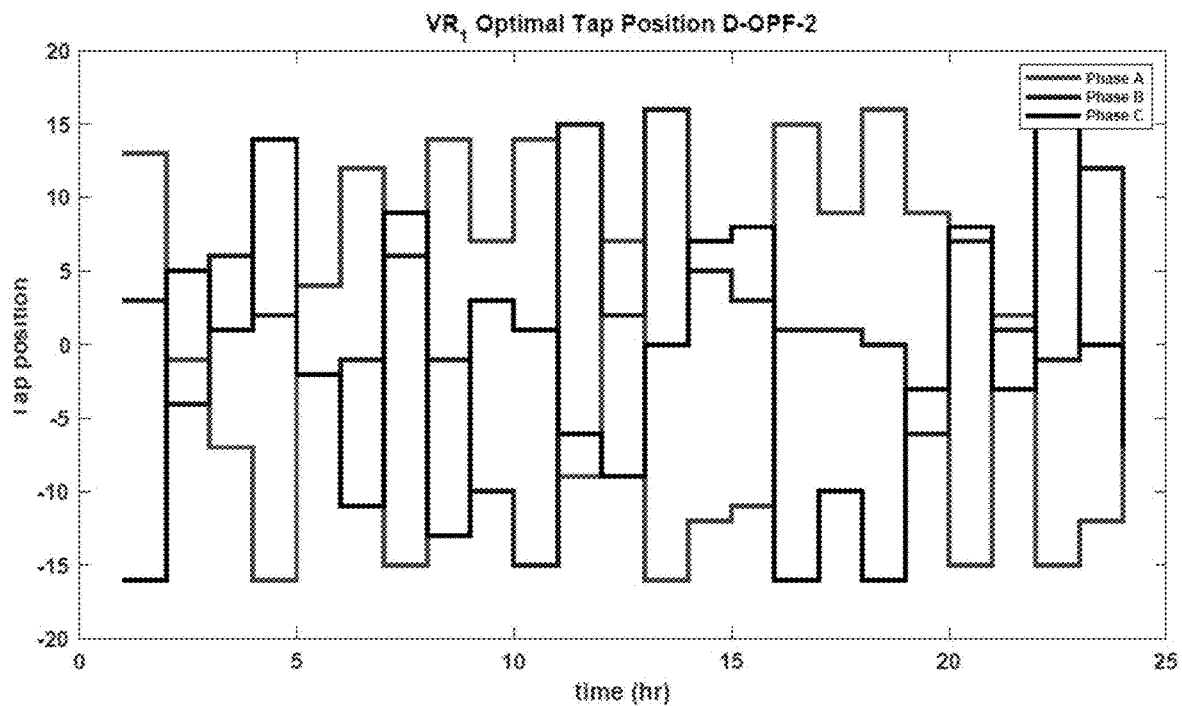
FIG. 5B shows a plot of optimal tap position on a clear day versus time (in hr) for a second D-OPF ("D-OPF-2") and for $VR_1$. The curve with the highest tap position at $_1$ hr is for phase A; the curve with the second-highest tap position at 1 hr is for phase B; and the curve with the lowest tap position at 1 hr is for phase C.
Figure 5C:
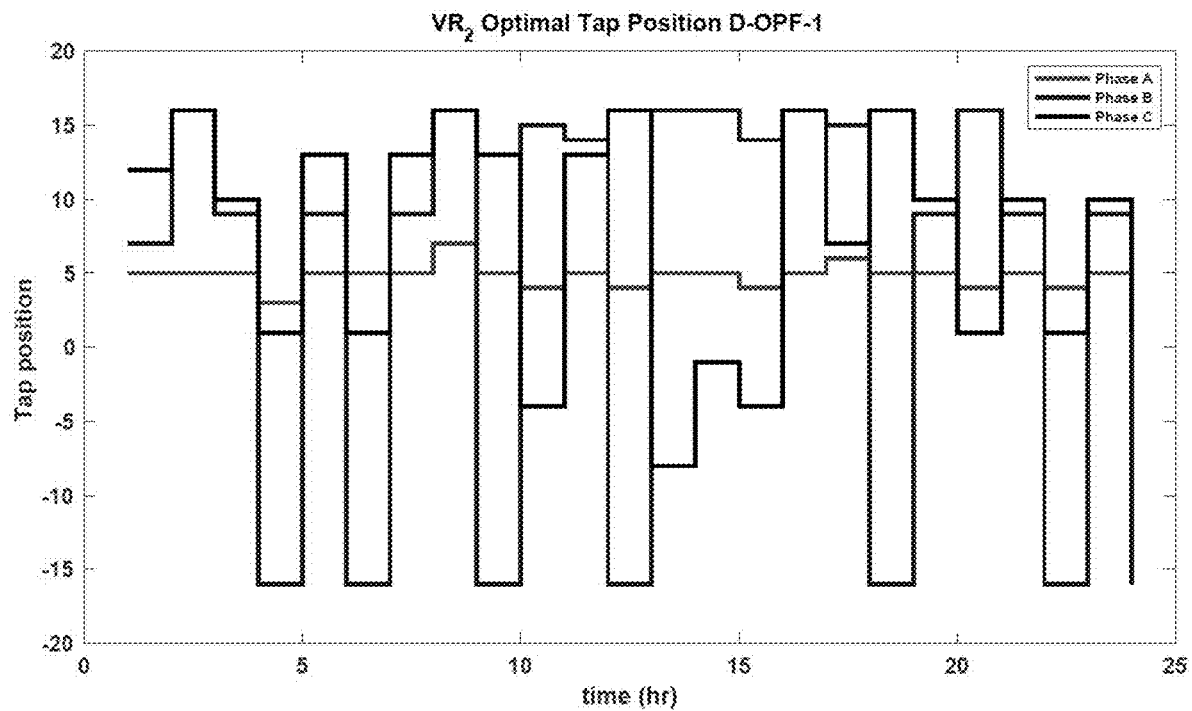
FIG. 5C shows a plot of optimal tap position on a clear day versus time (in hr) for D-OPF-1 and for a second VR ("$VR_2$"). The curve with the highest tap position at 1 hr is for phase C; the curve with the second-highest tap position at 1 hr is for phase B; and the curve with the lowest tap position at 1 hr is for phase A.
Figure 5D:
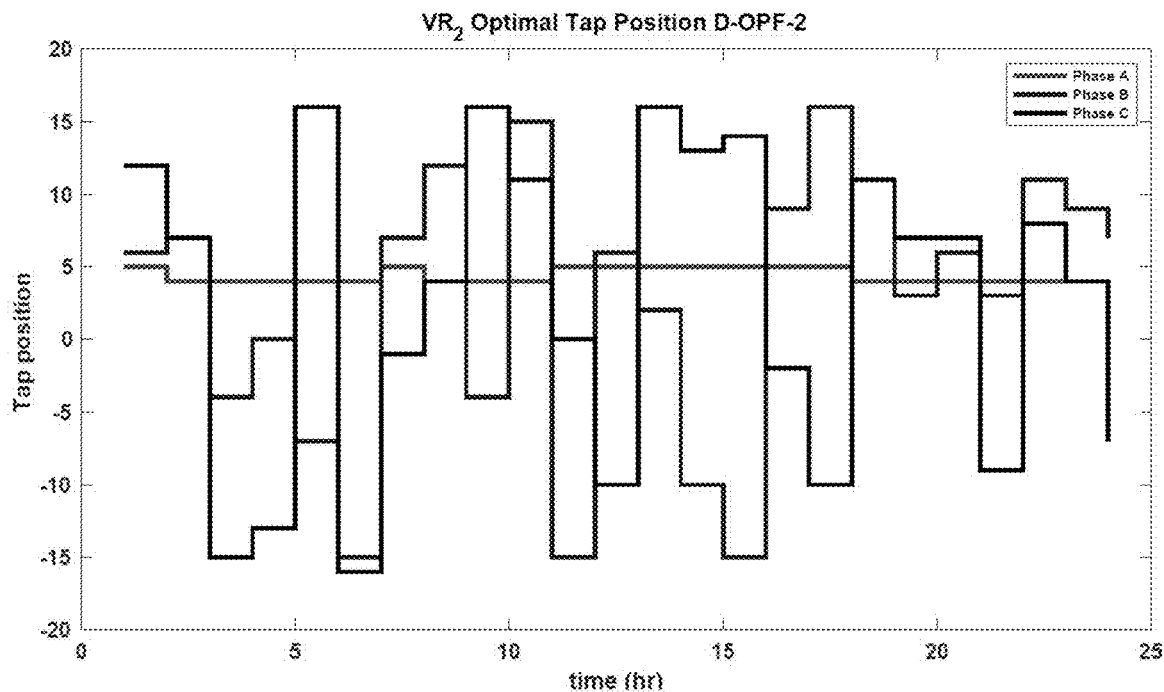
FIG. 5D shows a plot of optimal tap position on a clear day versus time (in hr) for a first D-OPF-2 and for $VR_2$. The curve with the highest tap position at 1 hr is for phase C; the curve with the second-highest tap position at 1 hr is for phase B; and the curve with the lowest tap position at 1 hr is for phase A.
Figure 5E:
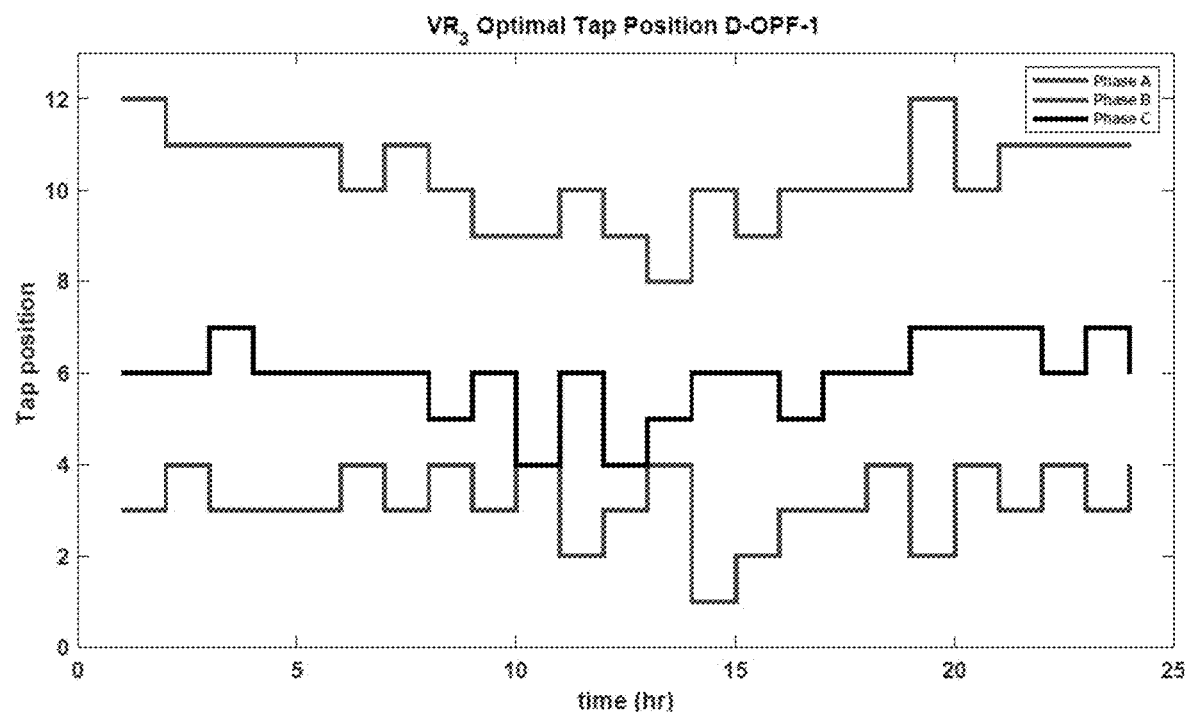
FIG. 5E shows a plot of optimal tap position on a clear day versus time (in hr) for D-OPF-1 and for a third VR ("$VR_3$"). The curve with the highest tap position at 5 hr is for phase A; the curve with the second-highest tap position at 5 hr is for phase C; and the curve with the lowest tap position at 5 hr is for phase B.
Figure 5F:
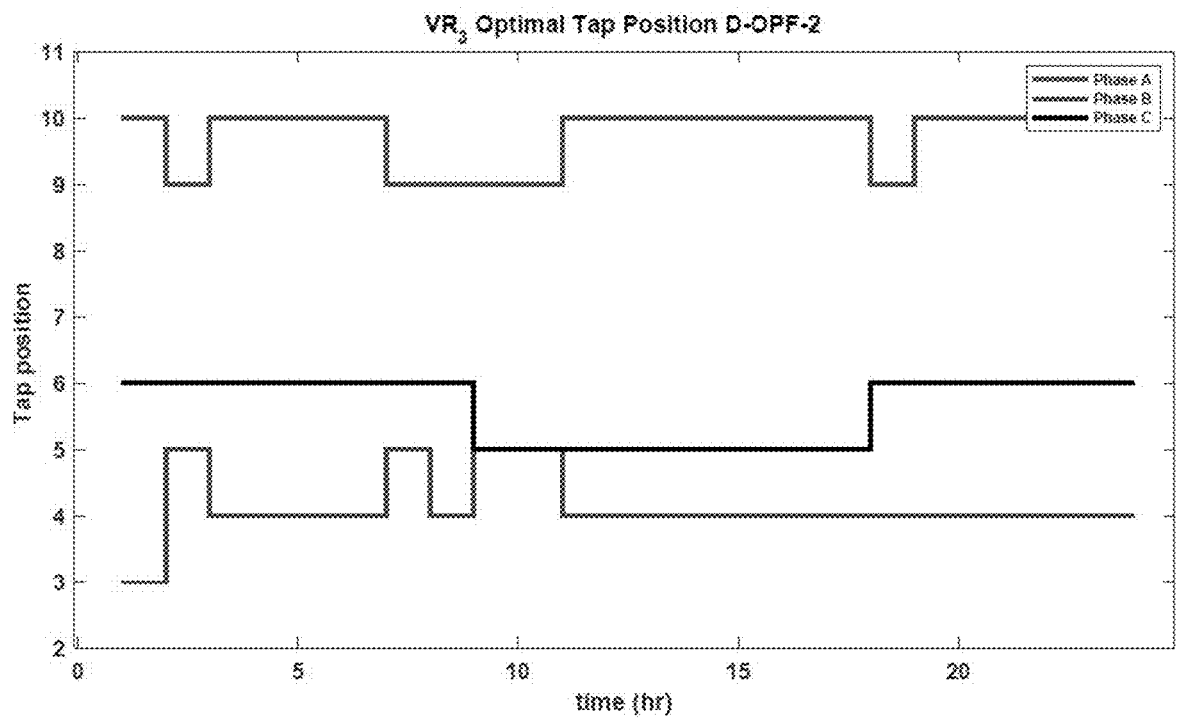
FIG. 5F shows a plot of optimal tap position on a clear day versus time (in hr) for D-OPF-2 and for $VR_3$. The curve with the highest tap position at 5 hr is for phase A; the curve with the second-highest tap position at 5 hr is for phase C; and the curve with the lowest tap position at 5 hr is for phase B.
Figure 5G:
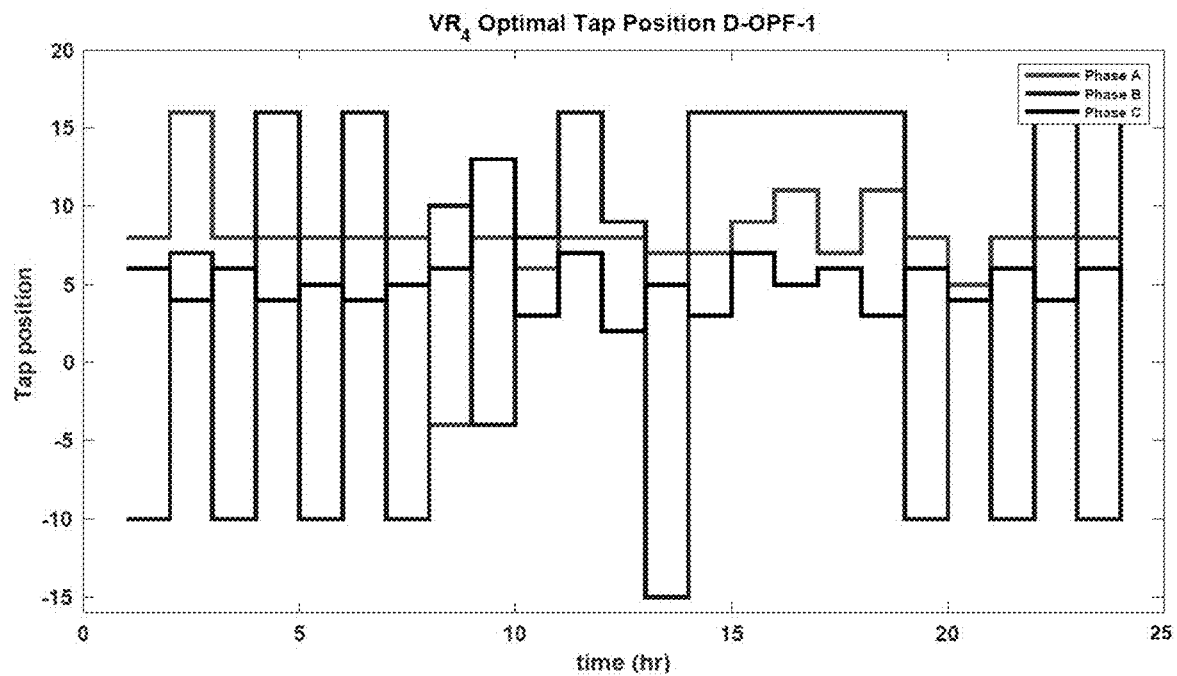
FIG. 5G shows a plot of optimal tap position on a clear day versus time (in hr) for D-OPF-1 and for a fourth VR ("$VR_4$"). The curve with the highest tap position at 1 hr is for phase A; the curve with the second-highest tap position at 1 hr is for phase C; and the curve with the lowest tap position at 1 hr is for phase B.
Figure 5H:
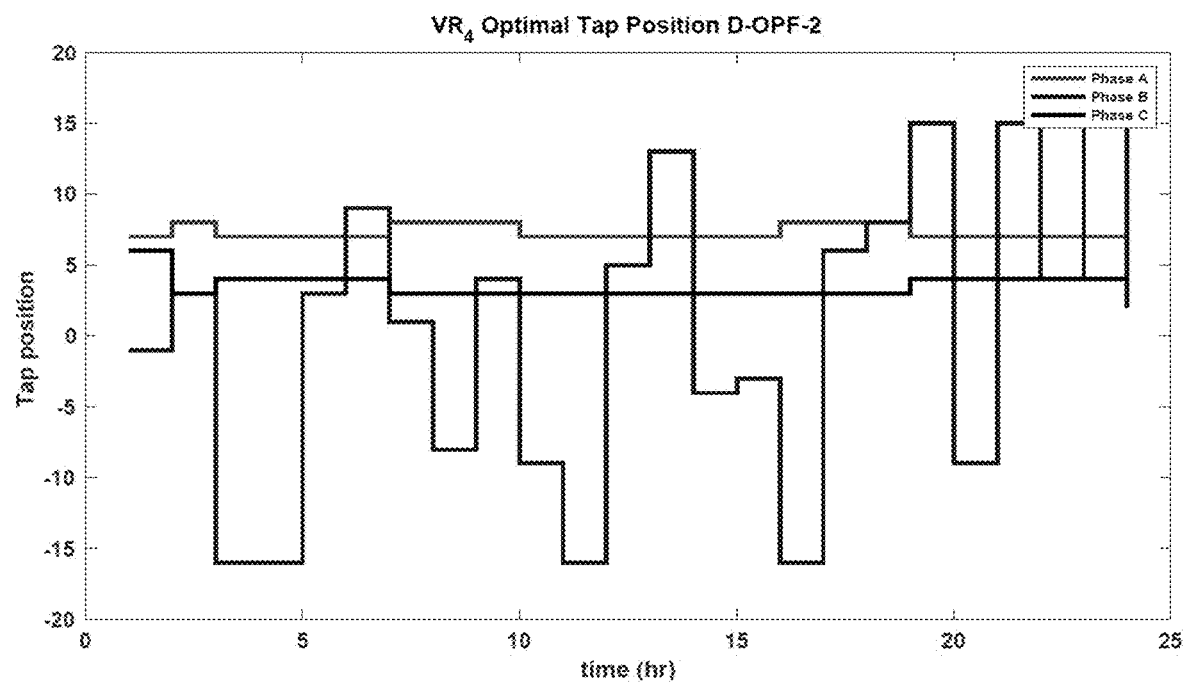
FIG. 5H shows a plot of optimal tap position on a clear day versus time (in hr) for D-OPF-2 and for $VR_4$. The curve with the highest tap position at 5 hr is for phase A; the curve with the second-highest tap position at 5 hr is for phase C; and the curve with the lowest tap position at 5 hr is for phase B.
Figures 14, 15:
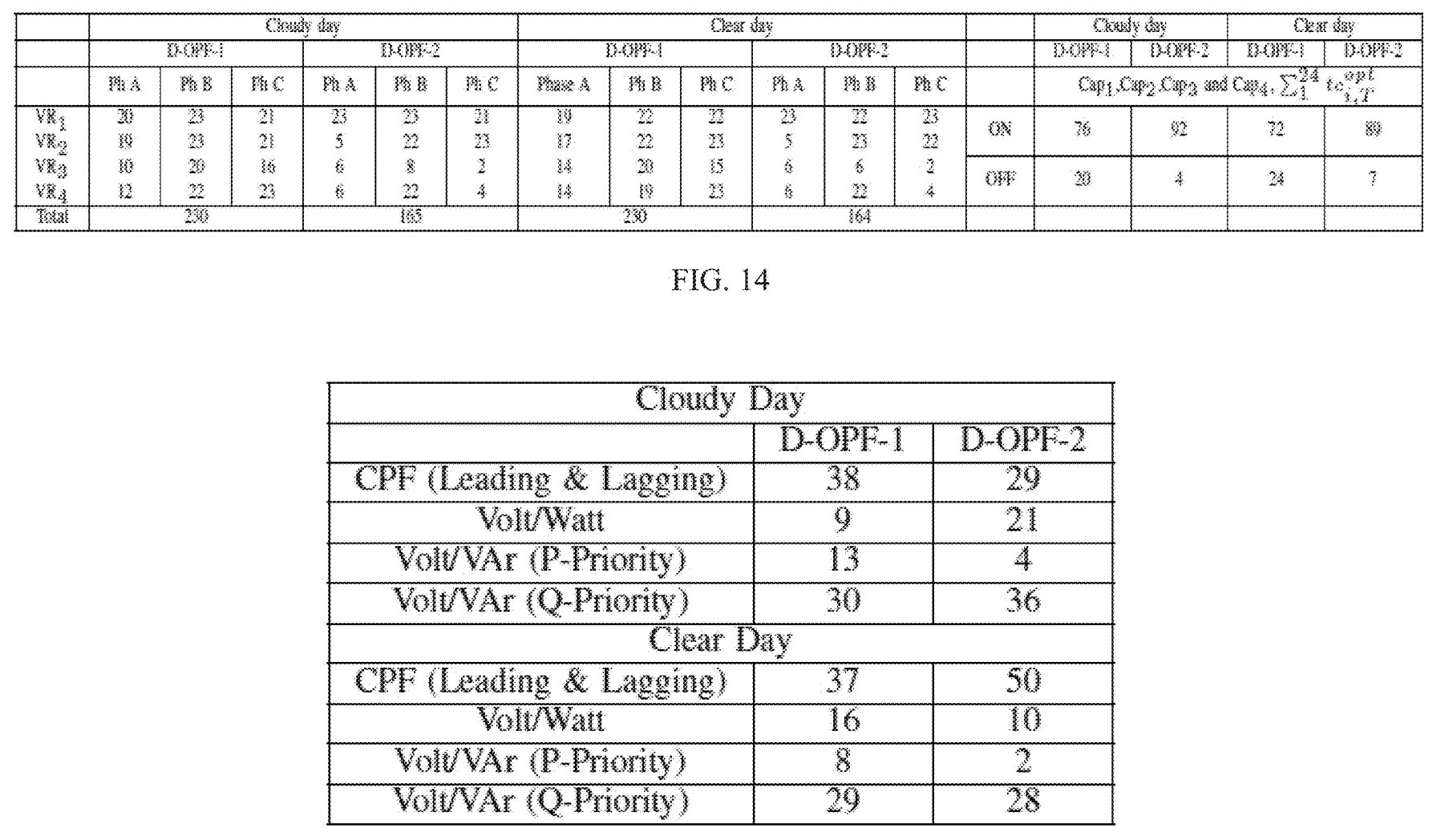

The optimal tap positions using the proposed D-OPF-1 and D-OPF-2 algorithms for $VR_1$, $VR_2$, $VR_3$, and $VR_4$ on cloudy and clear days were found. FIGS. 4A and 4B show the optimal tap positions for $VR_1$ on a cloudy day for D-OPF-1 and D-OPF-2, respectively; FIGS. 4C and 4D show the optimal tap positions on a cloudy day for $VR_2$ for D-OPF-1 and D-OPF-2, respectively; FIGS. 4E and 4F show the optimal tap positions for $VR_3$ on a cloudy day for D-OPF-1 and D-OPF-2, respectively; and FIGS. 4G and 4H show the optimal tap positions on a cloudy day for $VR_4$ for D-OPF-1 and D-OPF-2, respectively. FIGS. 5A and 5B show the optimal tap positions for $VR_1$ on a clear day for D-OPF-1 and D-OPF-2, respectively; FIGS. 5C and 5D show the optimal tap positions on a clear day for $VR_2$ for D-OPF-1 and D-OPF-2, respectively; FIGS. 5E and 5F show the optimal tap positions for $VR_3$ on a clear day for D-OPF-1 and D-OPF-2, respectively; and FIGS. 5G and 5H show the optimal tap positions on a clear day for $VR_4$ for D-OPF-1 and D-OPF-2, respectively. Due to the hierarchy of operation introduced in the D-OPF-2 algorithm, the number of tap operations is reduced. The summary of the tap changes for the four voltage regulators is tabulated in the table shown in FIG. 14. The total tap changes with the D-OPF-1 (cloudy and clear day) was 230 while that of D-OPF-2 (cloudy and clear day) was 165 and 164, respectively. This shows a reduction of about 28% in the tap operation with the use of D-OPF-2 compared to that of the D-OPF-1. FIG. 14 also shows an increase of about 17% in CAPS utilization with the use of D-OPF-2 compared to that of D-OPF-1.

Example 2-Optimal SI Modes and Settings

Figure 6A:
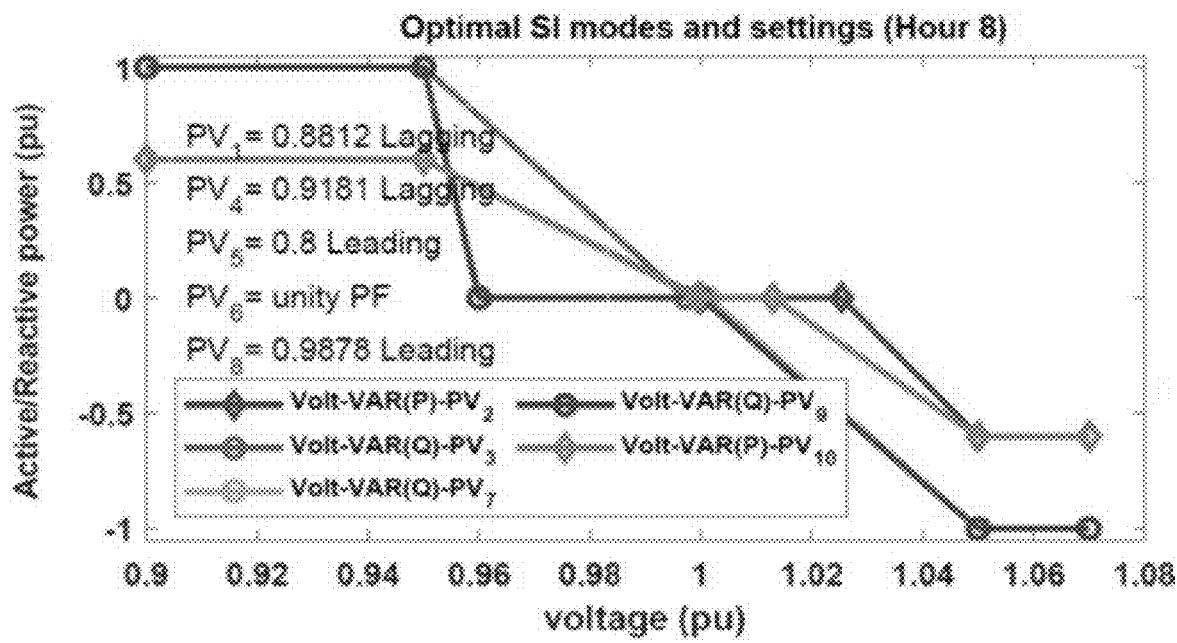
FIGS. 6A-6I show plots of active/reactive power (per unit (pu)) versus voltage (pu), showing optimal SI modes and settings for D-OPF-1 on a cloudy day, at hours 8-16, respectively (i.e., FIG. 6A shows hour 8, FIG. 6B shows hour 9, etc.). Each plot includes a legend therein.
Figure 6B:
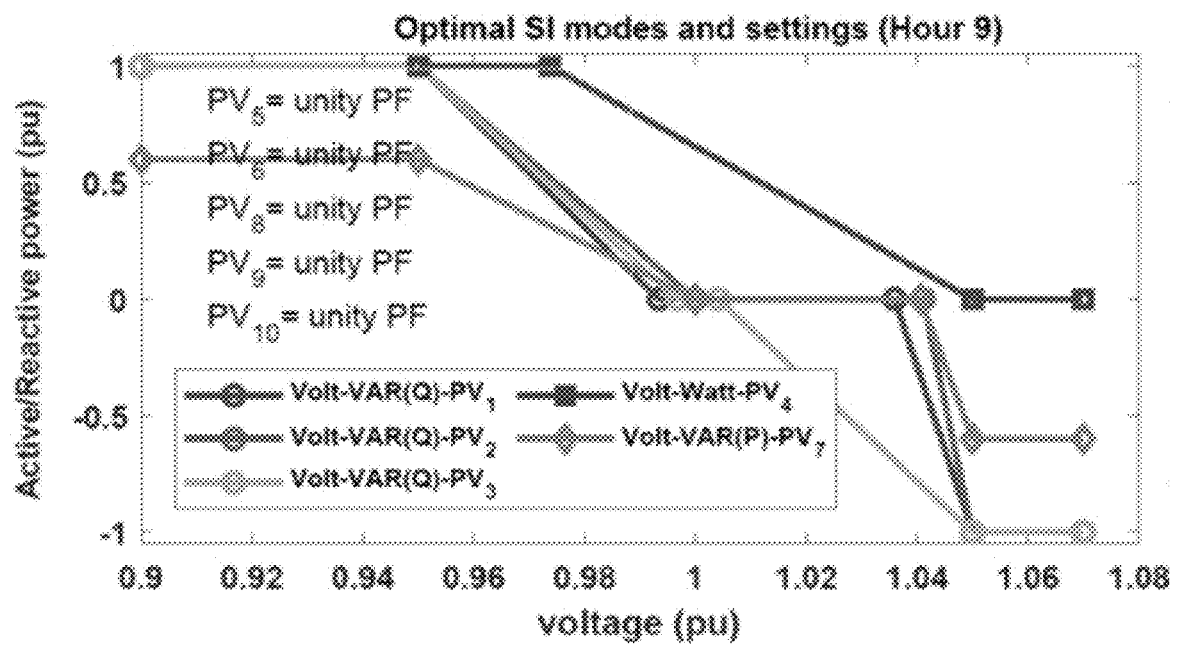
Figure 6C:
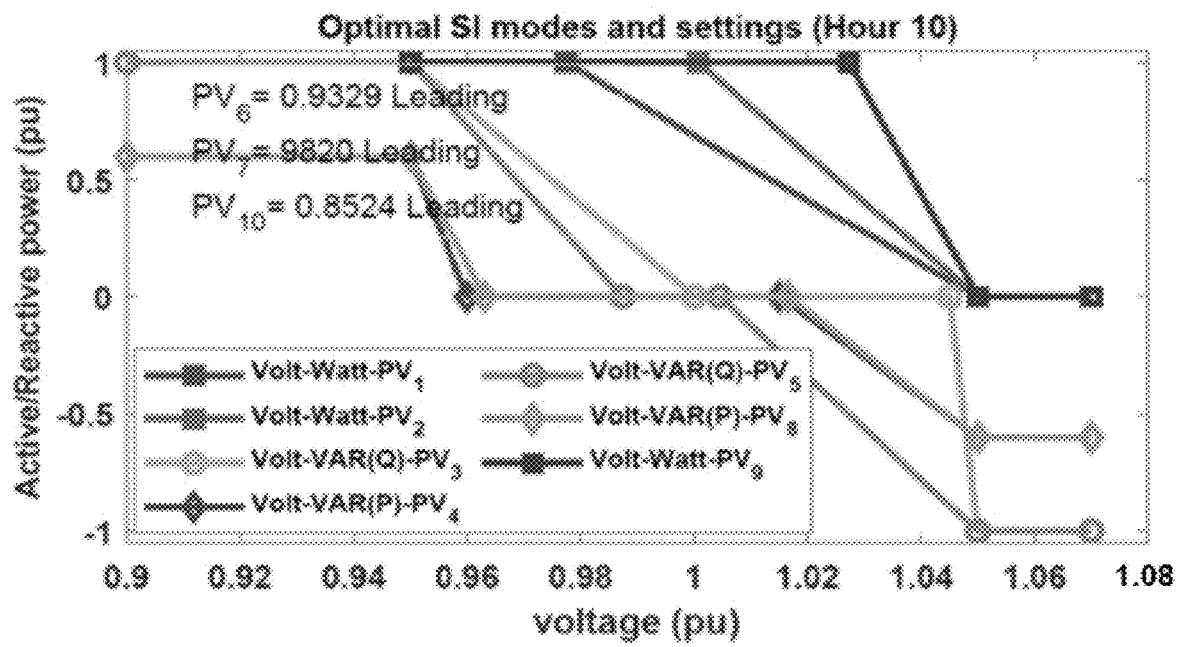
Figure 6D:
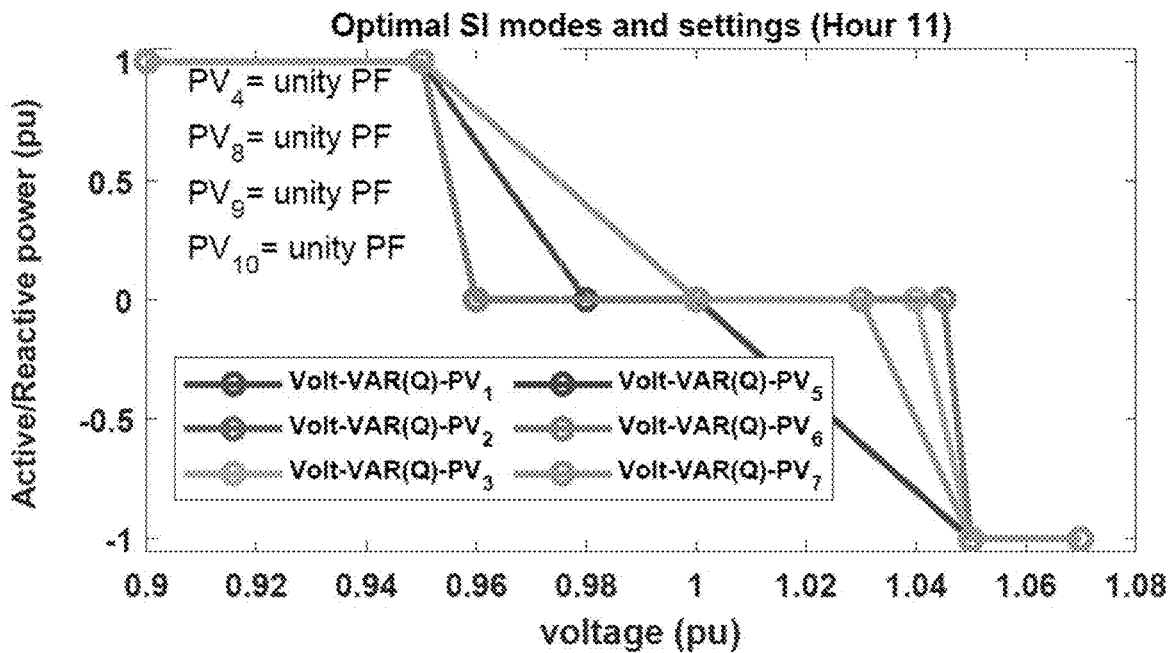
Figure 6E:
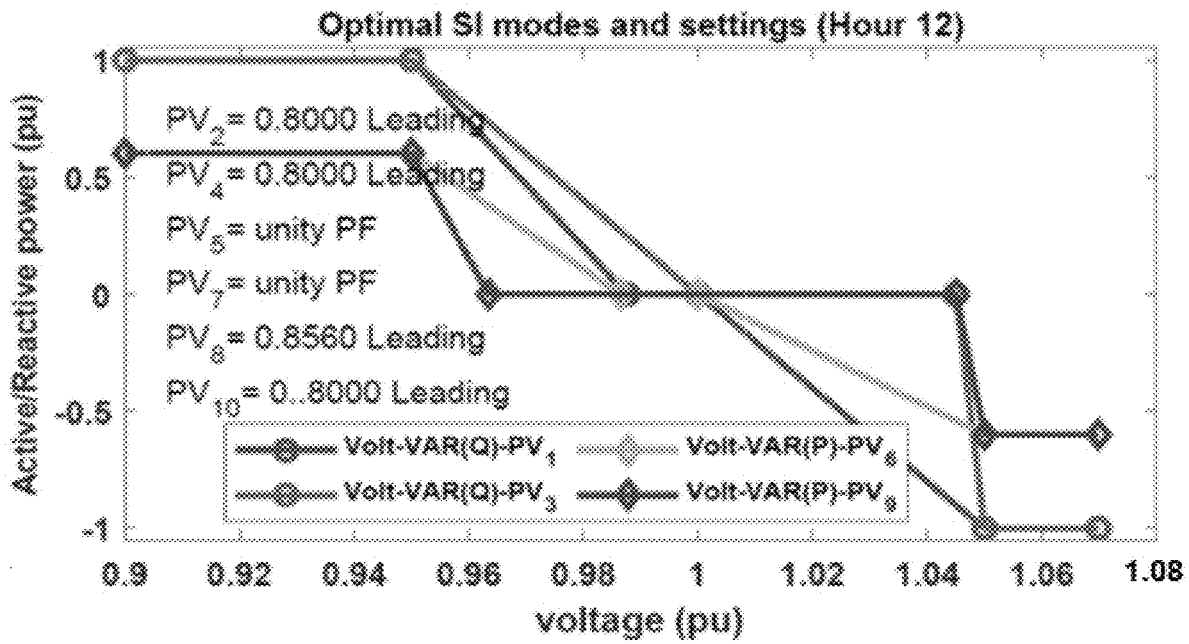
Figure 6F:
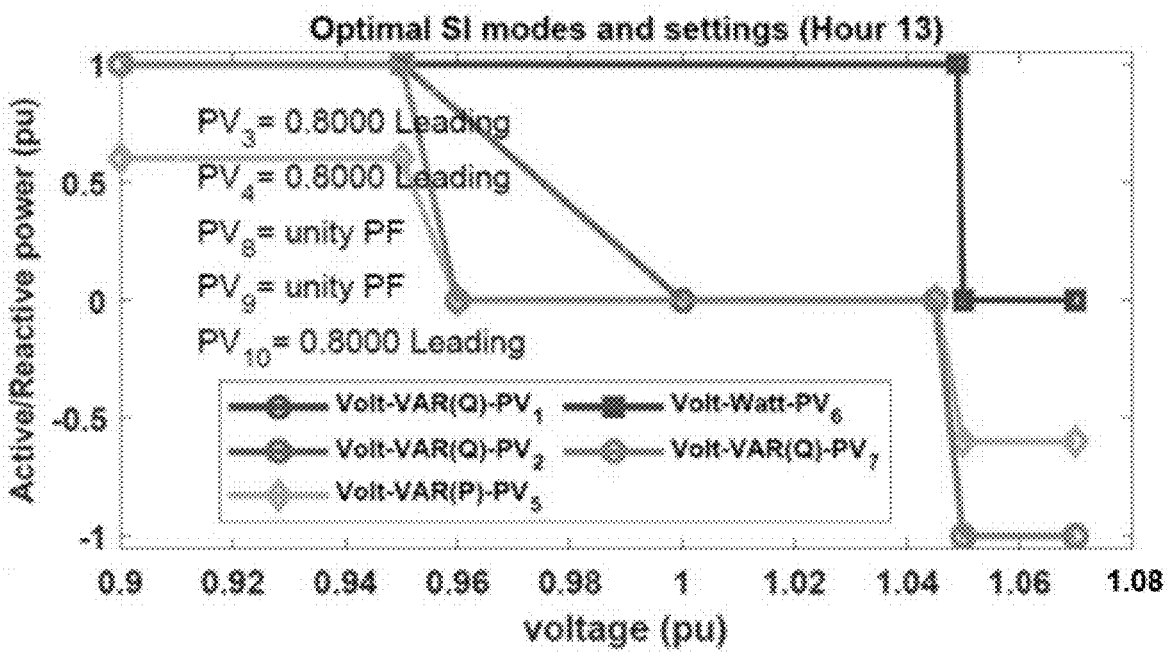
Figure 6G:
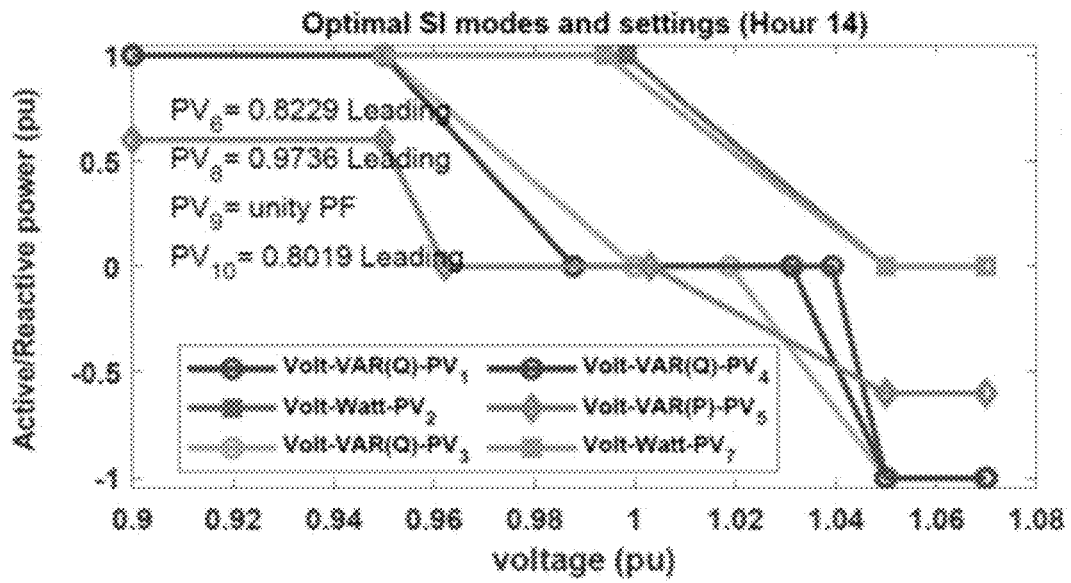
Figure 6H:
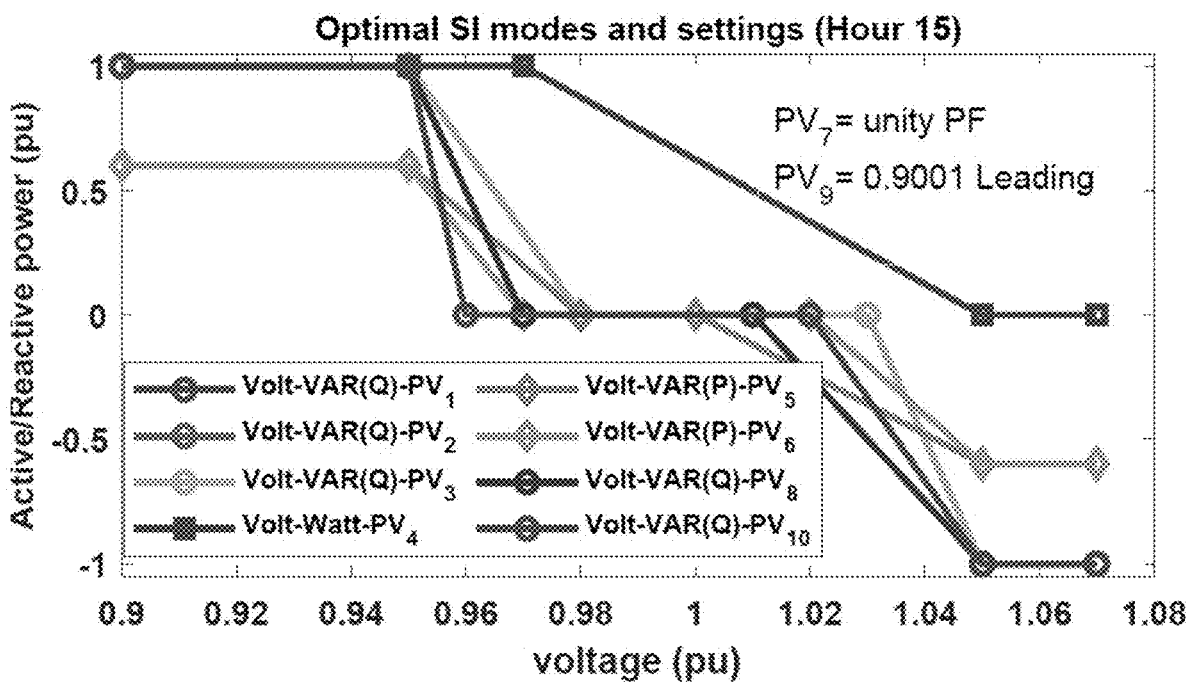
Figure 6I:
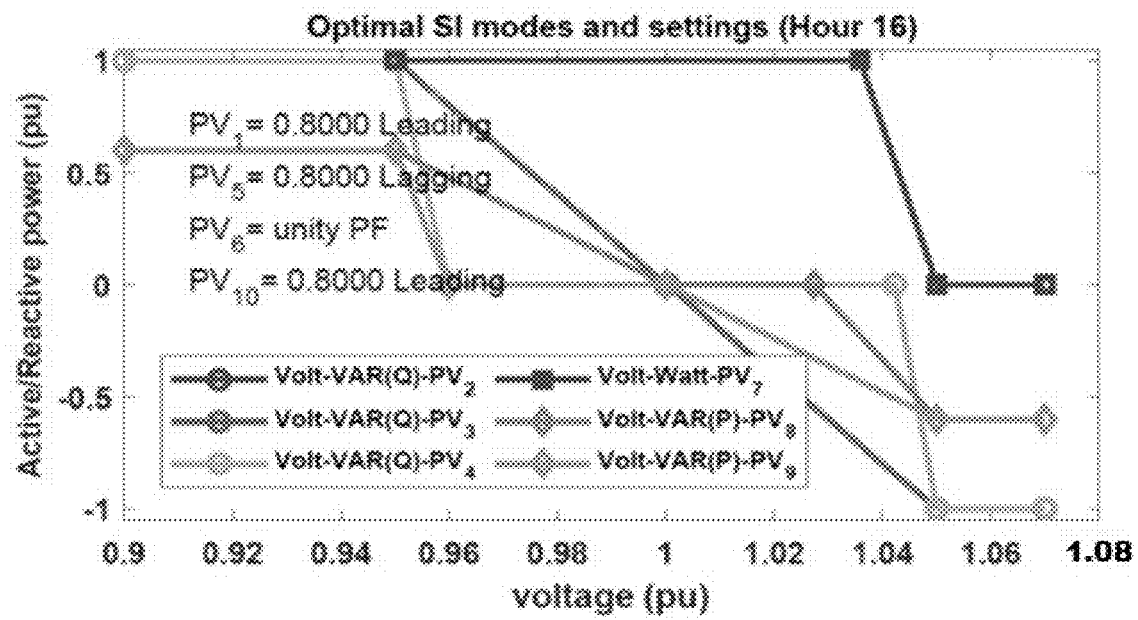
Figure 7A:
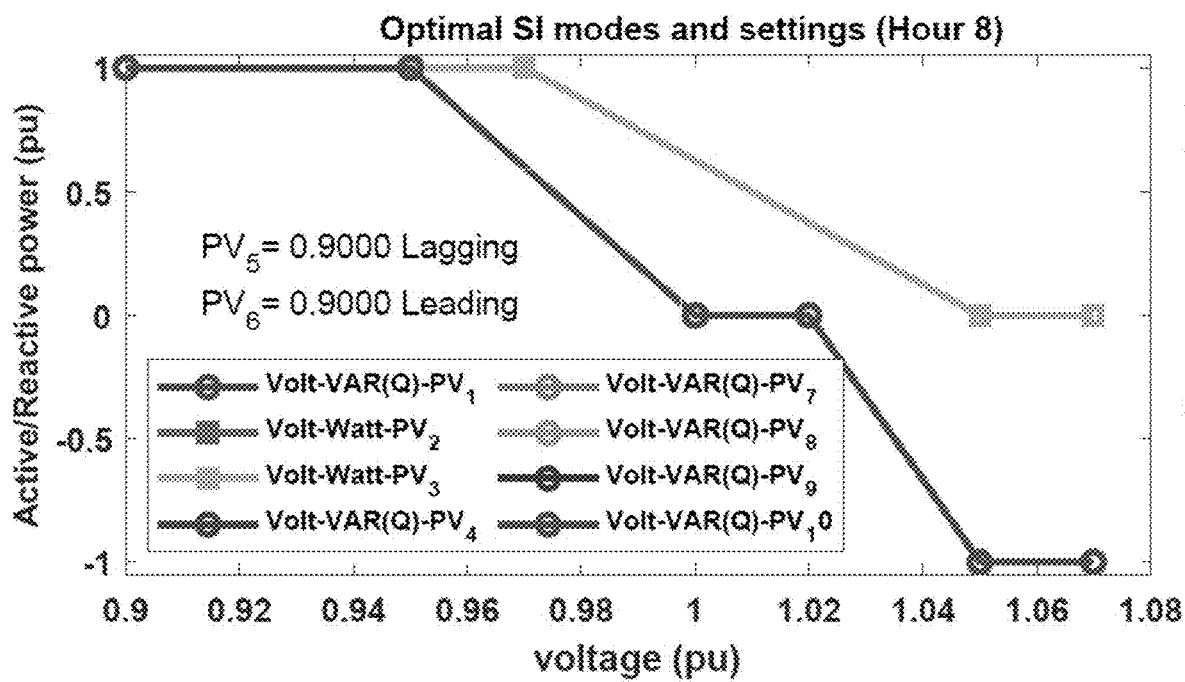
FIGS. 7A-7I show plots of active/reactive power (pu) versus voltage (pu), showing optimal SI modes and settings for D-OPF-2 on a cloudy day, at hours 8-16, respectively. Each plot includes a legend therein.
Figure 7B:
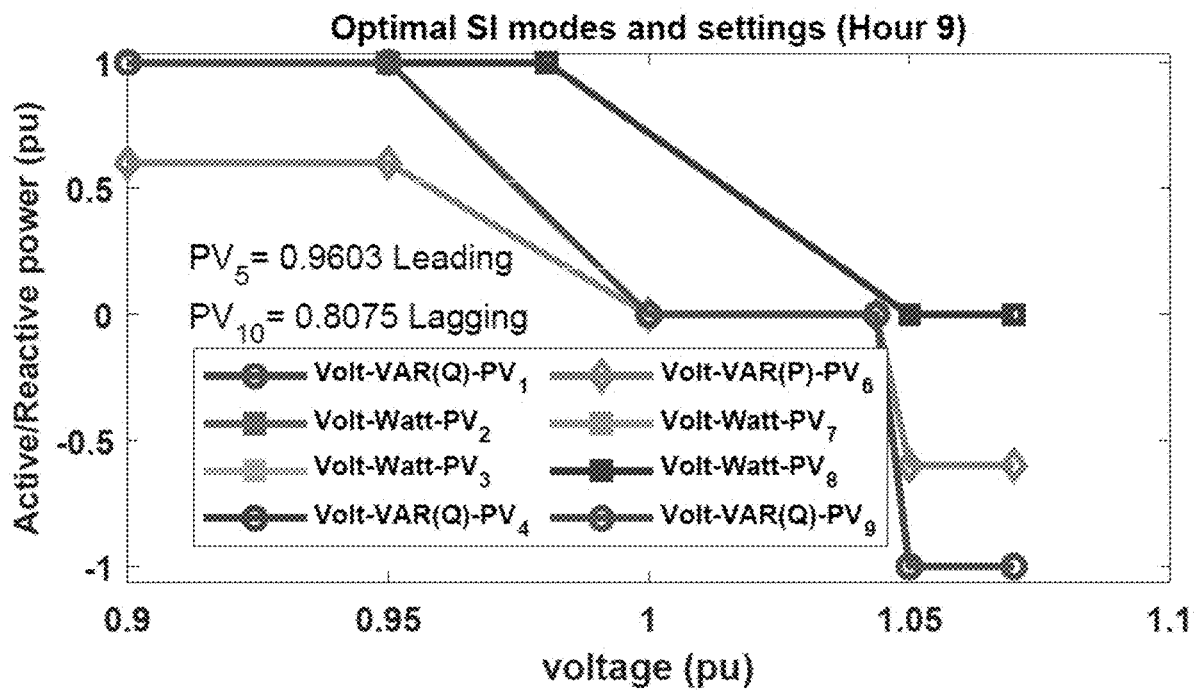
Figure 7C:
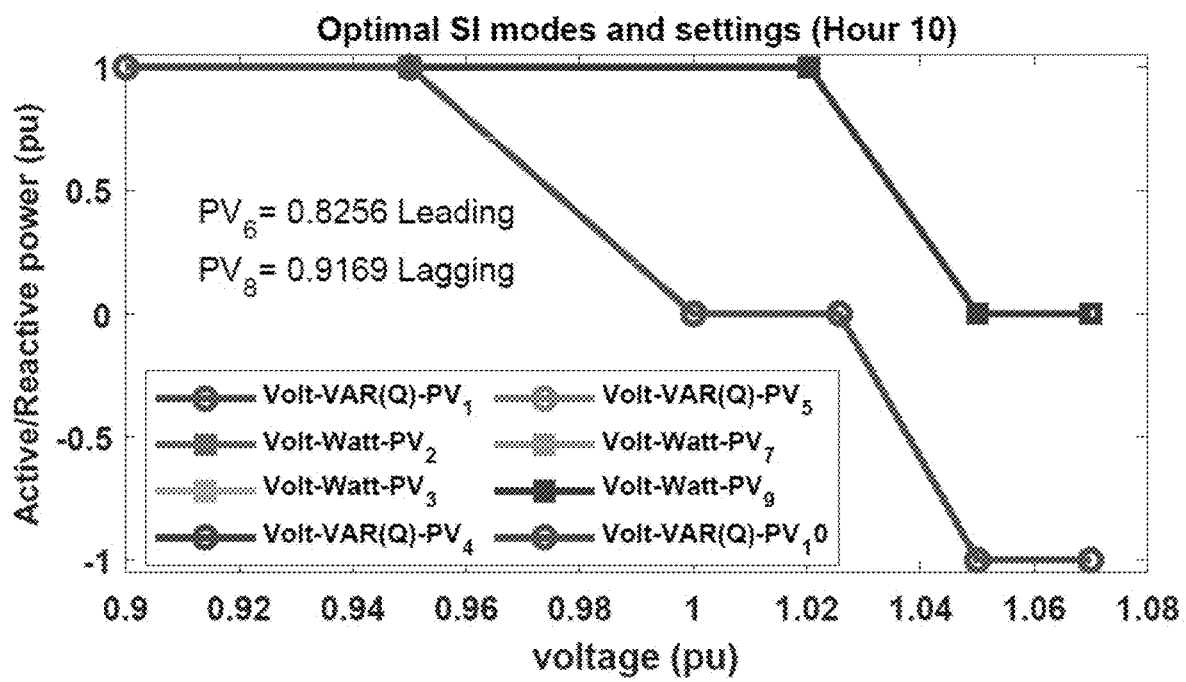
Figure 7D:
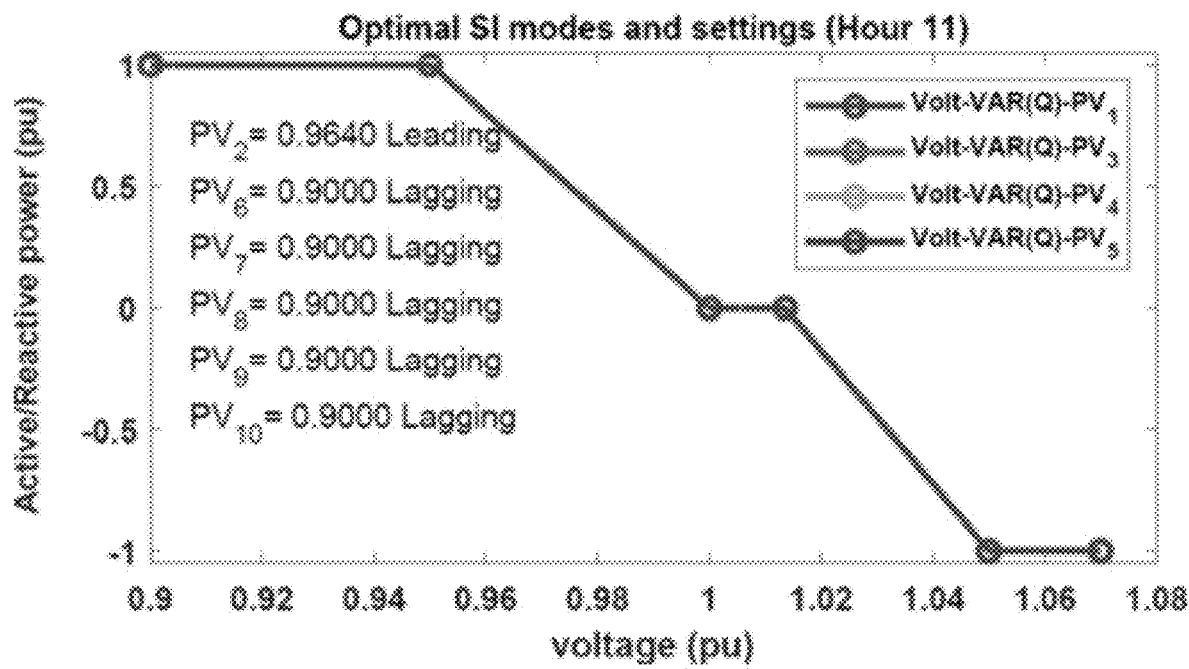
Figure 7E:
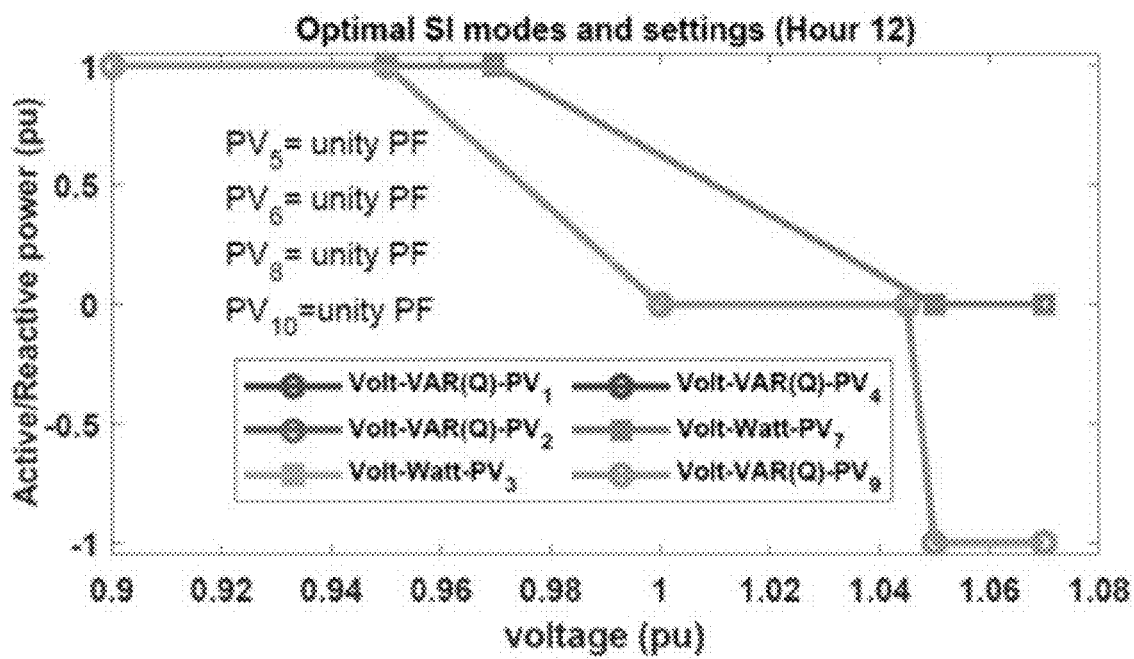
Figure 7F:
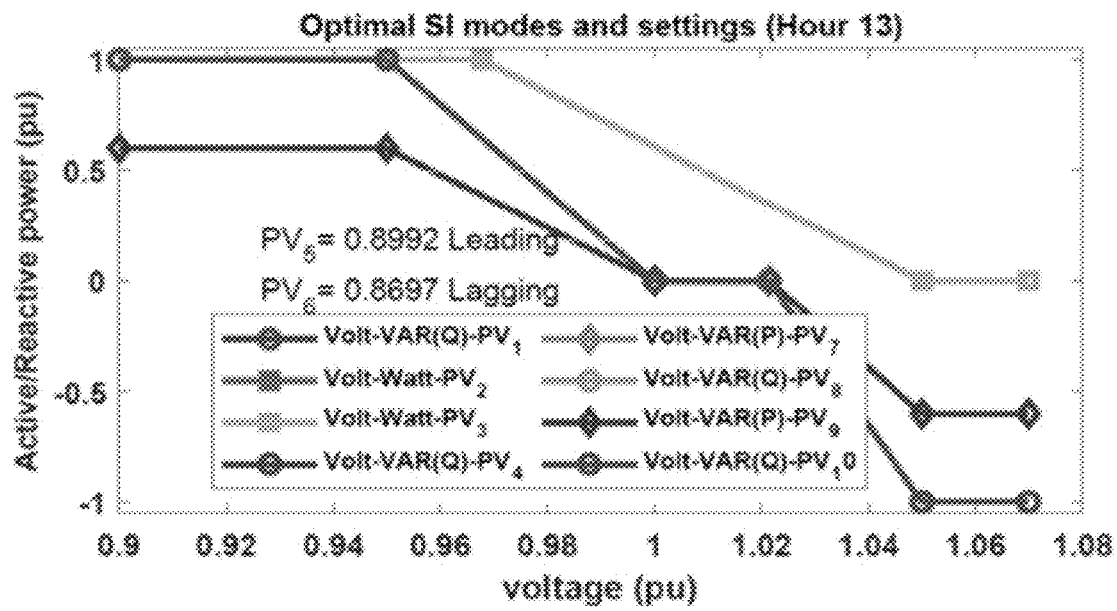
Figure 7G:
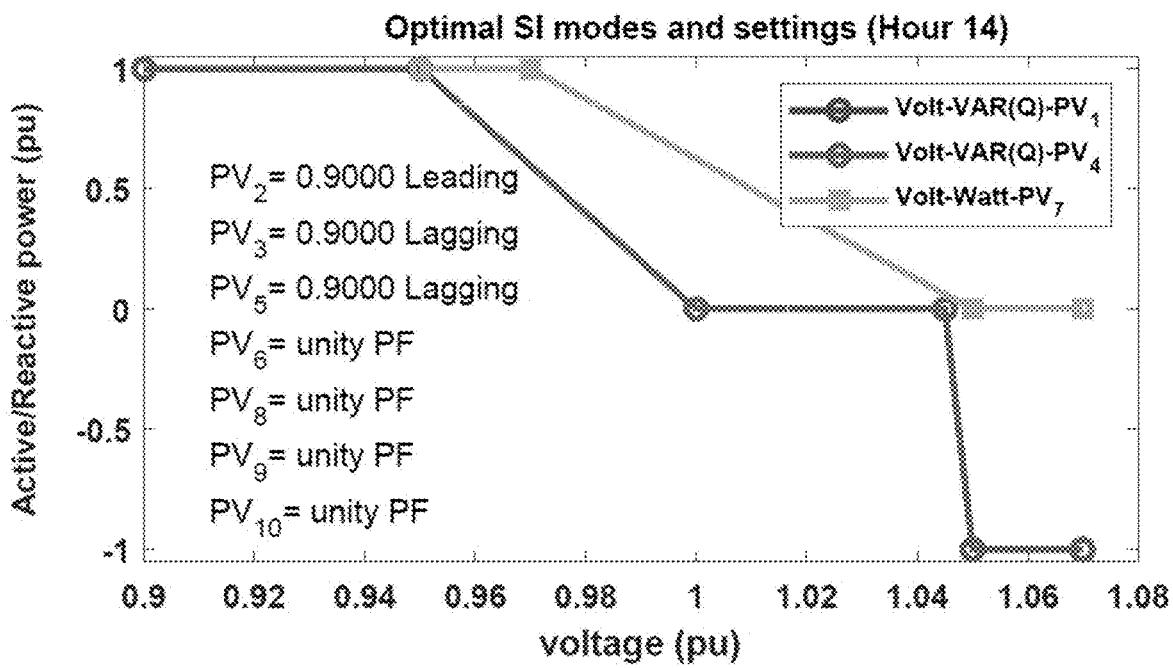
Figure 7H:
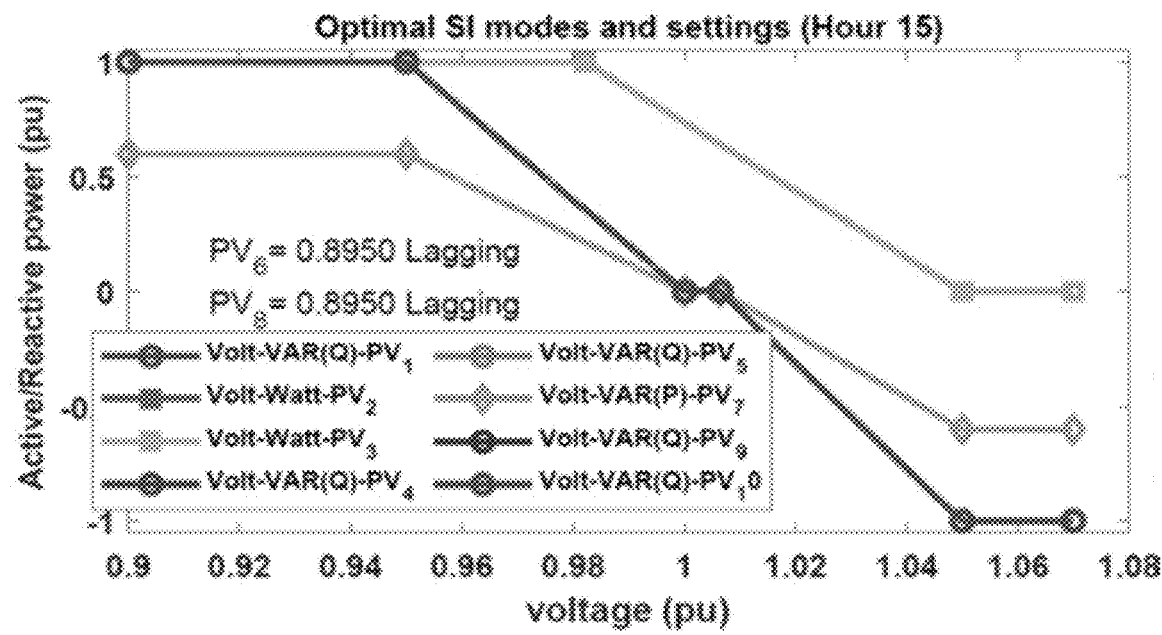
Figure 7I:
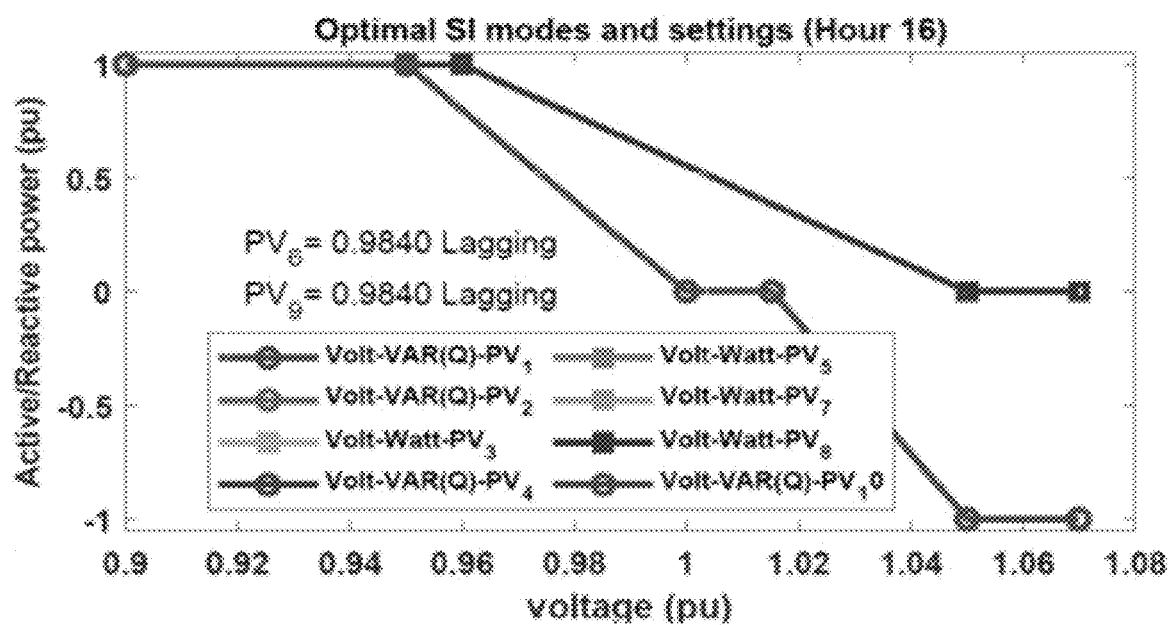
Figure 8A:
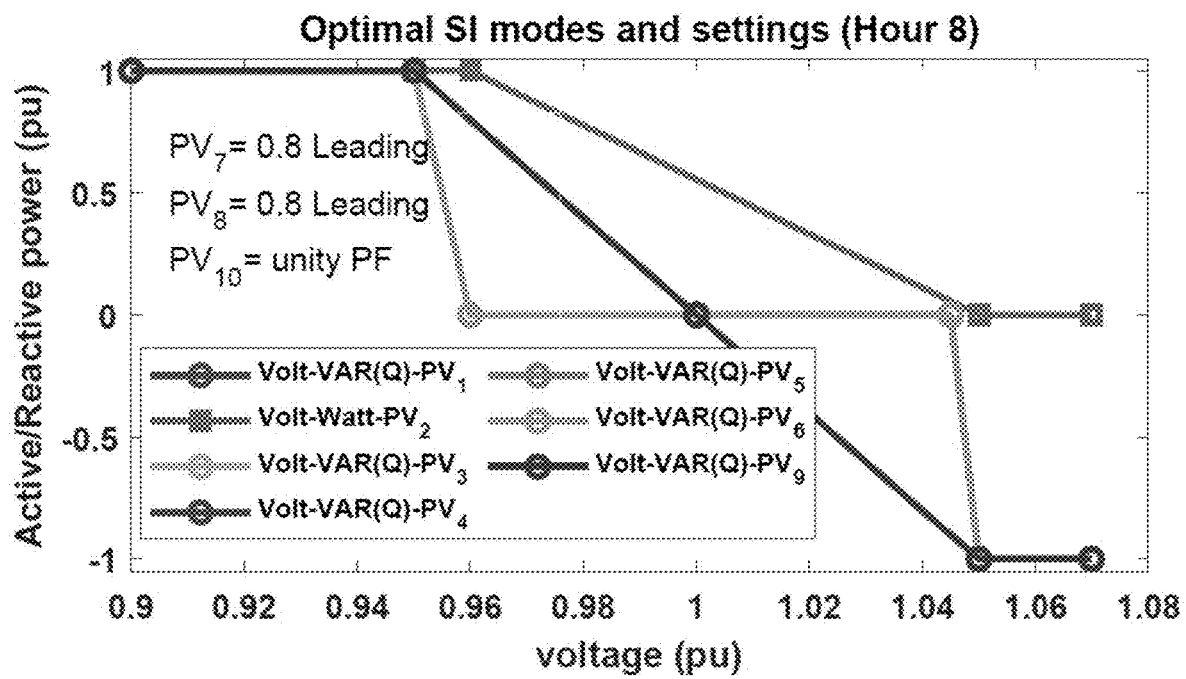
FIGS. 8A-8I show plots of active/reactive power (pu) versus voltage (pu), showing optimal SI modes and settings for D-OPF-1 on a clear day, at hours 8-16, respectively. Each plot includes a legend therein.
Figure 8B:
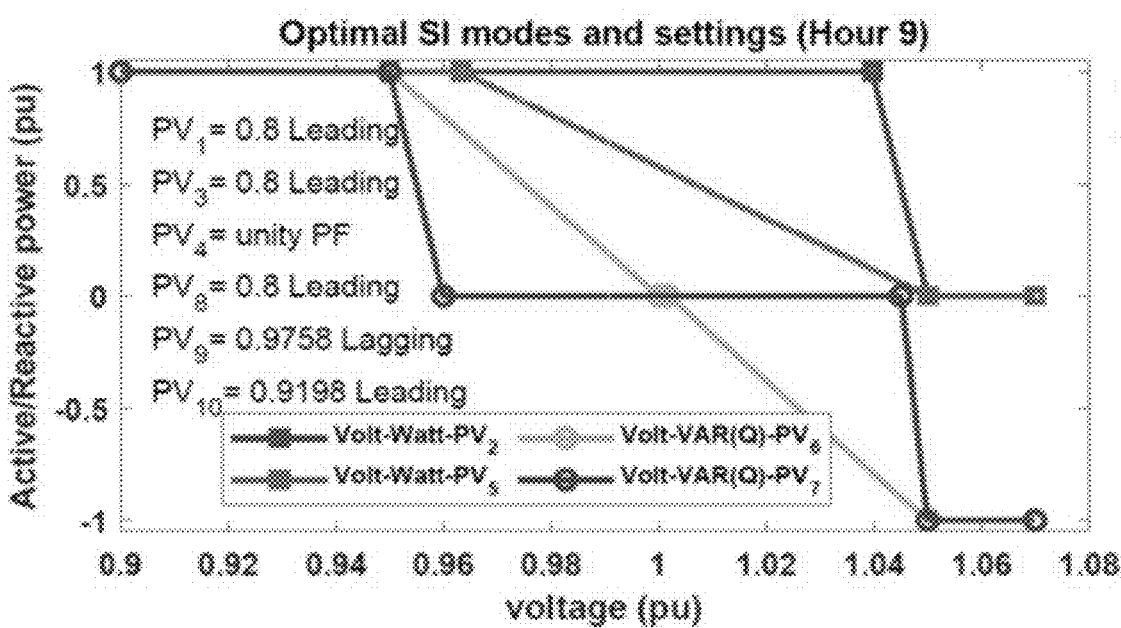
Figure 8C:
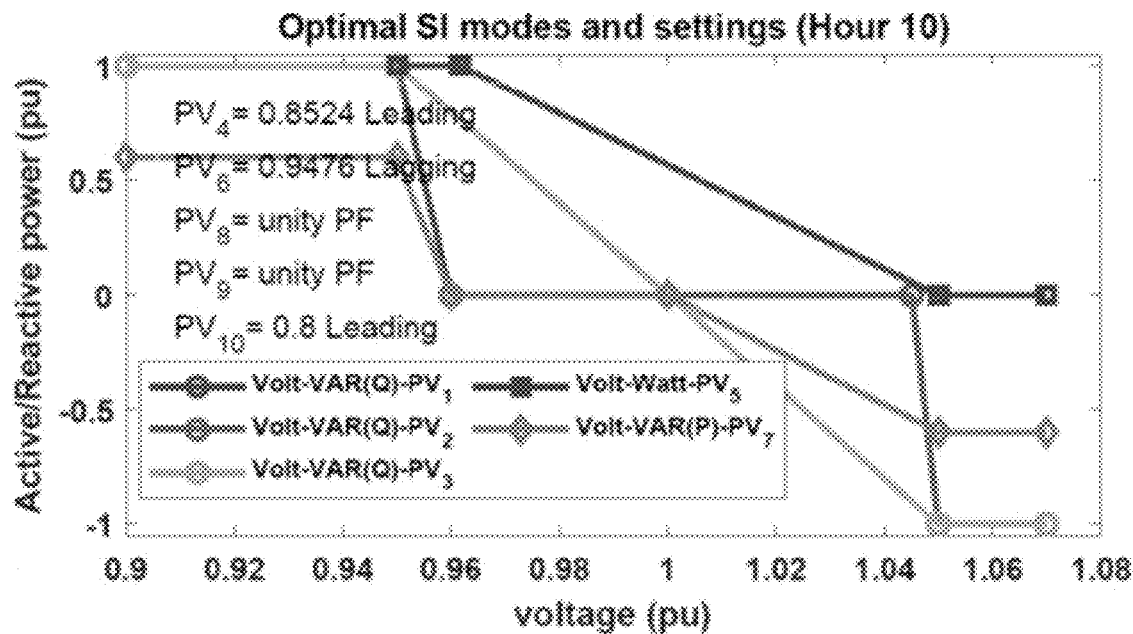
Figure 8D:
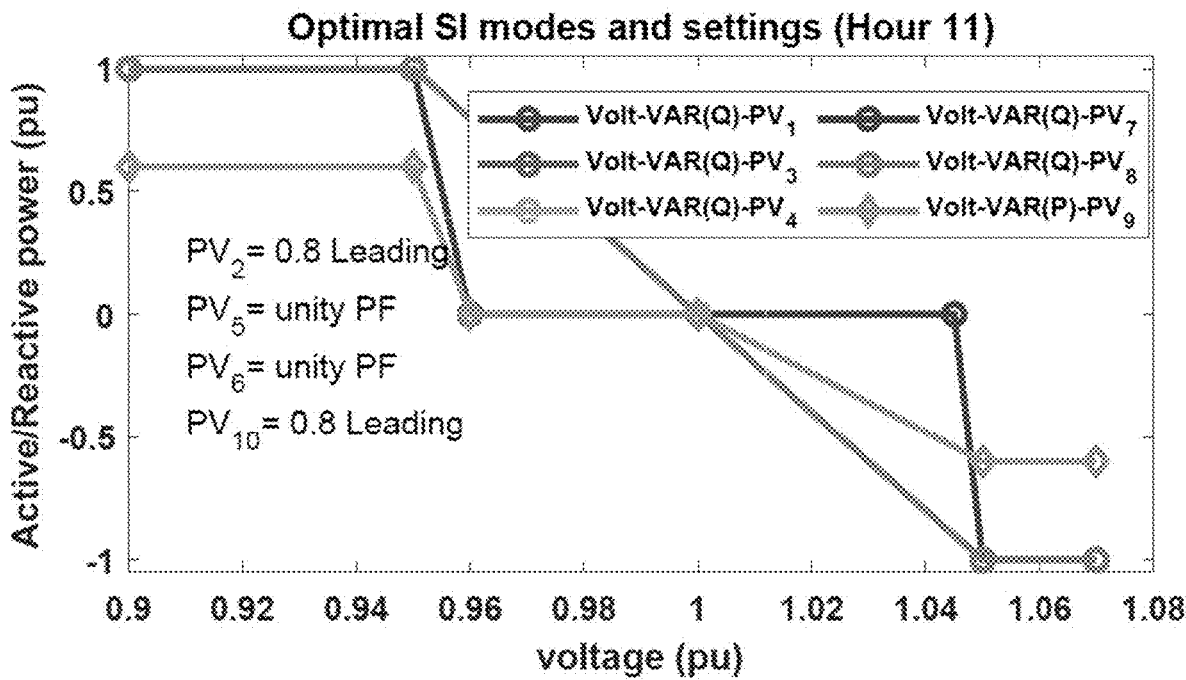
Figure 8E:
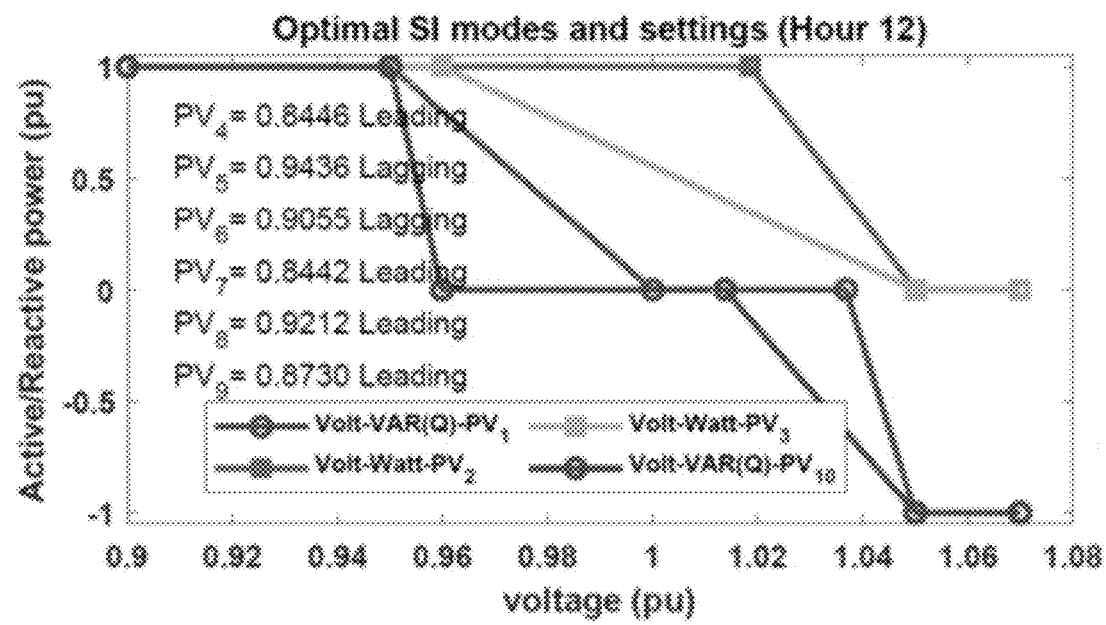
Figure 8F:
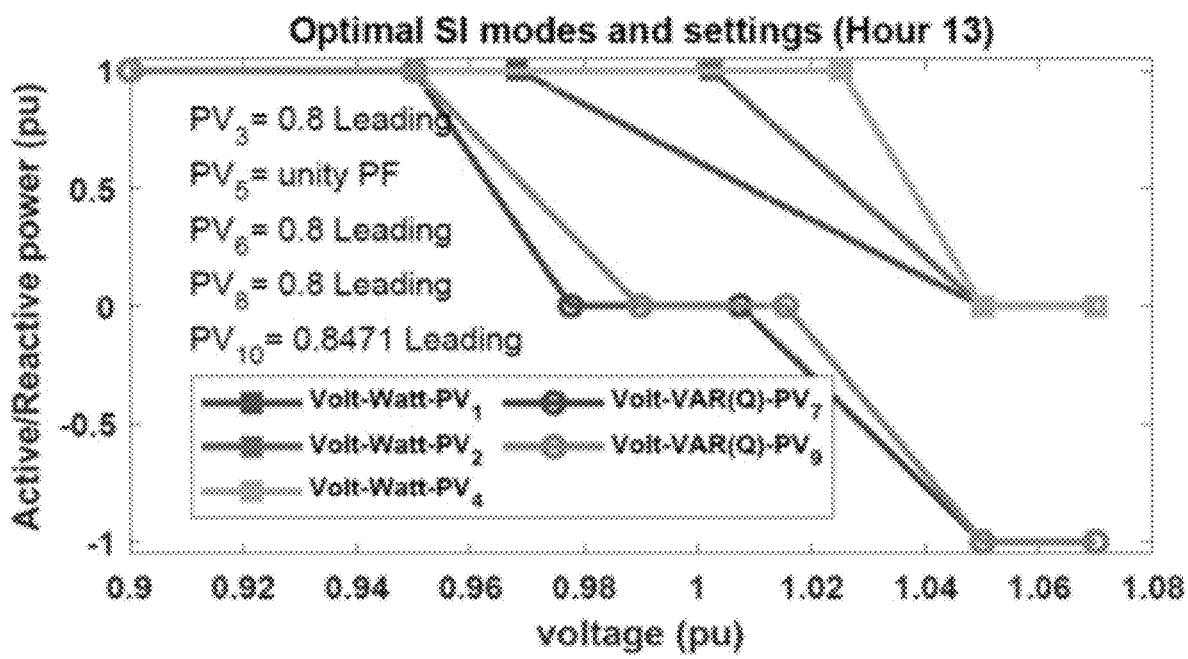
Figure 8G:
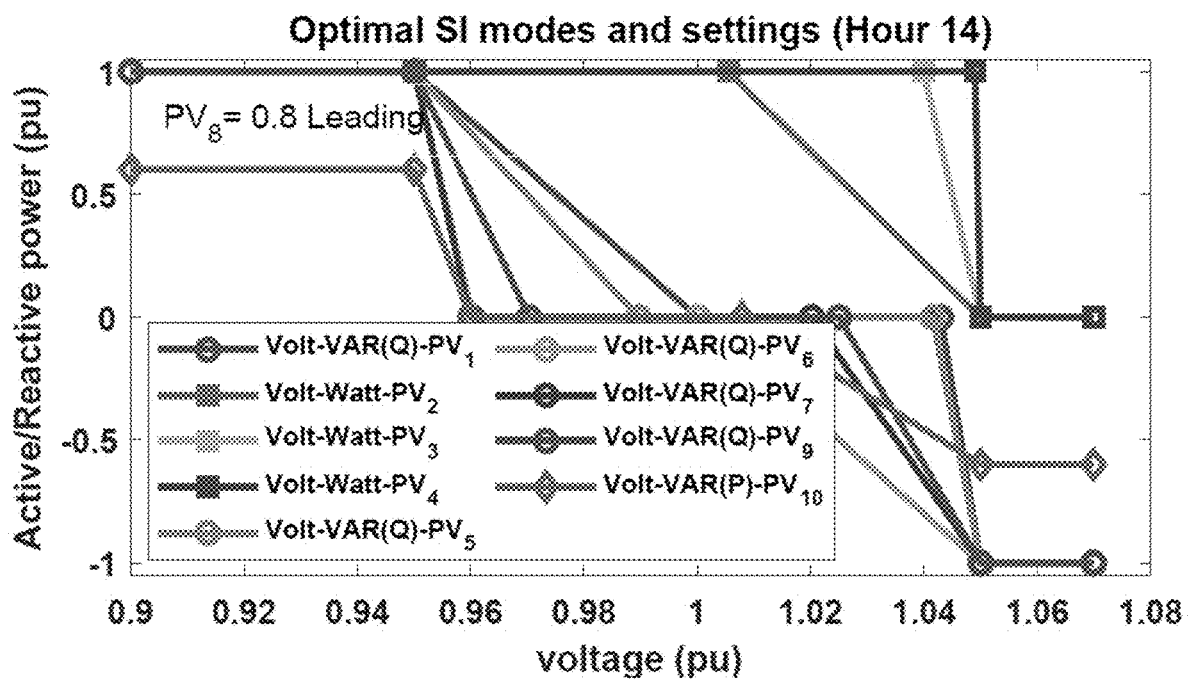
Figure 8H:
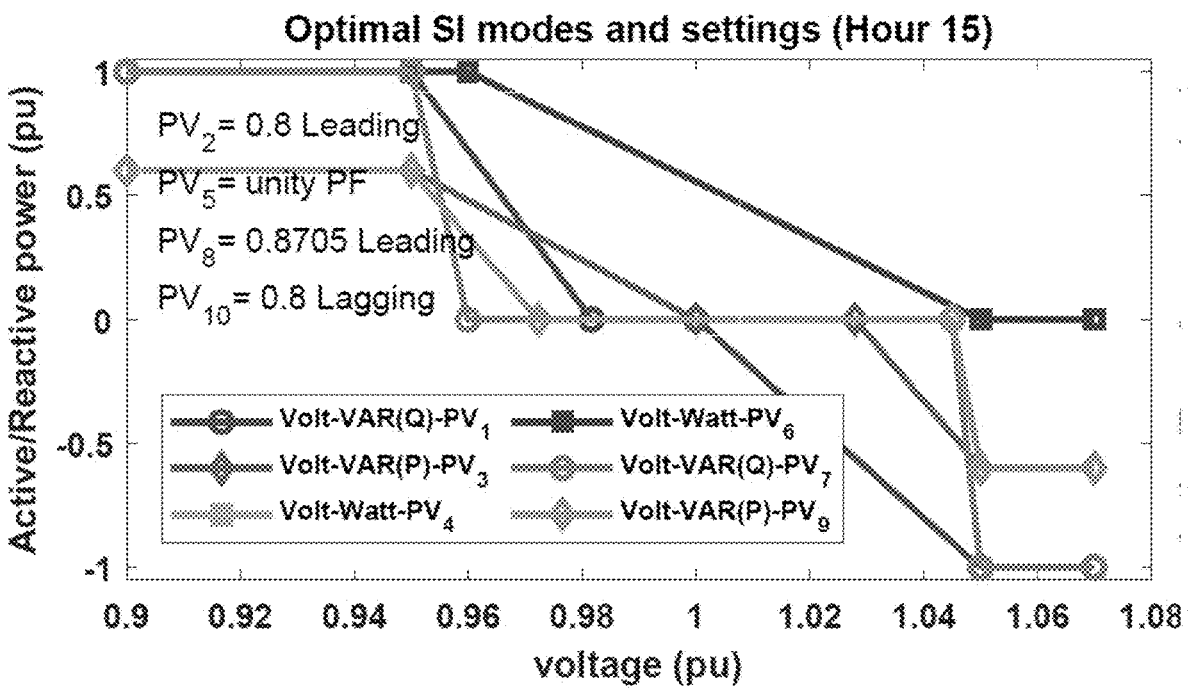
Figure 8I:
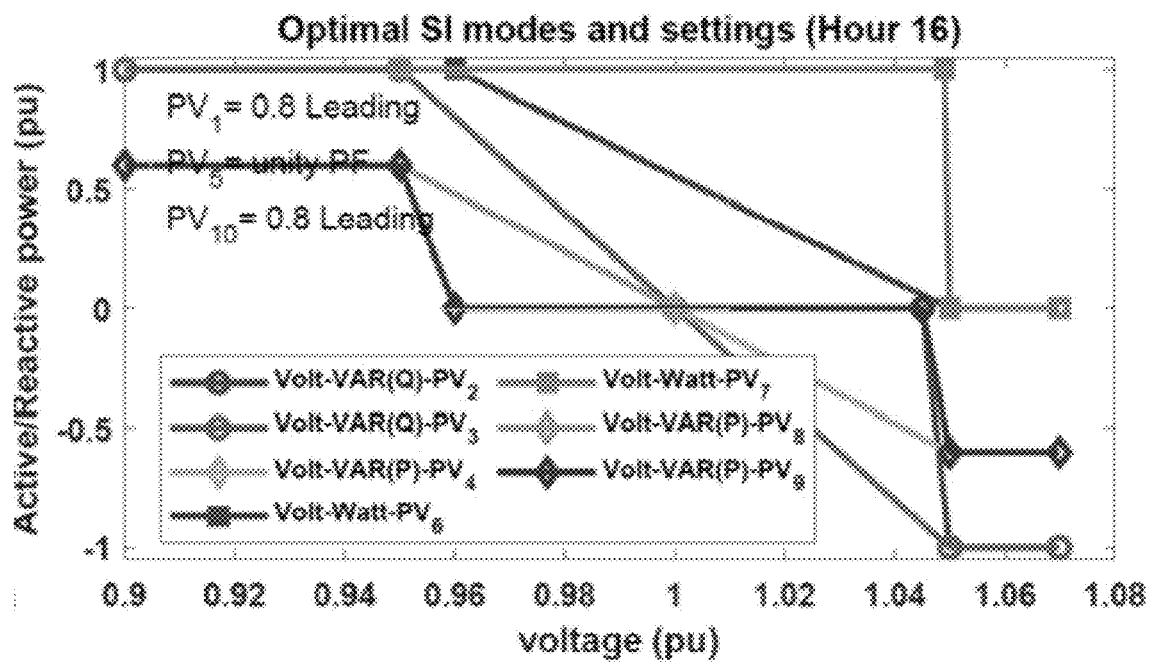
Figure 9A:
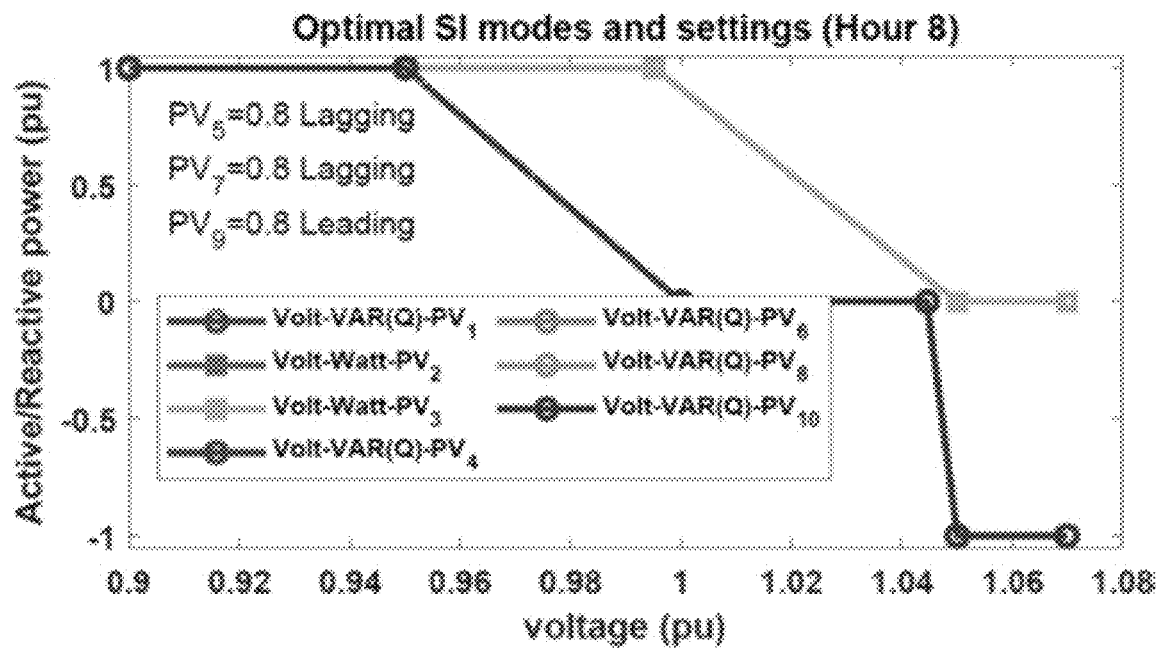
FIGS. 9A-9I show plots of active/reactive power (pu) versus voltage (pu), showing optimal SI modes and settings for D-OPF-2 on a clear day, at hours 8-16, respectively. Each plot includes a legend therein.
Figure 9B:
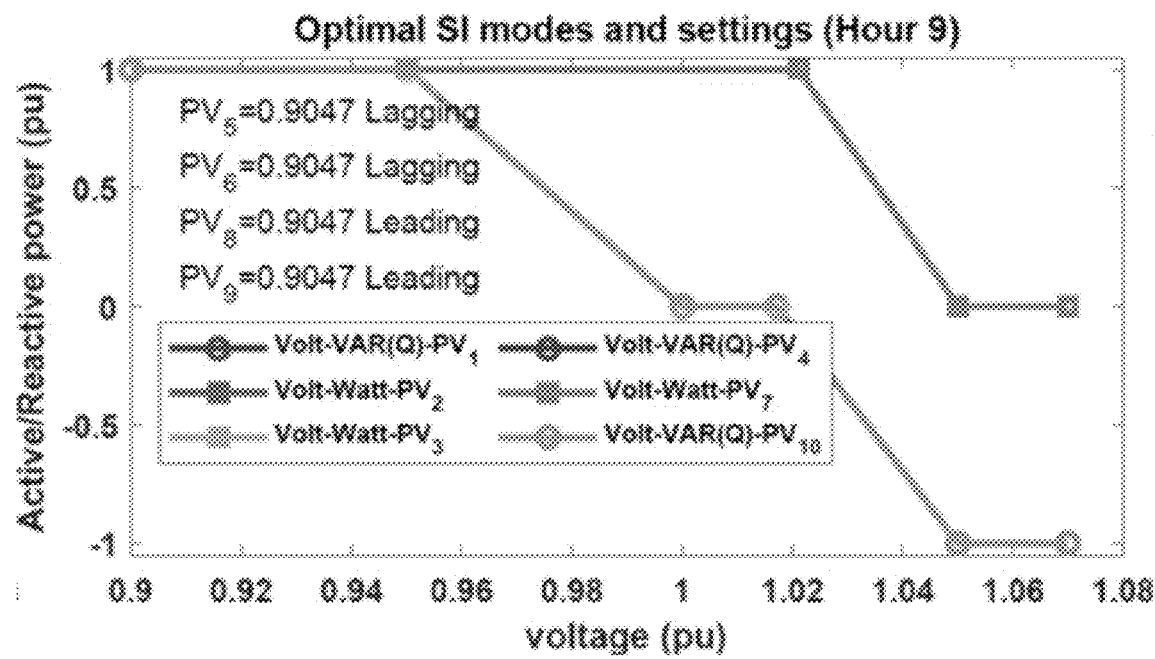
Figure 9C:
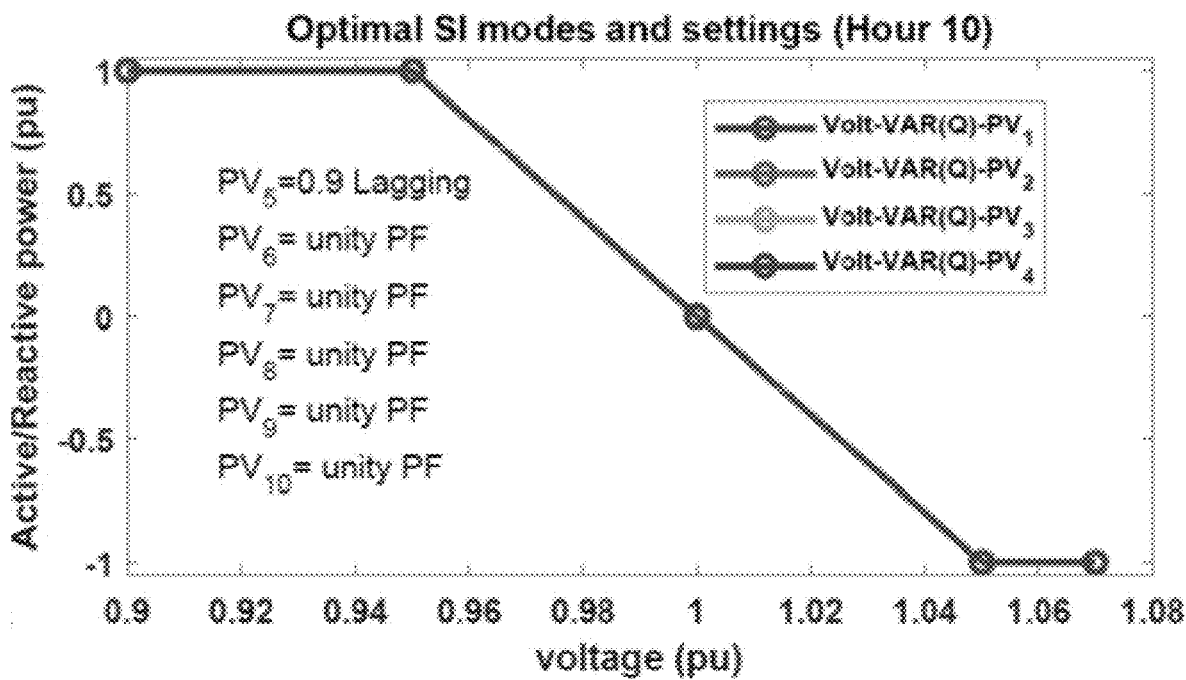
Figure 9D:
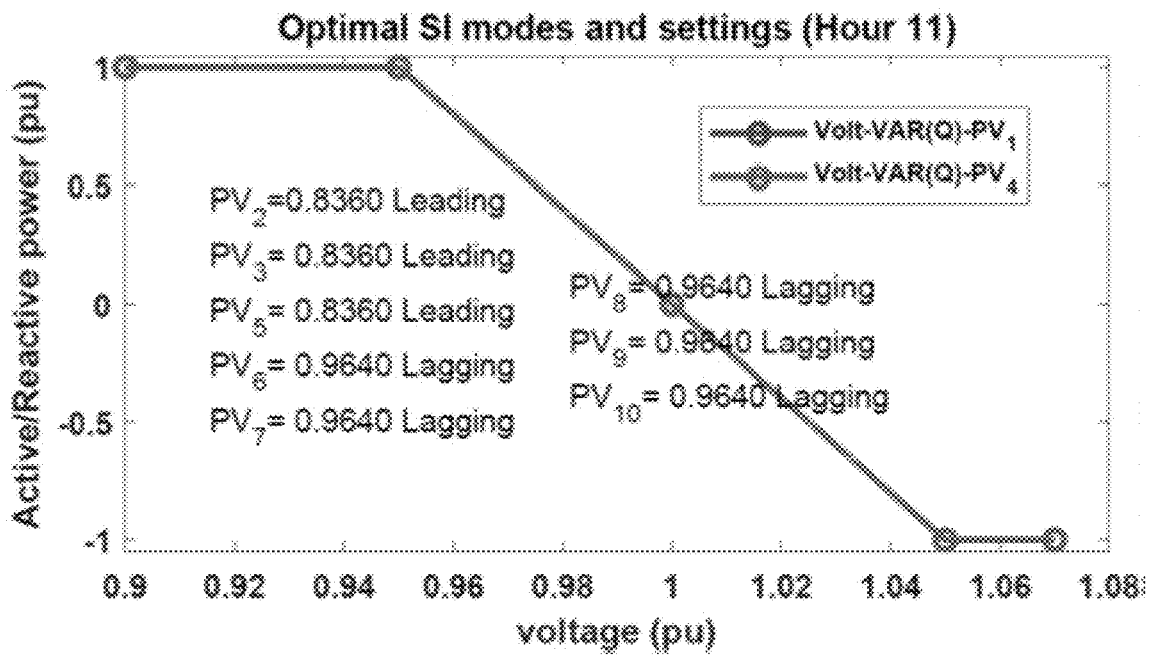
Figure 9E:
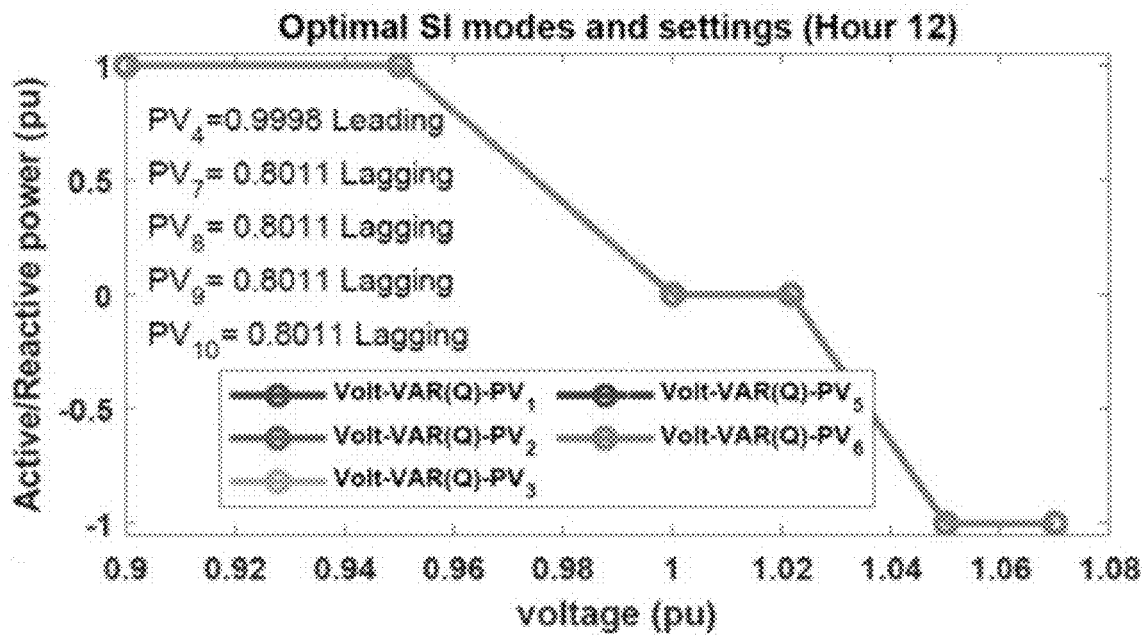
Figure 9F:
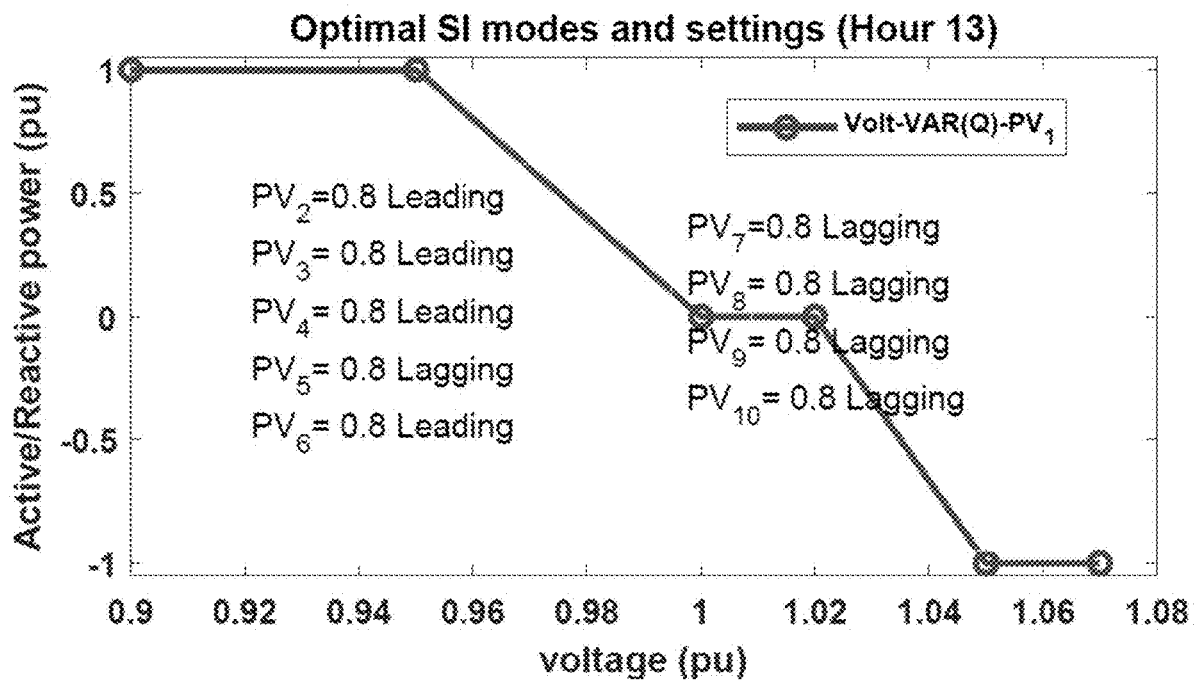
Figure 9G:
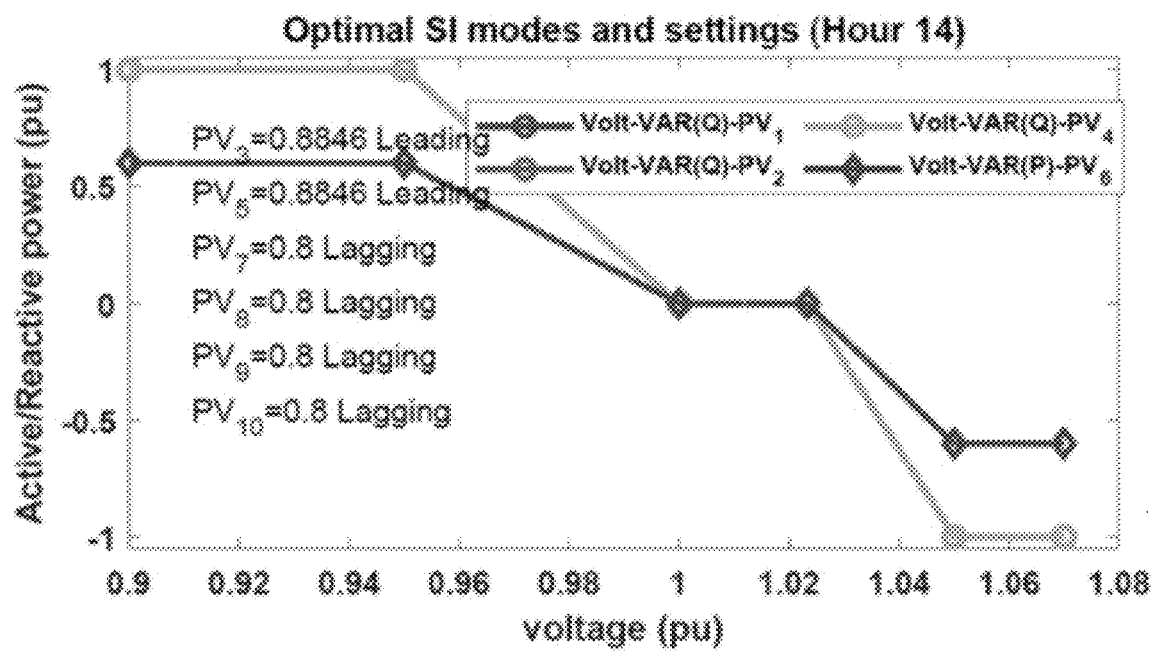
Figure 9H:
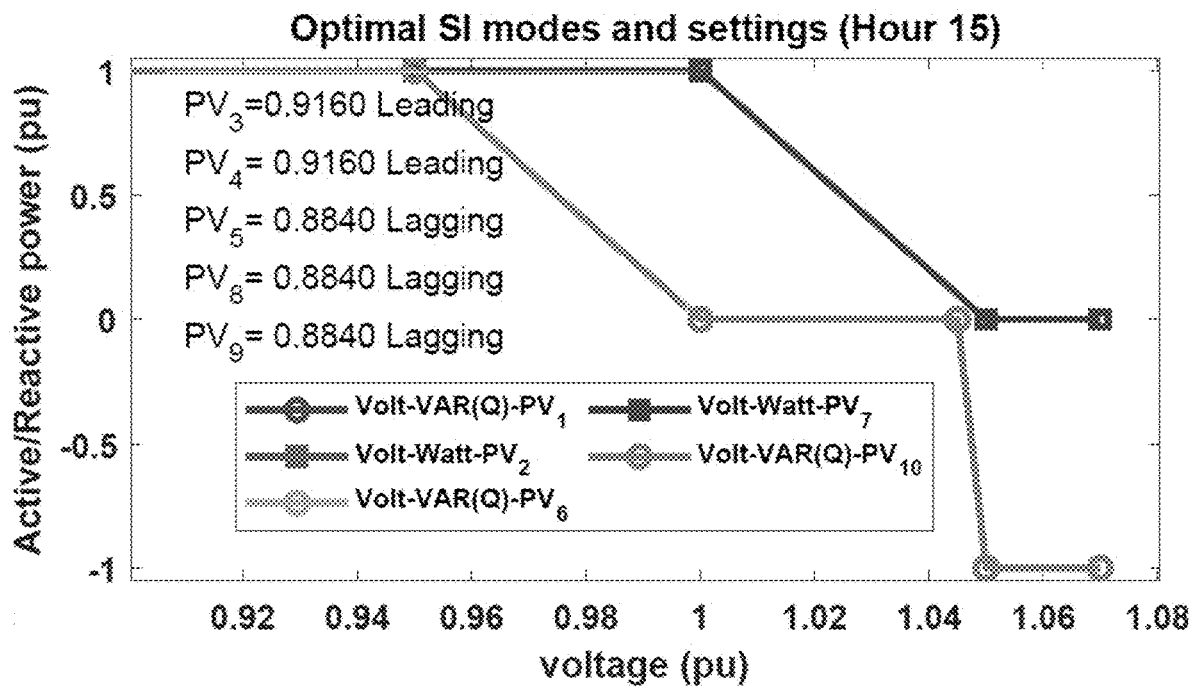
Figure 9I:
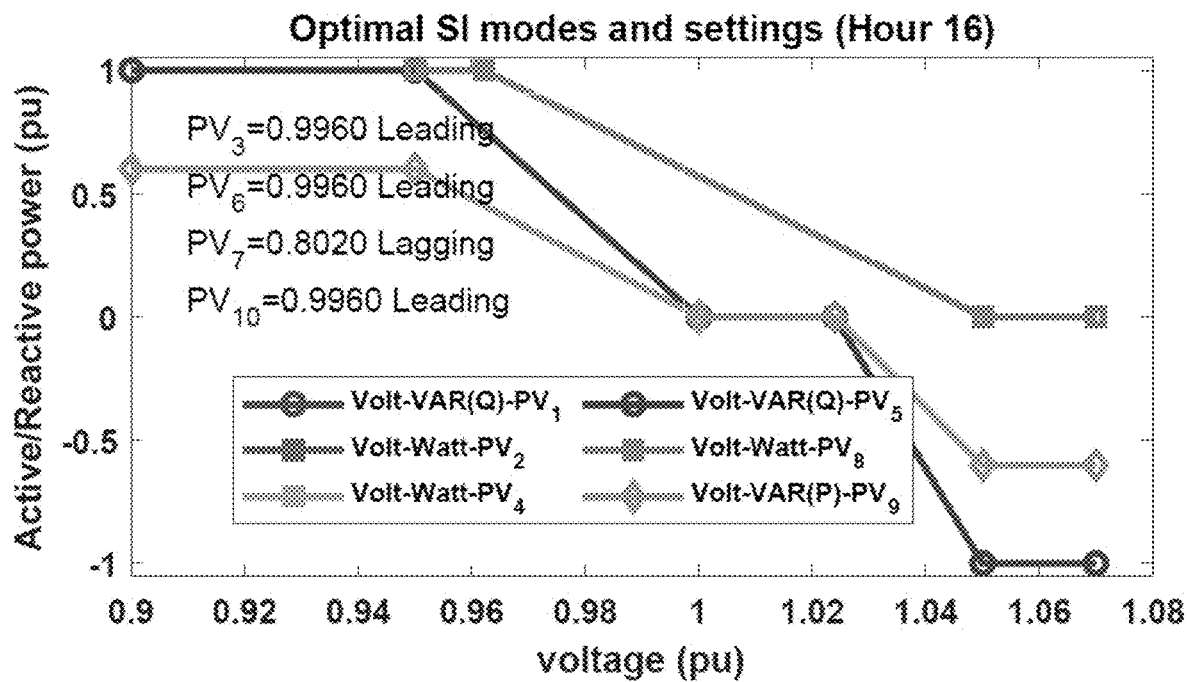

The optimal SI modes and settings for stage-one D-OPF based on both cloudy (D-OPF-1 and D-OPF-2) and clear (D-OPF-1 and D-OPF-2) day PV generation were found. FIGS. 6A-6I show optimal SI modes and settings for D-OPF-1 on a cloudy day, at hours 8-16, respectively (i.e., FIG. 6A shows hour 8, FIG. 6B shows hour 9, etc.); FIGS. 7A-7I show optimal SI modes and settings for D-OPF-2 on a cloudy day, at hours 8-16, respectively; FIGS. 8A-8I show optimal SI modes and settings for D-OPF-1 on a clear day, at hours 8-16, respectively; and FIGS. 9A-9I show optimal SI modes and settings for D-OPF-2 on a clear day, at hours 8-16, respectively. Referring to FIGS. 6A-9I, the algorithm effectively selected the optimal modes of the SIs for each hour. All the possible SI modes (Volt/Watt, Volt/VAR (P-priority), Volt/VAR (Q-priority), and CPF (leading and lagging)) considered during the optimization were used by the SIs for effective voltage regulation. The table in FIG. 15 shows a summary of the number of times optimal SI modes were changed.

Example 3-Active and Reactive Power Dispatch

Figure 10A:
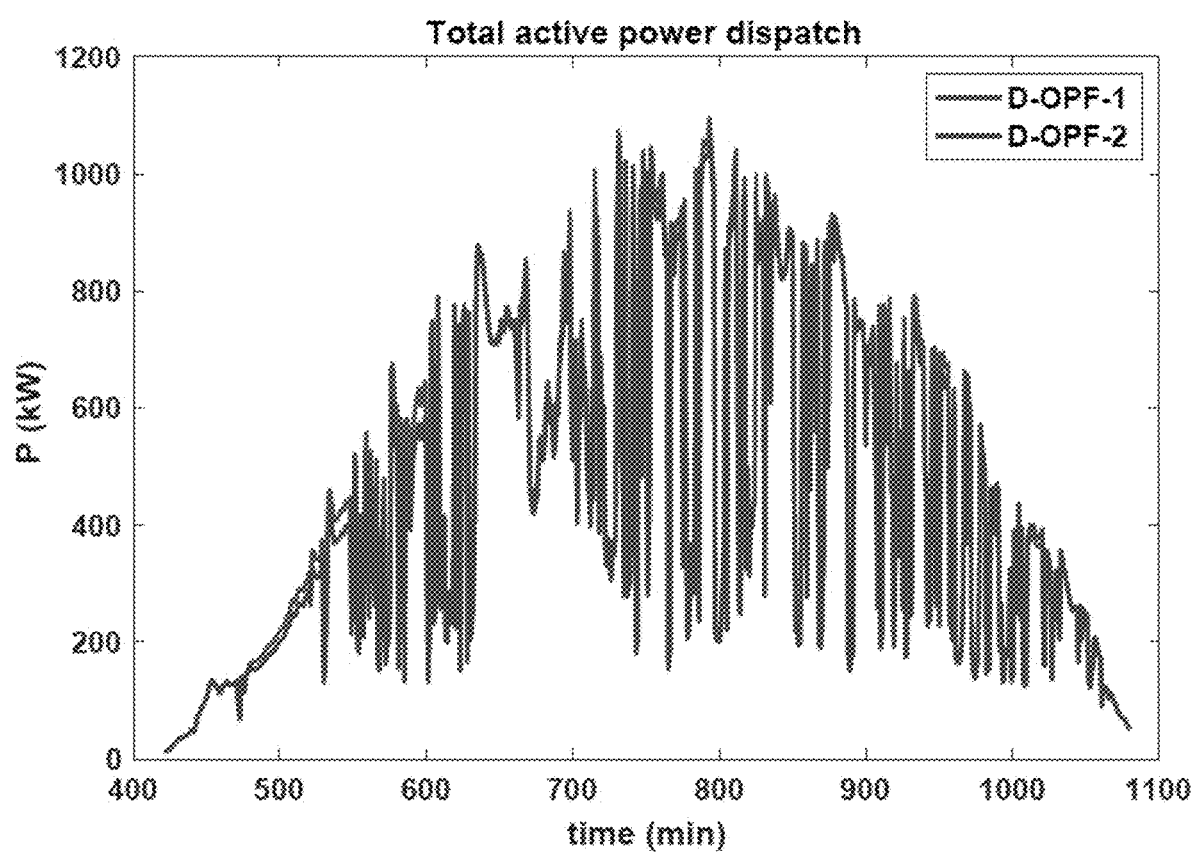
FIG. 10A shows a plot of active power (in kilowatts (kW)) versus time (in minutes (min)), showing total active power dispatch for D-OPF-1 and D-OPF-2 on a cloudy day. The D-OPF-1 and D-OPF-2 curves are nearly identical.
Figure 10B:
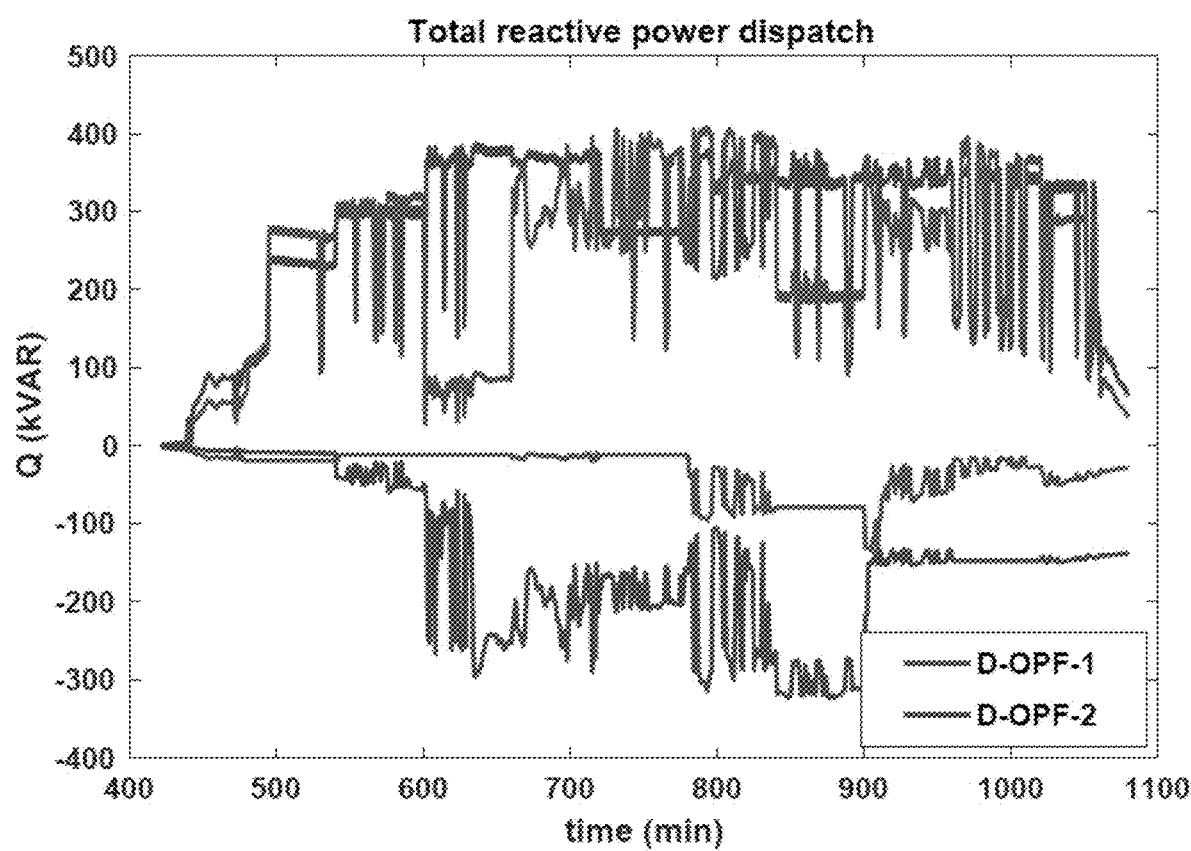
FIG. 10B shows a plot of reactive power (in kiloVolt Amps Reactive (kVAR)) versus time (in min), showing total reactive power dispatch for D-OPF-1 and D-OPF-2 on a cloudy day. The two curves closest to Q=0 at 600 min are for D-OPF-1; and the other two curves are for D-OPF-2.
Figure 10C:
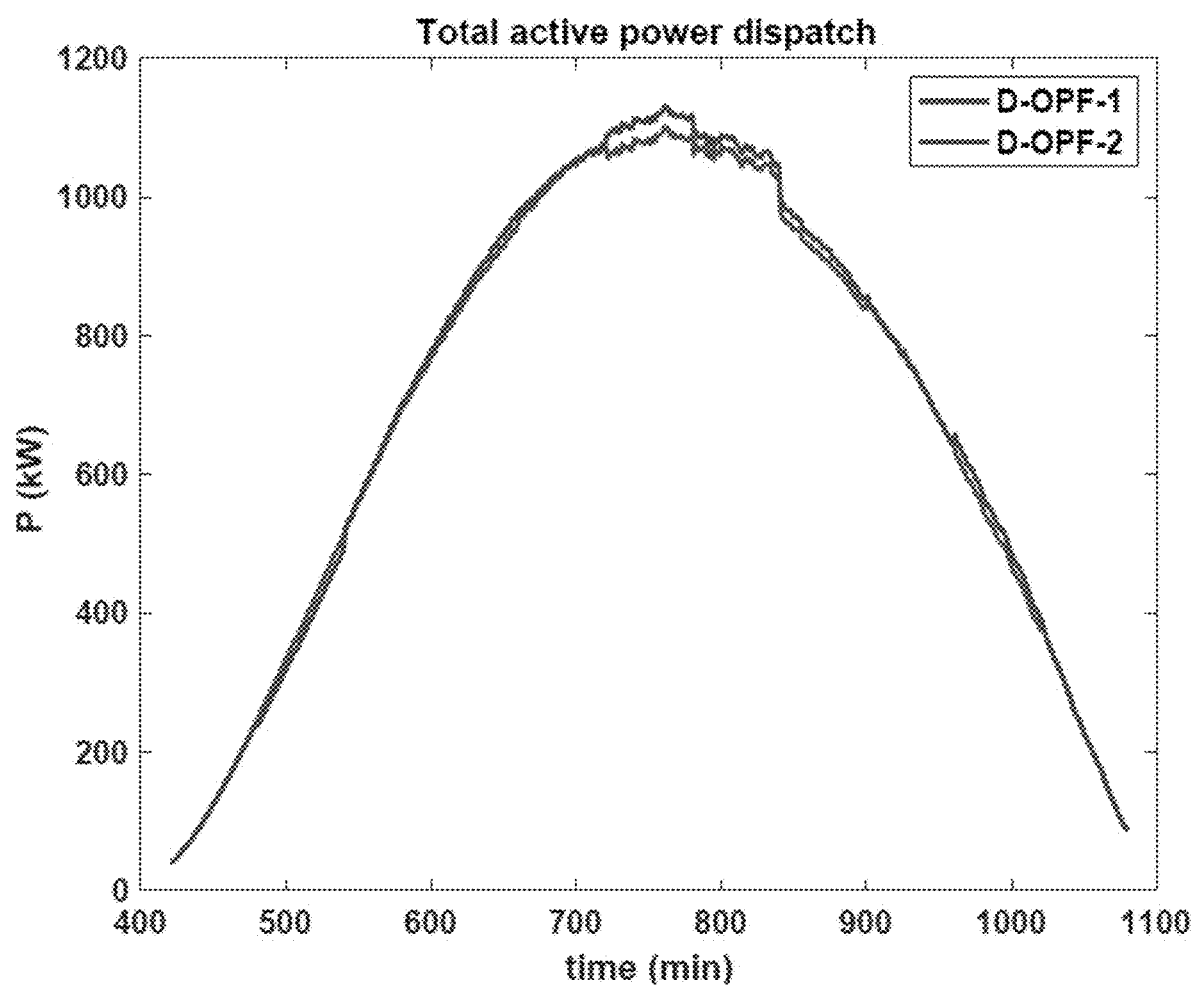
FIG. 10C shows a plot of active power (in kW) versus time (in min), showing total active power dispatch for D-OPF-1 and D-OPF-2 on a clear day. The curve with the higher power value at 750 min is for D-OPF-2; and the curve with the lower power value at 750 min is for D-OPF-1.
Figure 10D:
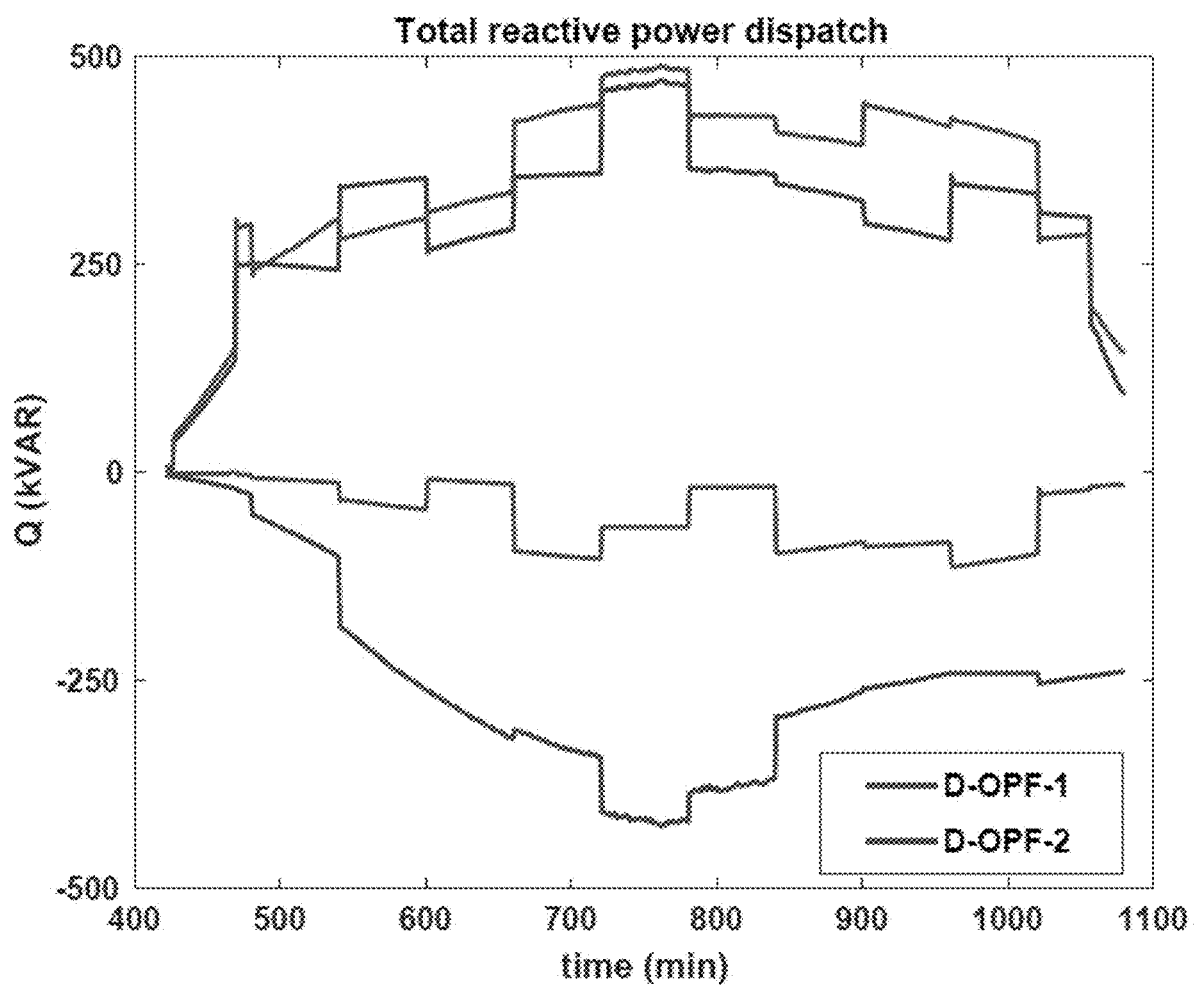
FIG. 10D shows a plot of reactive power (in kVAR) versus time (in min), showing total reactive power dispatch for D-OPF-1 and D-OPF-2 on a clear day. The two curves closest to Q=0 at 575 min are for D-OPF-1; and the other two curves are for D-OPF-2.
Figure 10E:
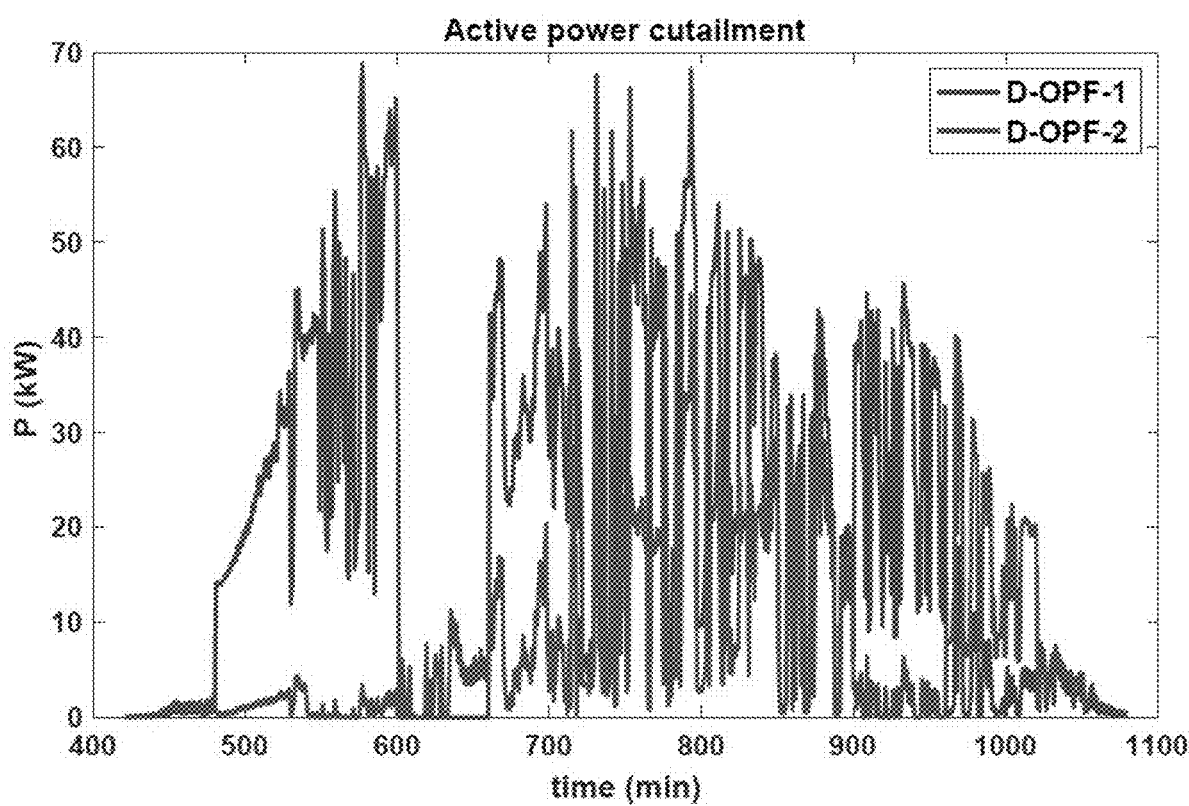
FIG. 10E shows a plot of active power (in kW) versus time (in min), showing total active power curtailment for D-OPF-1 and D-OPF-2 on a cloudy day. The curve with the higher power value at 550 min is for D-OPF-1; and the curve with the lower power value at 550 min is for D-OPF-2.
Figure 10F:
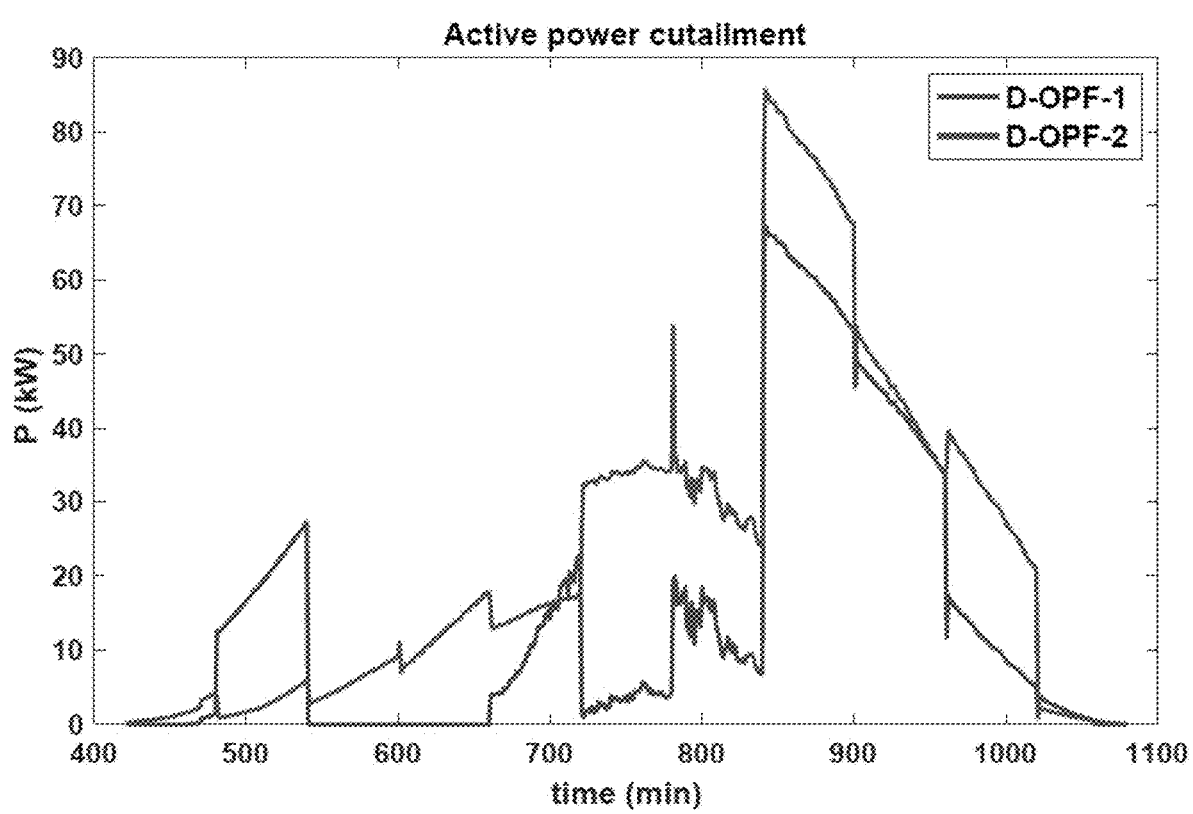

Using the values of $SIM^{opt}_i$, $SIS_i$, $tc^{opt}_i$, and $tp^{opt}_i$, the second-stage D-OPF for one-minute resolution was solved to determine $Q^G_i$ and $P^G_i$. FIG. 10A shows P-Q dispatch (in particular, total active power dispatch) for D-OPF-1 and D-OPF-2 on a cloudy day; FIG. 10B shows P-Q dispatch (in particular, total reactive power dispatch) for D-OPF-1 and D-OPF-2 on a cloudy day; FIG. 10C shows P-Q dispatch (in particular, total active power dispatch) for D-OPF-1 and D-OPF-2 on a clear day; FIG. 10D shows P-Q dispatch (in particular, total reactive power dispatch) for D-OPF-1 and D-OPF-2 on a clear day; FIG. 10E shows total active power curtailment for D-OPF-1 and D-OPF-2 on a cloudy day; and FIG. 10F shows total active power curtailment for D-OPF-1 and D-OPF-2 on a clear day.

Referring to FIGS. 10A-10F, it can be seen from the active power dispatch that both algorithms curtailed the active power at some intervals and injected/absorbed for effective voltage regulation during cloudy and clear scenarios. With the time period considered, the D-OPF-1 curtailed a total energy of 80.7 kilowatt-hours (kW-hr) on the cloudy day and 254 kW-hr on the clear day. Also, the D-OPF-2 curtailed a total energy of 221.5 kW-hr on the cloudy day and 161.6 kW-hr on the clear day. The active power curtailment by both algorithms was determined based on the optimal SI modes and settings. The use of the Volt/VAR (P-priority) by both algorithms allowed the SIs to curtail the active power generation for effective voltage regulation. Also, both algorithms injected/absorbed their optimal reactive power based on the SI modes and setting on the cloudy and clear days. Referring again to FIGS. 10A-10D, more reactive power was either absorbed/injected to control the feeder voltage compared to that of D-OPF-1.

Example 4-Voltage Profile Analysis

Figure 11A:
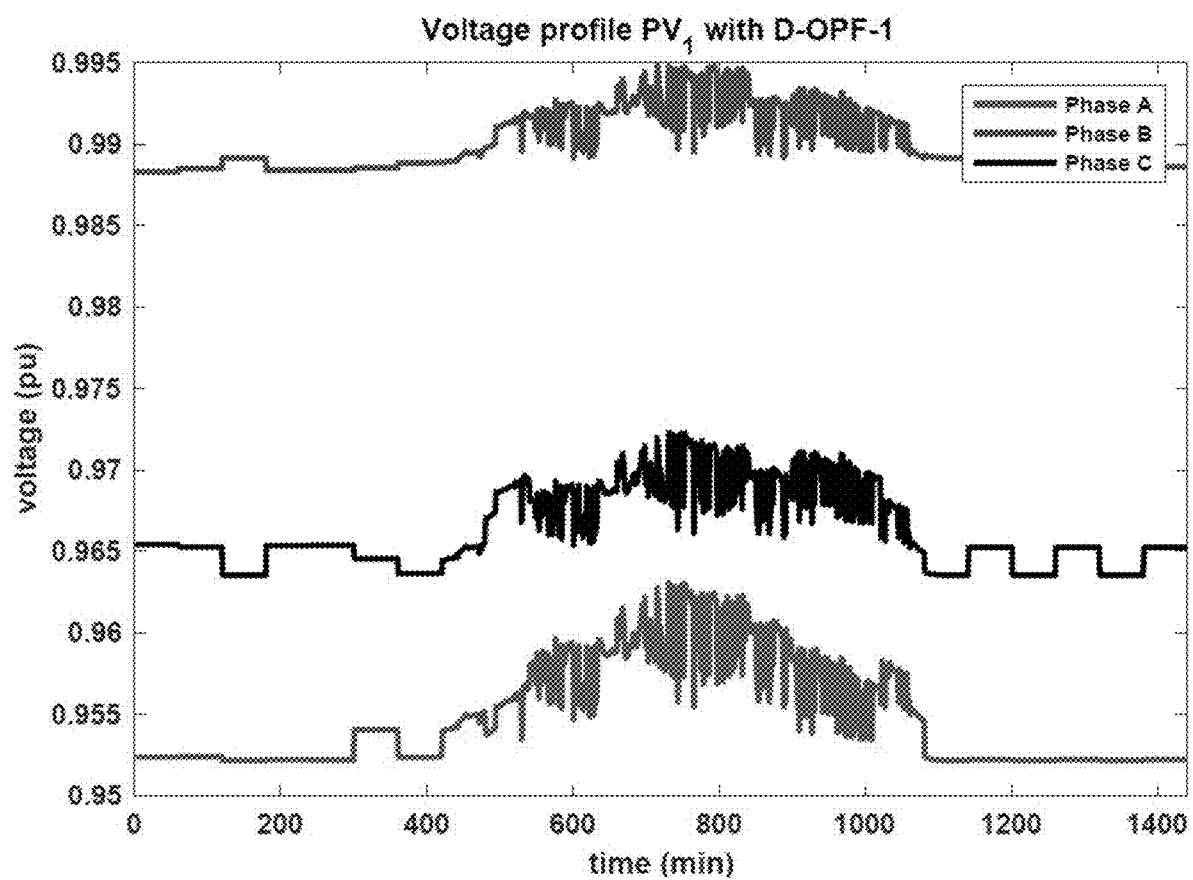
FIG. 11A shows a plot of voltage (pu) versus time (in min) for a first PV device ("$PV_1$") with D-OPF-1 on a cloudy day. The curve with the highest voltage values is for phase B; the curve with the second-highest voltage values is for phase C; and the curve with the lowest voltage values is for phase A.
Figure 11B:
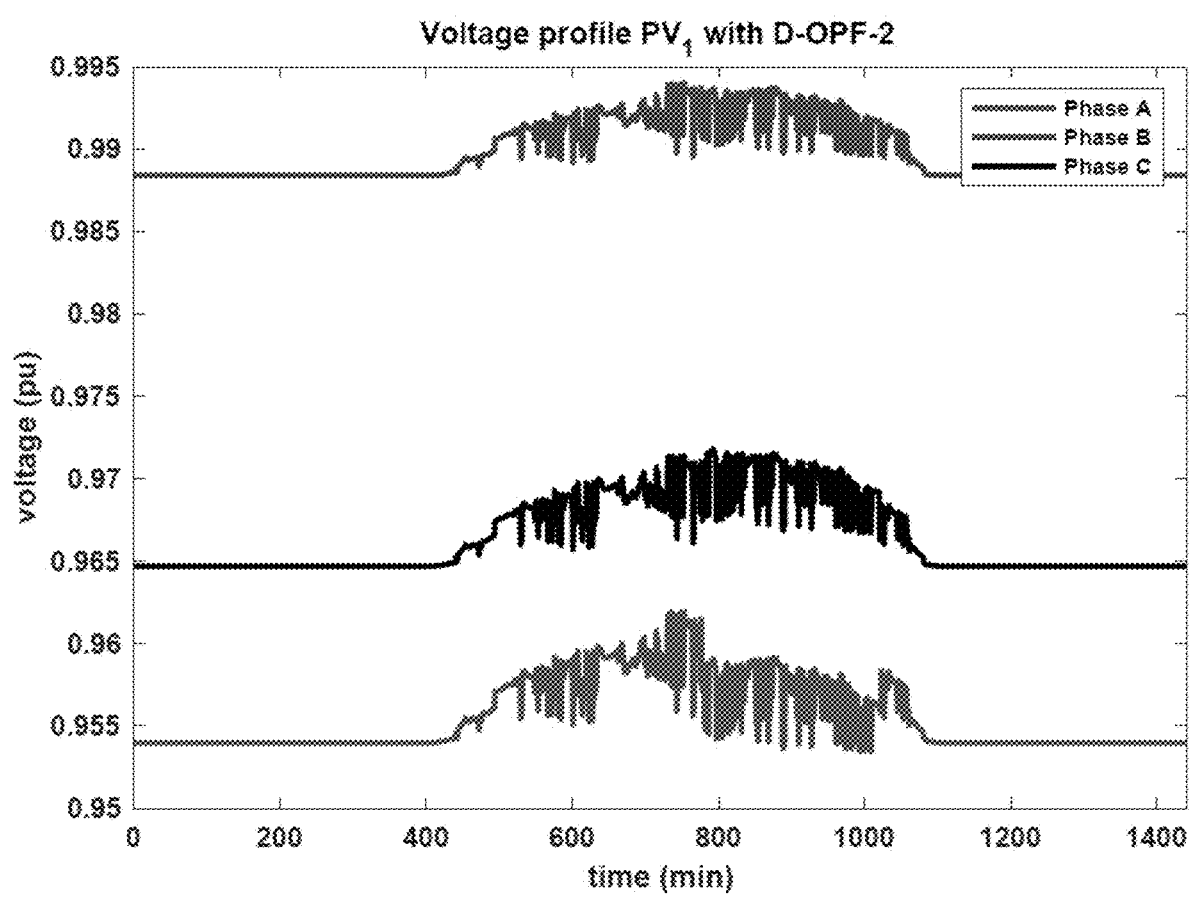
FIG. 11B shows a plot of voltage (pu) versus time (in min) for $PV_1$ with D-OPF-2 on a cloudy day. The curve with the highest voltage values is for phase B; the curve with the second-highest voltage values is for phase C; and the curve with the lowest voltage values is for phase A.
Figure 11C:
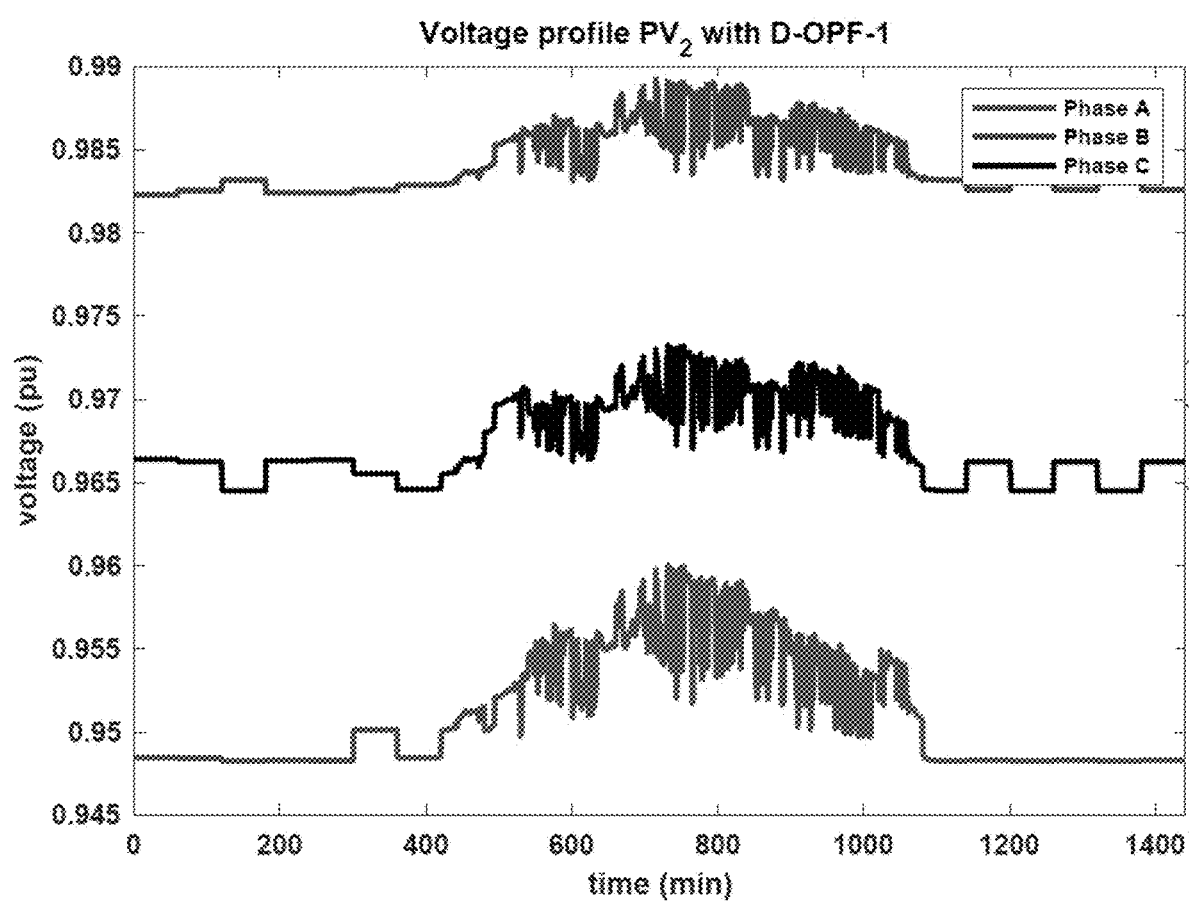
FIG. 11C shows a plot of voltage (pu) versus time (in min) for a second PV device ("$PV_2$") with D-OPF-1 on a cloudy day. The curve with the highest voltage values is for phase B; the curve with the second-highest voltage values is for phase C; and the curve with the lowest voltage values is for phase A.
Figure 11D:
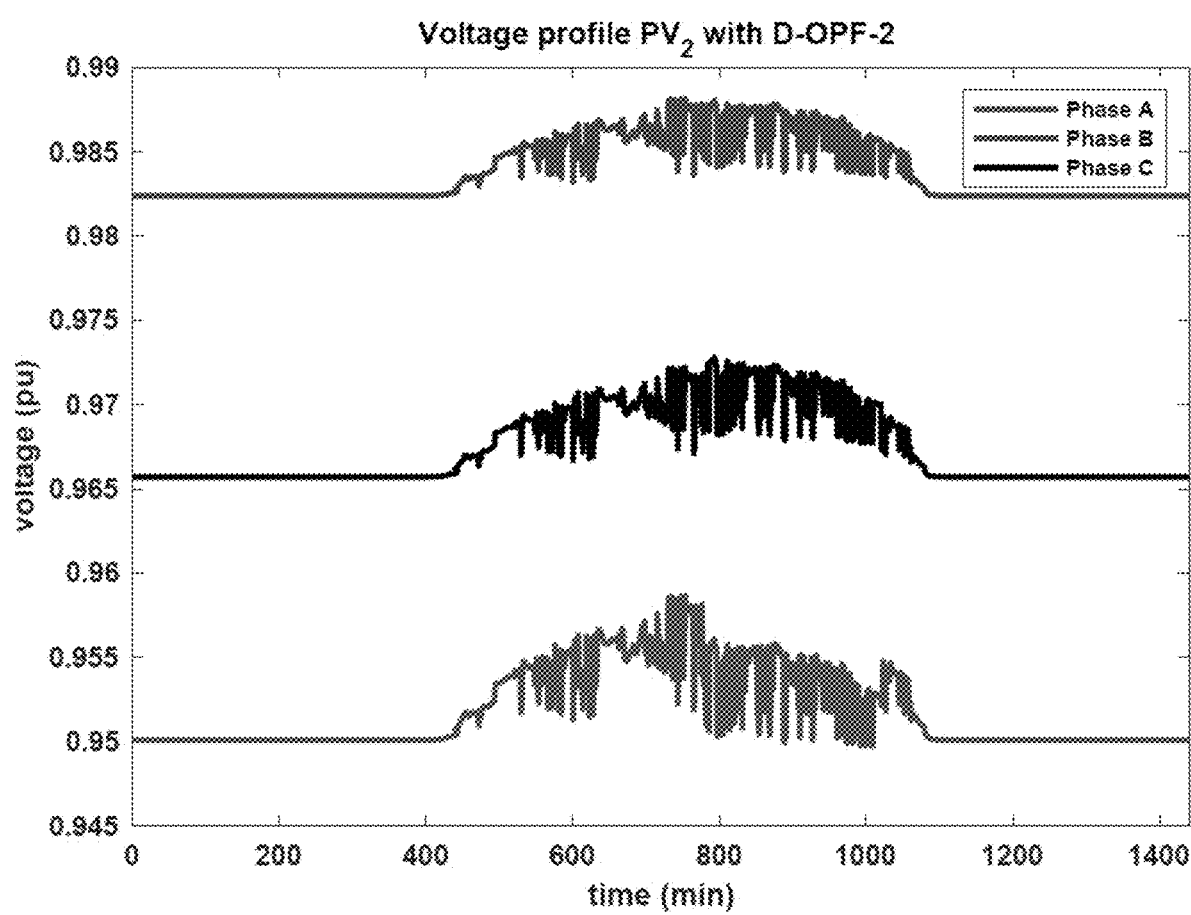
FIG. 11D shows a plot of voltage (pu) versus time (in min) for $PV_2$ with D-OPF-2 on a cloudy day. The curve with the highest voltage values is for phase B; the curve with the second-highest voltage values is for phase C; and the curve with the lowest voltage values is for phase A.
Figure 12A:
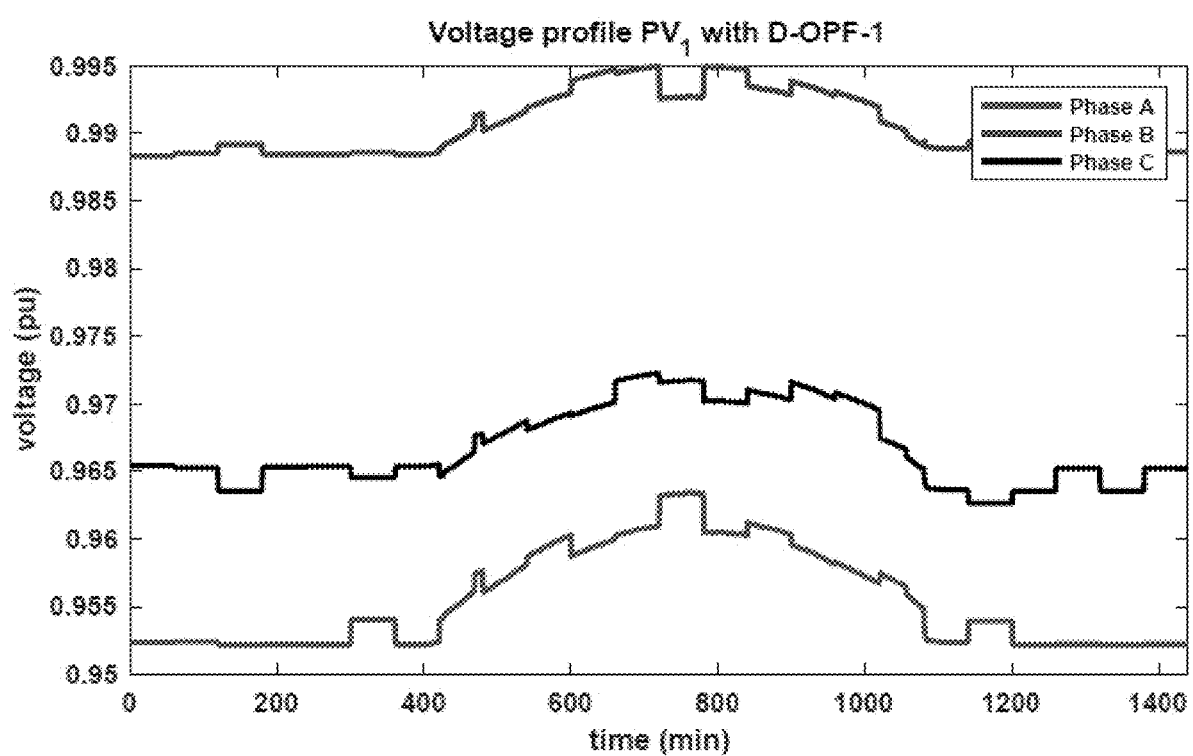
FIG. 12A shows a plot of voltage (pu) versus time (in min) for $PV_1$ with D-OPF-1 on a clear day. The curve with the highest voltage values is for phase B; the curve with the second-highest voltage values is for phase C; and the curve with the lowest voltage values is for phase A.
Figure 12B:
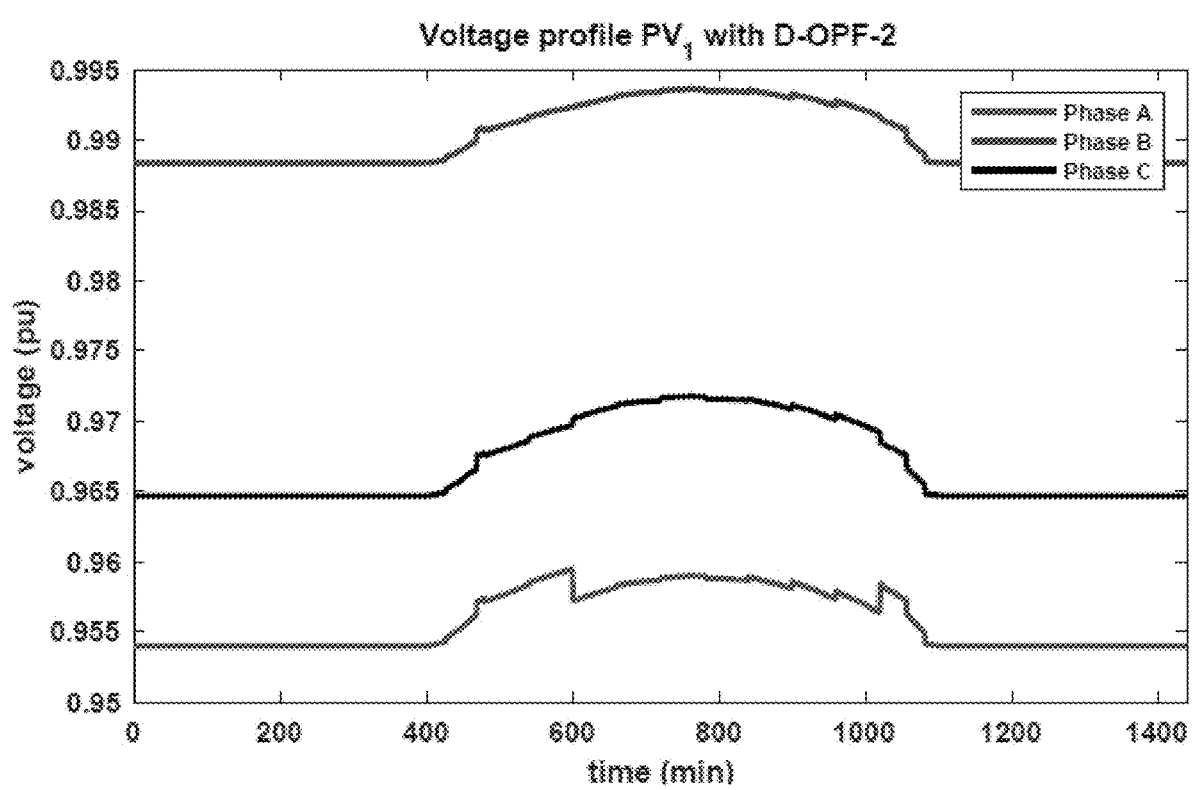
FIG. 12B shows a plot of voltage (pu) versus time (in min) for $PV_1$ with D-OPF-2 on a clear day. The curve with the highest voltage values is for phase B; the curve with the second-highest voltage values is for phase C; and the curve with the lowest voltage values is for phase A.
Figure 12C:
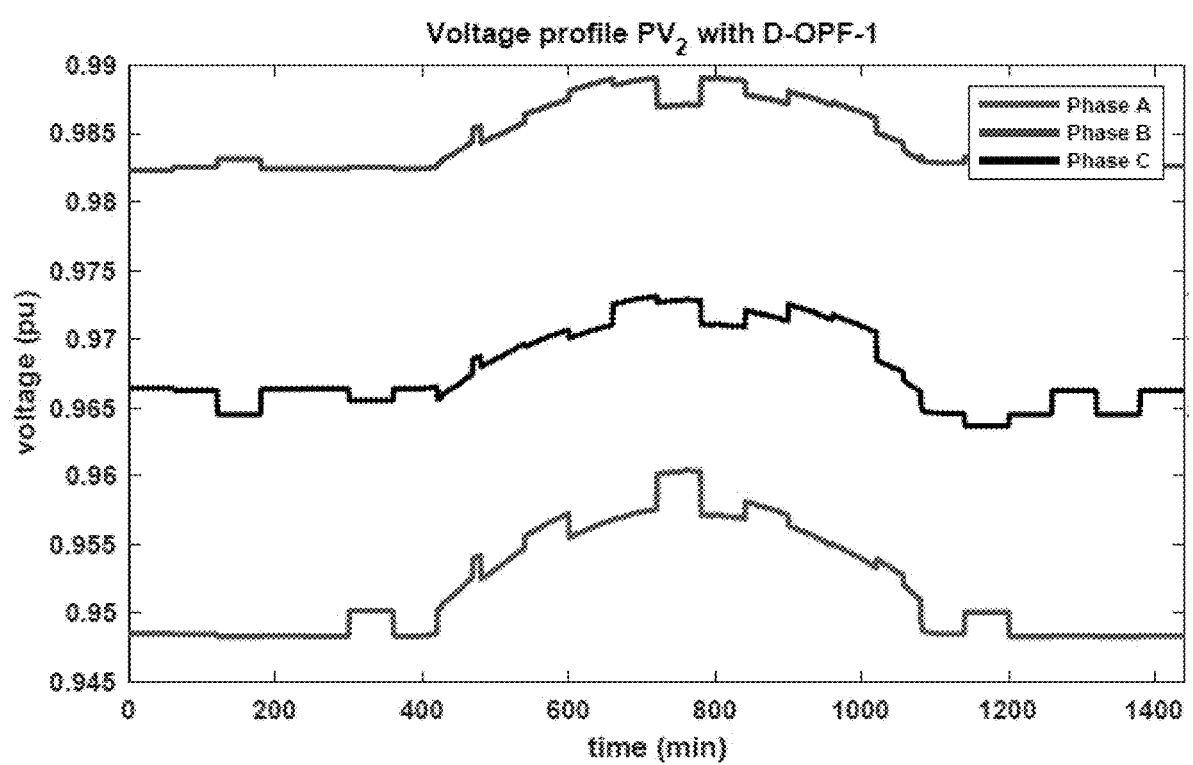
FIG. 12C shows a plot of voltage (pu) versus time (in min) for $PV_2$ with D-OPF-1 on a clear day. The curve with the highest voltage values is for phase B; the curve with the second-highest voltage values is for phase C; and the curve with the lowest voltage values is for phase A.
Figure 12D:
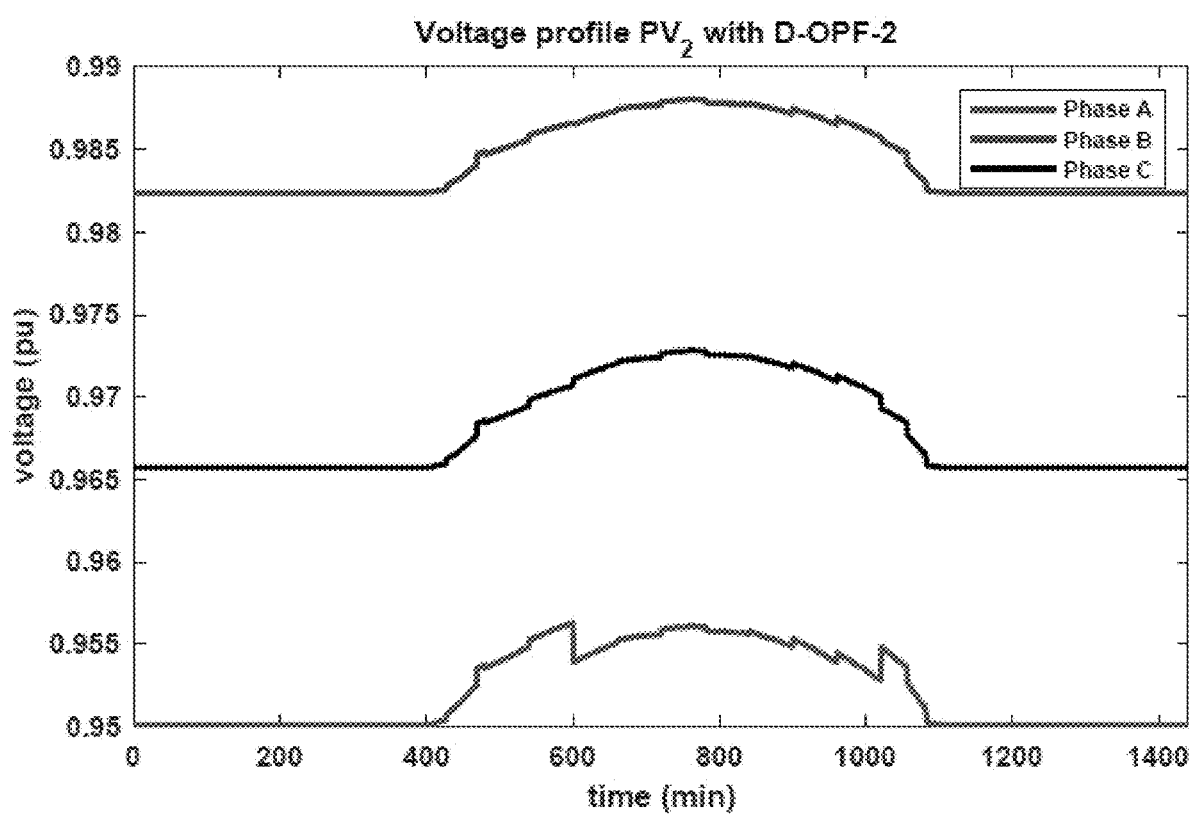
FIG. 12D shows a plot of voltage (pu) versus time (in min) for $PV_2$ with D-OPF-2 on a clear day. The curve with the highest voltage values is for phase B; the curve with the second-highest voltage values is for phase C; and the curve with the lowest voltage values is for phase A.
Figure 13A:
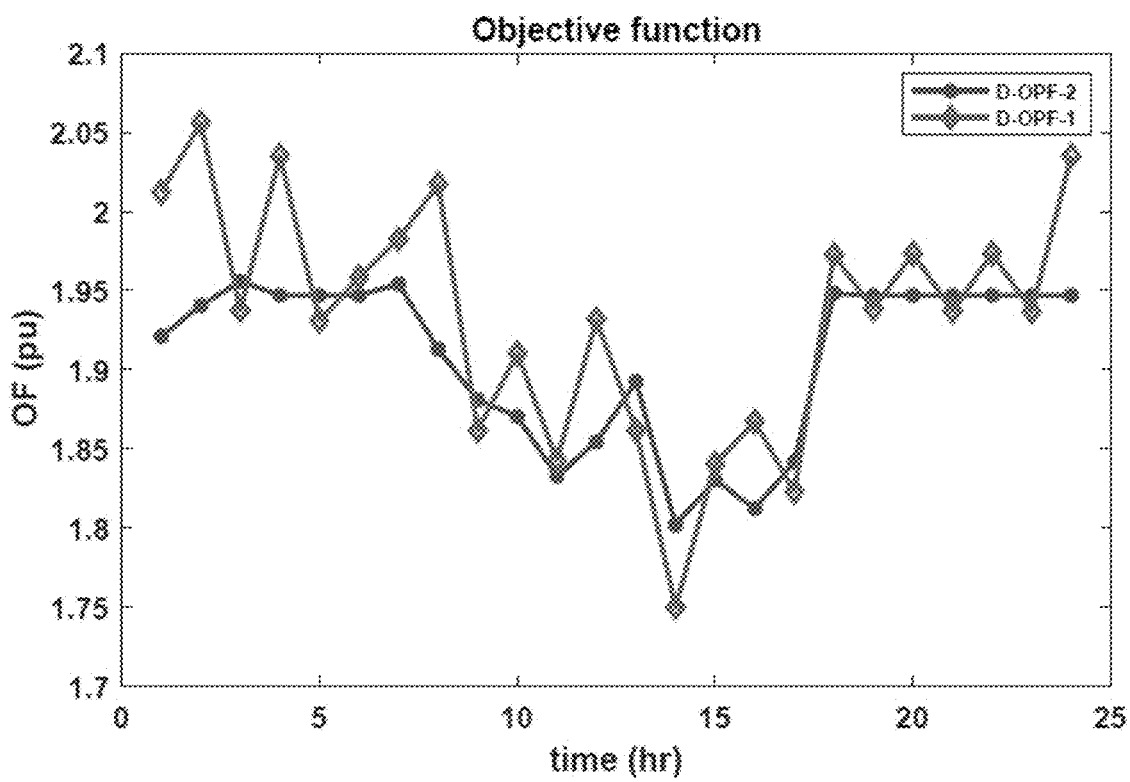
FIG. 13A shows a plot of objective function (OF) (pu) versus time (in hr), showing total voltage deviation for D-OPF-1 and D-OPF-2 on a cloudy day. The curve with the highest OF value at 20 hr (with the diamond data points) is for D-OPF-1; and the curve with the lowest OF value at 20 hr (with the circular data points) is for D-OPF-2.
Figure 13B:
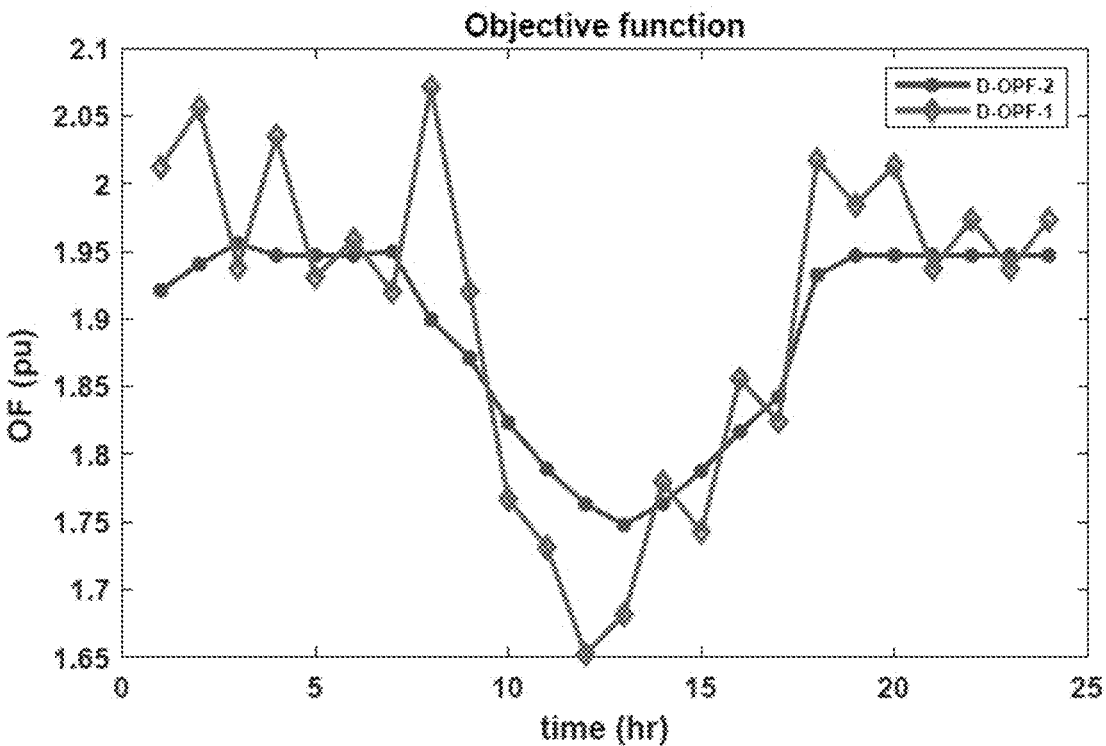
FIG. 13B shows a plot of (pu) versus time (in hr), showing total voltage deviation for D-OPF-1 and D-OPF-2 on a clear day. The curve with the highest OF value at 20 hr (with the diamond data points) is for D-OPF-1; and the curve with the lowest OF value at 20 hr (with the circular data points) is for D-OPF-2.

The voltage profile of two of the ten integrated PVs ($PV_1$ and $PV_2$) for D-OPF-1 and D-OPF-2 were found for both a cloudy day and a clear day. FIG. 11A shows the voltage profile for $PV_1$ with D-OPF-1 on a cloudy day; FIG. 11B shows the voltage profile for $PV_1$ with D-OPF-2 on a cloudy day; FIG. 11C shows the voltage profile for $PV_2$ with D-OPF-1 on a cloudy day; FIG. 11D shows the voltage profile for $PV_2$ with D-OPF-2 on a cloudy day; FIG. 12A shows the voltage profile for $PV_1$ with D-OPF-1 on a clear day; FIG. 12B shows the voltage profile for $PV_1$ with D-OPF-2 on a clear day; FIG. 12C shows the voltage profile for $PV_2$ with D-OPF-1 on a clear day; and FIG. 12D shows the voltage profile for $PV_2$ with D-OPF-2 on a clear day. Referring to FIGS. 11A-12D, the voltage profiles across the PVs shows that both D-OPF-1 and D-OPF-2 are able to regulate the nodal voltage at the point of interconnection (POI) within 0.95-1.05 per unit (pu). Also, D-OPF-2 algorithm provided a better regulated voltage profile compared to that of D-OPF-1. The hourly sum of the total voltage deviation (objective function (OF)) for both D-OPF-1 and D-OPF-2 on a cloudy day is shown in FIG. 13A; and the hourly sum of the total voltage deviation (OF) for both D-OPF-1 and D-OPF-2 on a clear day is shown in FIG. 13B.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:
1. A system for optimizing droop and mode settings of smart inverters (SIs) in a power grid comprising the SIs and a plurality of legacy grid voltage control devices, the system comprising:
 a processor; and
 a non-transitory machine-readable medium in operable communication with the processor and the power grid, and having instructions stored thereon that, when executed by the processor, perform the following steps:
  i) providing first input variables to a first distribution grid optimal power flow (D-OPF) problem, an objective of the first D-OPF problem being voltage deviation minimization, and the first input variables comprising initial droop and mode settings of the SIs;
  ii) solving the first D-OPF problem on a first timescale to determine a first set of optimal settings;
  iii) providing the first set of optimal settings as second input variables to a second D-OPF problem, an objective of the second D-OPF problem being voltage deviation minimization;

iv) providing third input variables to the second D-OPF problem, the third input variable comprising active power settings of the SIs and reactive power settings of the SIs;

v) solving the second D-OPF problem on a second timescale to determine a second set of optimal settings; and vi) using the first set of optimal settings to control a voltage of the power grid, the first set of optimal settings comprising optimal droop and mode settings of the SIs, the second set of optimal settings comprising optimal active and reactive power dispatch of the power grid, and the plurality of legacy grid voltage control devices comprising at least one of a substation load tap-changing (LTC) transformer, a substation feeder, a bus voltage regulator, a line voltage regulator, a fixed capacitor, and a switched capacitor.

2. The system according to claim 1, the first set of optimal settings further comprising optimal on-load tap changer (OLTC)/voltage regulator (VR) settings.

3. The system according to claim 2, the first set of optimal settings further comprising capacitor settings.

4. The system according to claim 1, the first timescale being slower than the second timescale.

5. The system according to claim 1, the mode settings of the SIs comprising Volt/Watt, Volt/VAR P-priority, Volt/VAR Q-priority, control power factor (CPF) leading, and CPF lagging.

6. The system according to claim 1, the optimal droop and mode settings of the SIs being optimal settings as per Institute of Electrical and Electronics Engineers (IEEE)-1547.

7. The system according to claim 1, the solving of the first D-OPF problem comprising using a mixed-integer non-linear programming (MINLP) model.

8. The system according to claim 1, the solving of the second D-OPF problem comprising using a non-linear programming (NLP) model.

9. The system according to claim 1, the first input variables further comprising initial capacitor settings and OLTC/VR settings, the solving of the first D-OPF problem comprising:
solving the first D-OPF problem a first time using the initial droop and mode settings of the SIs as control variables and an objective of minimizing voltage deviation of a first objective function;
solving the first D-OPF problem a second time using the capacitor settings as control variables and an objective of minimizing voltage deviation of a second objective function; and
solving the first D-OPF problem a third time using the OLTC/VR settings as control variables and an objective of minimizing voltage deviation of a third objective function, and
the determining of the optimal droop and mode settings of the SIs being assigned highest priority in the solving of the first D-OPF problem.

10. The system according to claim 1, the determining of the optimal droop and mode settings of the SIs not being assigned a priority any higher than the determining of other optimal settings.

11. A method for optimizing droop and mode settings of smart inverters (SIs) in a power grid comprising the SIs and a plurality of legacy grid voltage control devices, the method comprising:

i) providing, by a processor in operable communication with the power grid, first input variables to a first distribution grid optimal power flow (D-OPF) problem, an objective of the first D-OPF problem being voltage deviation minimization, and the first input variables comprising initial droop and mode settings of the SIs;

ii) solving, by the processor, the first D-OPF problem on a first timescale to determine a first set of optimal settings;

iii) providing, by the processor, the first set of optimal settings as second input variables to a second D-OPF problem, an objective of the second D-OPF problem being voltage deviation minimization;

iv) providing, by the processor, third input variables to the second D-OPF problem, the third input variable comprising active power settings of the SIs and reactive power settings of the SIs; and v) solving, by the processor, the second D-OPF problem on a second timescale to determine a second set of optimal settings; and vi) using the first set of optimal settings to control a voltage of the power grid, the first set of optimal settings comprising optimal droop and mode settings of the SIs, the second set of optimal settings comprising optimal active and reactive power dispatch of the power grid, and the plurality of legacy grid voltage control devices comprising at least one of a substation load tap-changing (LTC) transformer, a substation feeder, a bus voltage regulator, a line voltage regulator, a fixed capacitor, and a switched capacitor.

12. The method according to claim 11, the first set of optimal settings further comprising optimal on-load tap changer (OLTC)/voltage regulator (VR) settings.

13. The method according to claim 12, the first set of optimal settings further comprising capacitor settings.

14. The method according to claim 11, the first timescale being slower than the second timescale.

15. The method according to claim 11, the mode settings of the SIs comprising Volt/Watt, Volt/VAR P-priority, Volt/VAR Q-priority, control power factor (CPF) leading, and CPF lagging.

16. The method according to claim 11, the optimal droop and mode settings of the SIs being optimal settings as per Institute of Electrical and Electronics Engineers (IEEE)-1547.

17. The method according to claim 11, the solving of the first D-OPF problem comprising using a mixed-integer non-linear programming (MINLP) model, and
the solving of the second D-OPF problem comprising using a non-linear programming (NLP) model.

18. The method according to claim 11, the first input variables further comprising initial capacitor settings and OLTC/VR settings, the solving of the first D-OPF problem comprising:
solving, by the processor, the first D-OPF problem a first time using the initial droop and mode settings of the SIs as control variables and an objective of minimizing voltage deviation of a first objective function;
solving, by the processor, the first D-OPF problem a second time using the capacitor settings as control variables and an objective of minimizing voltage deviation of a second objective function; and
solving, by the processor, the first D-OPF problem a third time using the OLTC/VR settings as control variables and an objective of minimizing voltage deviation of a third objective function, and the determining of the optimal droop and mode settings of the SIs being assigned highest priority in the solving of the first D-OPF problem.

19. The method according to claim 11, the determining of the optimal droop and mode settings of the SIs not being assigned a priority any higher than the determining of other optimal settings.

20. A system for optimizing droop and mode settings of smart inverters (SIs) in a power grid comprising the SIs and a plurality of legacy grid voltage control devices, the system comprising:
  a processor; and
  a non-transitory machine-readable medium in operable communication with the processor and the power grid, and having instructions stored thereon that, when executed by the processor, perform the following steps:
    i) providing first input variables to a first distribution grid optimal power flow (D-OPF) problem, an objective of the first D-OPF problem being voltage deviation minimization, and the first input variables comprising initial droop and mode settings of the SIs;
    ii) solving the first D-OPF problem on a first timescale to determine a first set of optimal settings;
    iii) providing the first set of optimal settings as second input variables to a second D-OPF problem, an objective of the second D-OPF problem being voltage deviation minimization;
    iv) providing third input variables to the second D-OPF problem, the third input variable comprising active power settings of the SIs and reactive power settings of the SIs; and
    v) solving the second D-OPF problem on a second timescale to determine a second set of optimal settings; and
    vi) using the first set of optimal settings to control a voltage of the power grid,
  the first set of optimal settings comprising optimal droop and mode settings of the SIs,
  the second set of optimal settings comprising optimal active and reactive power dispatch of the power grid,
  the first set of optimal settings further comprising optimal on-load tap changer (OLTC)/voltage regulator (VR) settings and capacitor settings,
  the first timescale being slower than the second timescale,
  the mode settings of the SIs comprising Volt/Watt, Volt/VAR P-priority, Volt/VAR Q-priority, control power factor (CPF) leading, and CPF lagging,
  the optimal droop and mode settings of the SIs being optimal settings as per Institute of Electrical and Electronics Engineers (IEEE)-1547,
  the solving of the first D-OPF problem comprising using a mixed-integer non-linear programming (MINLP) model,
  the solving of the second D-OPF problem comprising using a non-linear programming (NLP) model,
  the first input variables further comprising initial capacitor settings and OLTC/VR settings,
  the solving of the first D-OPF problem comprising:
    solving the first D-OPF problem a first time using the initial droop and mode settings of the SIs as control variables and an objective of minimizing voltage deviation of a first objective function;
    solving the first D-OPF problem a second time using the capacitor settings as control variables and an objective of minimizing voltage deviation of a second objective function; and
    solving the first D-OPF problem a third time using the OLTC/VR settings as control variables and an objective of minimizing voltage deviation of a third objective function,
  the determining of the optimal droop and mode settings of the SIs being assigned highest priority in the solving of the first D-OPF problem, and
  the plurality of legacy grid voltage control devices comprising at least one of a substation load tap-changing (LTC) transformer, a substation feeder, a bus voltage regulator, a line voltage regulator, a fixed capacitor, and a switched capacitor.

* * * * *